(12) United States Patent
Pance et al.

(10) Patent No.: US 10,700,434 B2
(45) Date of Patent: Jun. 30, 2020

(54) BROADBAND MULTIPLE LAYER DIELECTRIC RESONATOR ANTENNA AND METHOD OF MAKING THE SAME

(71) Applicant: Rogers Corporation, Chandler, AZ (US)

(72) Inventors: Kristi Pance, Auburndale, MA (US); Karl E. Sprentall, Scottsdale, AZ (US); Shawn P. Williams, Andover, MA (US)

(73) Assignee: ROGERS CORPORATION, Chandler, AZ (US)

(*) Notice: Subject to any disclaimer, the term of this patent is extended or adjusted under 35 U.S.C. 154(b) by 0 days.

(21) Appl. No.: 16/680,727

(22) Filed: Nov. 12, 2019

(65) Prior Publication Data

US 2020/0083609 A1    Mar. 12, 2020

Related U.S. Application Data

(63) Continuation of application No. 15/769,410, filed as application No. PCT/US2016/059068 on Oct. 27, (Continued)

(51) Int. Cl.
*H01Q 1/38* (2006.01)
*H01Q 9/04* (2006.01)
(Continued)

(52) U.S. Cl.
CPC ............ *H01Q 9/0485* (2013.01); *H01Q 1/36* (2013.01); *H01Q 1/422* (2013.01); *H01Q 1/48* (2013.01);
(Continued)

(58) Field of Classification Search
CPC .. H01Q 1/36; H01Q 1/38; H01Q 1/42; H01Q 1/422; H01Q 1/48; H01Q 5/36;
(Continued)

(56) References Cited

U.S. PATENT DOCUMENTS 6,344,833 B1 * 2/2002 Lin .......................... H01Q 1/40
343/785
6,437,747 B1 * 8/2002 Stoiljkovic .............. H01Q 1/38
343/700 MS (Continued)

*Primary Examiner* — Tho G Phan
(74) *Attorney, Agent, or Firm* — Cantor Colburn LLP

(57) ABSTRACT

A dielectric resonator antenna, DRA, includes: an electrically conductive ground structure; a plurality of volumes of dielectric materials disposed on the ground structure comprising N volumes, N being an integer equal to or greater than 3, disposed to form sequential layered volumes $V_i$, i being an integer from 1 to N, wherein volume $V_1$ forms an innermost first volume, wherein a successive volume $V_{i+1}$ forms a layered shell disposed over and at least partially embedding volume $V_i$, wherein volume $V_N$ at least partially embeds all volumes $V_1$ to $V_{N-1}$; wherein a portion of the dielectric material of volume $V_N$ bifurcates at least a portion of volumes $V_1$ to $V_{N-1}$; wherein the plurality of volumes of dielectric materials has a first effective dielectric constant along a first geometrical path, and has a second effective dielectric constant along a second geometrical path that is lower than the first effective dielectric constant.

15 Claims, 53 Drawing Sheets

Related U.S. Application Data 2016, now Pat. No. 10,522,917, which is a continuation-in-part of application No. 15/334,669, filed on Oct. 26, 2016, now Pat. No. 10,374,315.

(60) Provisional application No. 62/362,210, filed on Jul. 14, 2016, provisional application No. 62/258,029, filed on Nov. 20, 2015, provisional application No. 62/247,459, filed on Oct. 28, 2015.

(51) Int. Cl.
| | |
|---|---|
| H01Q 5/364 | (2015.01) |
| H01Q 5/50 | (2015.01) |
| H01Q 1/36 | (2006.01) |
| H01Q 1/42 | (2006.01) |
| H01Q 1/48 | (2006.01) |
| H01Q 21/06 | (2006.01) |

(52) U.S. Cl.
CPC ............ H01Q 5/364 (2015.01); H01Q 5/50 (2015.01); H01Q 21/061 (2013.01)

(58) Field of Classification Search
CPC ............ H01Q 5/364; H01Q 5/50; H01Q 9/04; H01Q 9/0485; H01Q 21/06; H01Q 21/061

See application file for complete search history.

(56) References Cited

U.S. PATENT DOCUMENTS

| | | | | |
|---|---|---|---|---|
| 7,196,663 | B2* | 3/2007 | Bolzer | H01Q 9/0485 343/700 MS |
| 7,253,789 | B2* | 8/2007 | Kingsley | H01Q 9/0485 343/753 |
| 7,443,363 | B2* | 10/2008 | Ying | H01Q 9/0492 333/202 |
| 7,595,765 | B1* | 9/2009 | Hirsch | H01Q 5/50 343/789 |
| 7,663,553 | B2* | 2/2010 | Chang | H01Q 9/0485 343/700 MS |

* cited by examiner

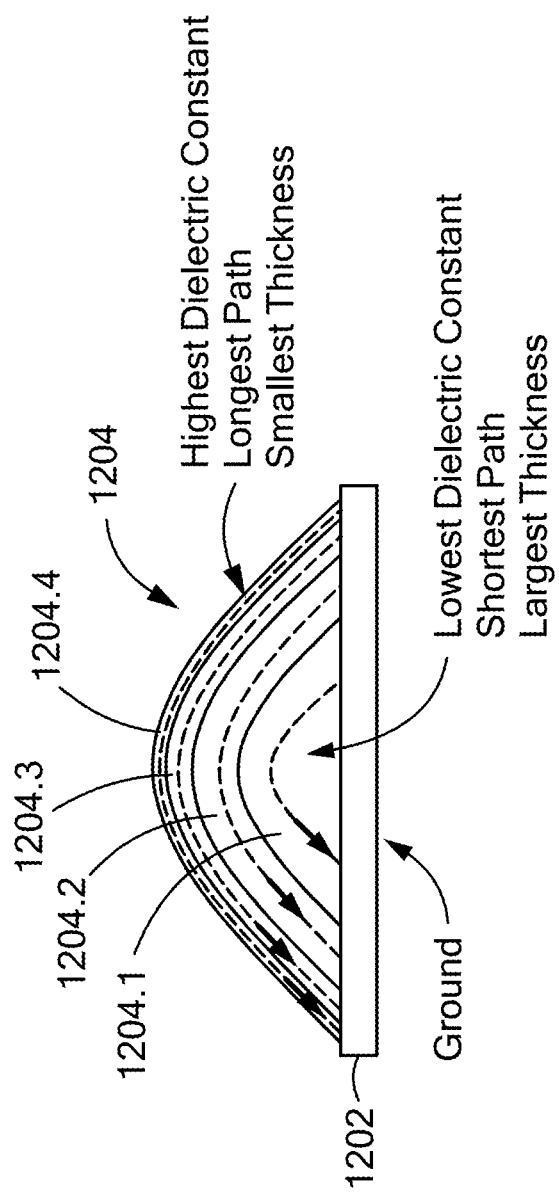
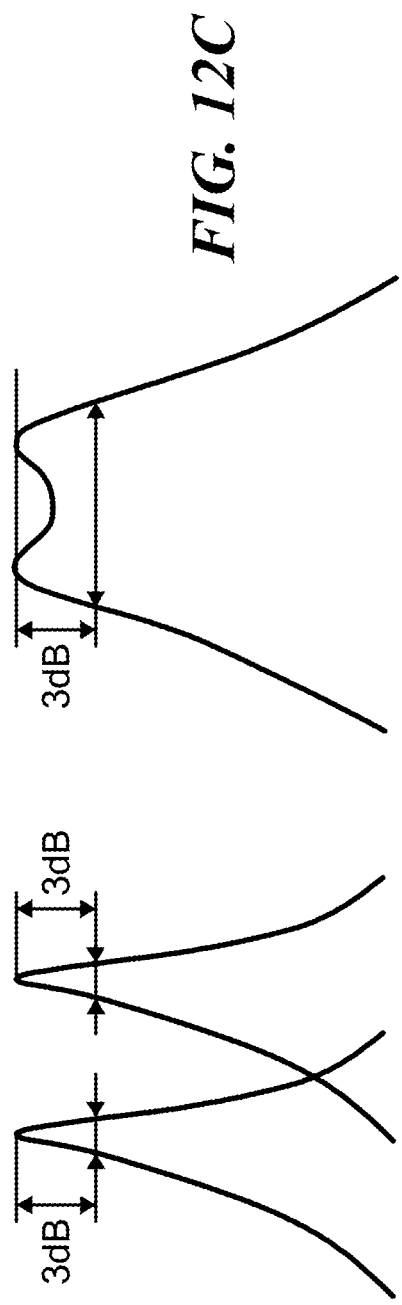
FIG. 12A
FIG. 12B
FIG. 12C

| Name | Theta | Ang | Mag |
|------|-------|-----|-----|
| m1 | 360.0000 | -0.0000 | 5.3347 |

| Name | Theta | Ang | Mag |
|------|-------|-----|-----|
| m1 | 360.0000 | -0.0000 | 5.3347 |

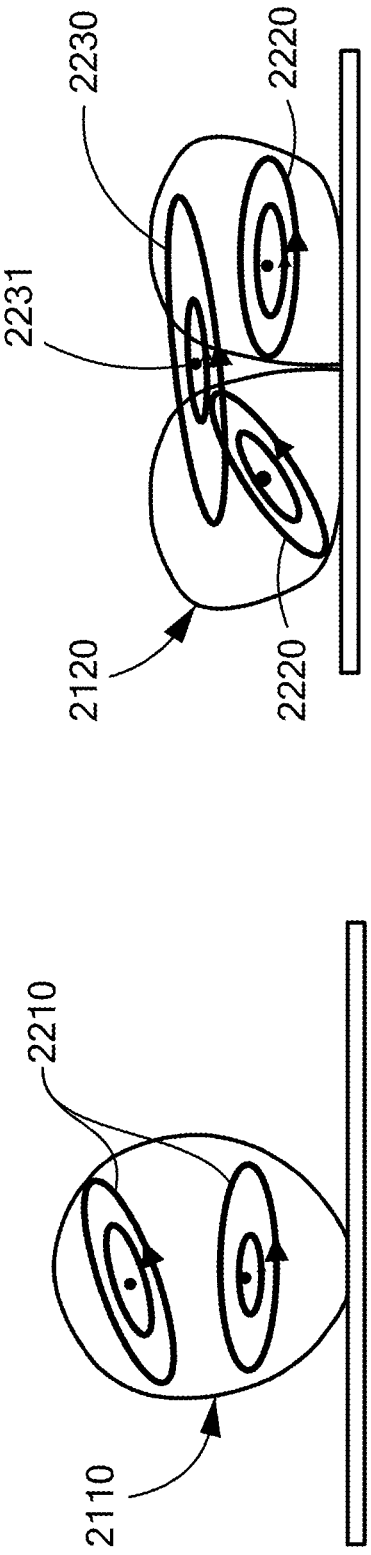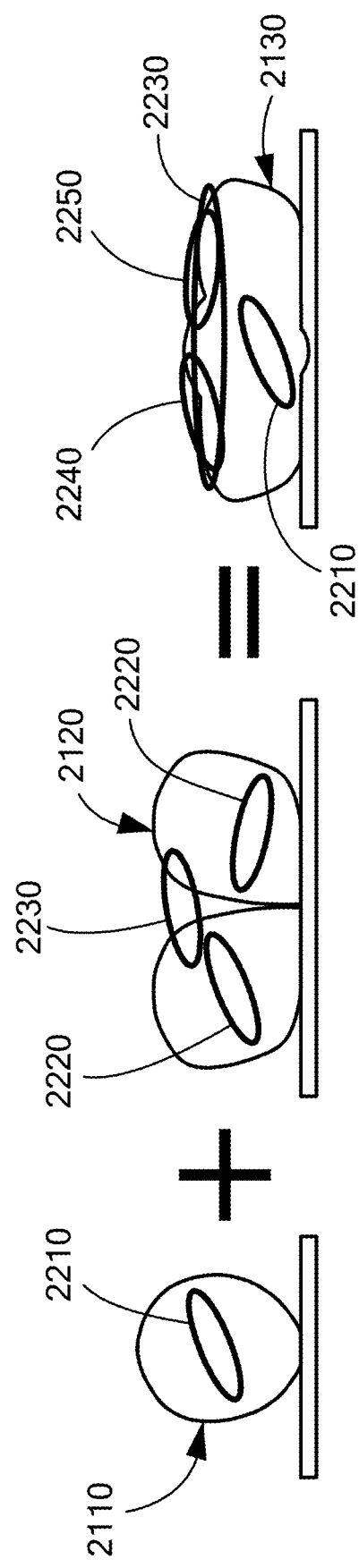

BROADBAND MULTIPLE LAYER DIELECTRIC RESONATOR ANTENNA AND METHOD OF MAKING THE SAME

CROSS REFERENCE TO RELATED APPLICATIONS

This application is a continuation of U.S. Ser. No. 15/769,410, filed Apr. 19, 2018, which is a National Stage Entry of PCT/US2016/059068, filed Oct. 27, 2016, which is a continuation-in-part of U.S. Ser. No. 15/334,669, filed Oct. 26, 2016, which claims priority to U.S. Application Nos. 62/362,210, filed Jul. 14, 2016; 62/258,029, filed Nov. 20, 2015; and, 62/247,459, filed Oct. 28, 2015, all of which are incorporated herein in their entireties.

BACKGROUND OF THE INVENTION

The present disclosure relates generally to a dielectric resonator antenna (DRA), particularly to a multiple layer DRA, and more particularly to a broadband multiple layer DRA for microwave and millimeter wave applications.

Existing resonators and arrays employ patch antennas, and while such antennas may be suitable for their intended purpose, they also have drawbacks, such as limited bandwidth, limited efficiency, and therefore limited gain. Techniques that have been employed to improve the bandwidth have typically led to expensive and complicated multilayer and multi-patch designs, and it remains challenging to achieve bandwidths greater than 25%. Furthermore, multi-layer designs add to unit cell intrinsic losses, and therefore reduce the antenna gain. Additionally, patch and multi-patch antenna arrays employing a complicated combination of metal and dielectric substrates make them difficult to produce using newer manufacturing techniques available today, such as three-dimensional (3D) printing (also known as additive manufacturing).

Accordingly, and while existing DRAs may be suitable for their intended purpose, the art of DRAs would be advanced with a DRA structure that can overcome the above noted drawbacks.

BRIEF DESCRIPTION OF THE INVENTION

An embodiment includes a dielectric resonator antenna, DRA, having: an electrically conductive ground structure; a plurality of volumes of dielectric materials disposed on the ground structure comprising N volumes, N being an integer equal to or greater than 3, disposed to form successive and sequential layered volumes $V_i$, i being an integer from 1 to N, wherein volume $V_1$ forms an innermost first volume, wherein a successive volume $V_{i+1}$ forms a layered shell disposed over and at least partially embedding volume $V_i$, wherein volume $V_N$ at least partially embeds all volumes $V_1$ to $V_{N-1}$; wherein a portion of the dielectric material of volume $V_N$ bifurcates at least a portion of volumes $V_1$ to $V_{N-1}$ in a plane that is perpendicular to the ground structure; wherein, as observed in a plan view of the DRA, the plurality of volumes of dielectric materials has a first effective dielectric constant along a first A-B geometrical path, and has a second effective dielectric constant along a second C-D geometrical path that is lower than the first effective dielectric constant; and, a signal feed electromagnetically coupled to one or more of the plurality of volumes of dielectric materials.

The above features and advantages and other features and advantages are readily apparent from the following detailed description when taken in connection with the accompanying drawings.

BRIEF DESCRIPTION OF THE DRAWINGS

Referring to the exemplary non-limiting drawings wherein like elements are numbered alike in the accompanying Figures:

FIG. 12A depicts a block diagram side view of an artist's rendering of a plurality of layered volumes of dielectric materials illustrative of electrical paths and electrical path lengths therein, in accordance with an embodiment;

FIG. 12B depicts decoupled resonances illustrative of narrow band response;

FIG. 12C depicts coupled resonances illustrative of broadband response, in accordance with an embodiment;

FIGS. 22A, 22B and 22C depict the homotopy groups of FIGS. 21A. 21B and 21C, respectively, but with families of curves superimposed thereon;

DETAILED DESCRIPTION

Figure 1A:
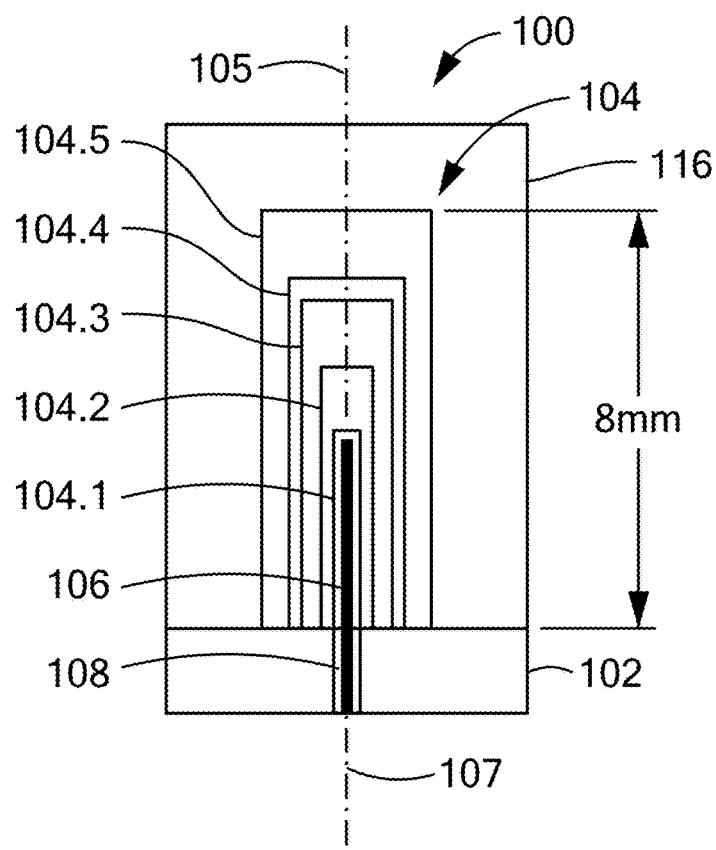
FIG. 1A depicts a block diagram side view of a DRA in accordance with an embodiment.

Embodiments disclosed herein include different arrangements useful for building broadband dielectric resonator antenna (DRA) arrays, where the different arrangements employ a common structure of dielectric layers having different thicknesses, different dielectric constants, or both different thicknesses and different dielectric constants. The particular shape of a multilayer DRA depends on the chosen dielectric constants for each layer. Each multilayer shell may be cylindrical, ellipsoid, ovaloid, dome-shaped or hemispherical, for example, or may be any other shape suitable for a purpose disclosed herein. Broad bandwidths (greater than 50% for example) can be achieved by changing the dielectric constants over the different layered shells, from a first relative minimum at the core, to a relative maximum between the core and the outer layer, back to a second relative minimum at the outer layer. A balanced gain can be achieved by employing a shifted shell configuration, or by employing an asymmetric structure to the layered shells. Each DRA is fed via a signal feed that may be a coaxial cable with a vertical wire extension, to achieve extremely broad bandwidths, or through a conductive loop of different lengths and shapes according to the symmetry of the DRA, or via a microstrip, a waveguide or a surface integrated waveguide. The structure of the DRA's disclosed herein may be manufactured using methods such as compression or injection molding, 3D material deposition processes such as 3D printing, or any other manufacturing process suitable for a purpose disclosed herein.

The several embodiments of DRA's disclosed herein are suitable for use in microwave and millimeter wave applications where broadband and high gain are desired, for replacing patch antenna arrays in microwave and millimeter wave applications, for use in 10-20 GHz radar applications, or for use in backhaul applications and 77 GHz radiators and arrays. Different embodiments will be described with reference to the several figures provided herein. However, it will be appreciated from the disclosure herein that features found in one embodiment but not another may be employed in the other embodiment, such as a fence for example, which is discussed in detail below.

In general, described herein is a family of DRA's, where each family member comprises a plurality of volumes of dielectric materials disposed on an electrically conductive ground structure. Each volume V(i), where i=1 to N, i and N being integers, with N designating the total number of volumes, of the plurality of volumes is arranged as a layered shell that is disposed over and at least partially embeds the previous volume, where V(1) is the innermost layer/volume and V(N) is the outermost layer/volume. In an embodiment, the layered shell that embeds the underlying volume, such as one or more of layered shells V(i>1) to V(N) for example, embeds the underlying volume completely 100%. However, in another embodiment, one or more of the layered shell V(i>1) to V(N) that embeds the underlying volume may purposefully embed only at least partially the underlying volume. In those embodiments that are described herein where the layered shell that embeds the underlying volume does so completely 100%, it will be appreciated that such embedding also encompasses microscopic voids that may be present in the overlying dielectric layer due to manufacturing or processes variations, intentional or otherwise, or even due to the inclusion of one or more purposeful voids or holes. As such, the term completely 100% is best understood to mean substantially completely 100%. While embodiments described herein depict N as an odd number, it is contemplated that the scope of the invention is not so limited, that is, it is contemplated that N could be an even number. As described and depicted herein, N is equal to or greater than 3. The dielectric constants ($\varepsilon_i$) of directly adjacent (i.e., in intimate contact) ones of the plurality of volumes of dielectric materials differ from one layer to the next, and within a series of volumes range from a first relative minimum value at i=1, to a relative maximum value at i=2 to i=(N−1), back to a second relative minimum value at i=N. In an embodiment, the first relative minimum is equal to the second relative minimum. In another embodiment, the first relative minimum is different from the second relative minimum. In another embodiment, the first relative minimum is less than the second relative minimum. For example, in a non-limiting embodiment having five layers, N=5, the dielectric constants of the plurality of volumes of dielectric materials, i=1 to 5, may be as follows: $\varepsilon_1=2$, $\varepsilon_2=9$, $\varepsilon_3=13$, $\varepsilon_4=9$ and $\varepsilon_5=2$. It will be appreciated, however, that an embodiment of the invention is not limited to these exact values of dielectric constants, and encompasses any dielectric constant suitable for a purpose disclosed herein. Excitation of the DRA is provided by a signal feed, such as a copper wire, a coaxial cable, a microstrip, a waveguide, a surface integrated waveguide, or a conductive ink, for example, that is electromagnetically coupled to one or more of the plurality of volumes of dielectric materials. In those signal feeds that are directly embedded in the DRA, the signal feed passes through the ground structure, in non-electrical contact with the ground structure, via an opening in the ground structure into one of the plurality of volumes of dielectric materials. As used herein, reference to dielectric materials includes air, which has a relative permittivity ($\varepsilon_r$) of approximately one at standard atmospheric pressure (1 atmosphere) and temperature (20 degree Celsius). As such, one or more of the plurality of volumes of dielectric materials disclosed herein may be air, such as volume V(1) or volume V(N), by way of example in a non-limiting way.

In an embodiment of a DRA that forms an ultra-broadband whip antenna, discussed in more detail below, the feed wire is electromagnetically coupled to the innermost layer, V(1). In an embodiment of a DRA that forms a broadband upper half space antenna, also discussed in more detail below, the feed wire is electromagnetically coupled to a layer other than the innermost layer, such as, but not limited to, V(2) for example.

Other variations to the layered volumes, such as 2D shape of footprint, 3D shape of volume, symmetry or asymmetry of one volume relative to another volume of a given plurality of volumes, and, presence or absence of material surrounding the outermost volume of the layered shells, may be employed to further adjust the gain or bandwidth to achieve a desired result. The several embodiments that are part of the family of DRA's consistent with the above generalized description will now be described with reference to the several figures provided herein. Initial reference is made herein to FIGS. 1-34, which themselves may not depict all of the features in the appended claims, but is presented herein for a complete understanding of the claimed invention.

FIG. 1A depicts a side view of a whip-type DRA 100 in accordance with an embodiment having an electrically conductive ground structure 102, and a plurality of volumes of dielectric materials 104 disposed on the ground structure 102 comprising N volumes, N being an integer equal to or greater than 3, disposed to form successive and sequential layered volumes V(i), i being an integer from 1 to N, wherein volume V(1) forms an innermost volume 104.1, wherein a successive volume V(i+1) forms a layered shell 104.2, 104.3, 104.4 disposed over and embedding volume V(i), and wherein volume V(N) forms an outer volume 104.5 that embeds all volumes V(1) to V(N−1). As can be seen in the embodiment of FIG. 1A, N=5. However, it will be appreciated that the scope of the invention is not limited to N=5. In an embodiment, the number of layers N can be in the 100's, the 1,000's or the 10,000's, for example.

As used herein, the term ground structure is known in the art to be a ground plane. However, it will be appreciated that the ground plane may in fact be planar in shape, but it may also be non-planar in shape. As such, the term ground structure is intended to encompass both a planar and a non-planar electrical ground.

Directly adjacent volumes of the plurality of volumes of dielectric materials 104 have different dielectric constant values that range from a relative minimum value at volume V(1) to a relative maximum value at one of volumes V(2) to V(N−1), back to a relative minimum value at volume V(N). Specific dielectric constant values are discussed further below.

In an embodiment, directly adjacent volumes of the plurality of volumes of dielectric materials 104 have different dielectric constant values that range from a relative minimum value at volume V(1) to a relative maximum value at V((N+1)/2), where N is an odd integer, back to a relative minimum value at V(N).

In the embodiment of FIG. 1A, a signal feed 106 is disposed within an opening 108 of the ground structure 102 in non-electrical contact with the ground structure 102, wherein the signal feed 106 is disposed completely within and electromagnetically coupled to one of the plurality of volumes of dielectric materials. In the embodiment of FIG. 1A, the signal feed 106, is disposed completely within and electromagnetically coupled to the first volume V(1) of dielectric material 104.1. In an embodiment, each volume 104.1-104.5 of the plurality of volumes of dielectric materials has a central longitudinal axis 105 that is parallel to and centrally disposed relative to a longitudinal axis 107 (also see z-axis depicted in FIG. 1B for example) of the signal feed 106, the longitudinal axis of the signal feed 107 being perpendicular to the ground structure 102. As used herein, the phrase perpendicular to the ground structure is intended to convey a structural arrangement where the ground structure can be viewed as having an electrically equivalent planar ground structure, and the signal feed is disposed perpendicular to the electrically equivalent planar ground structure.

Figure 1B:
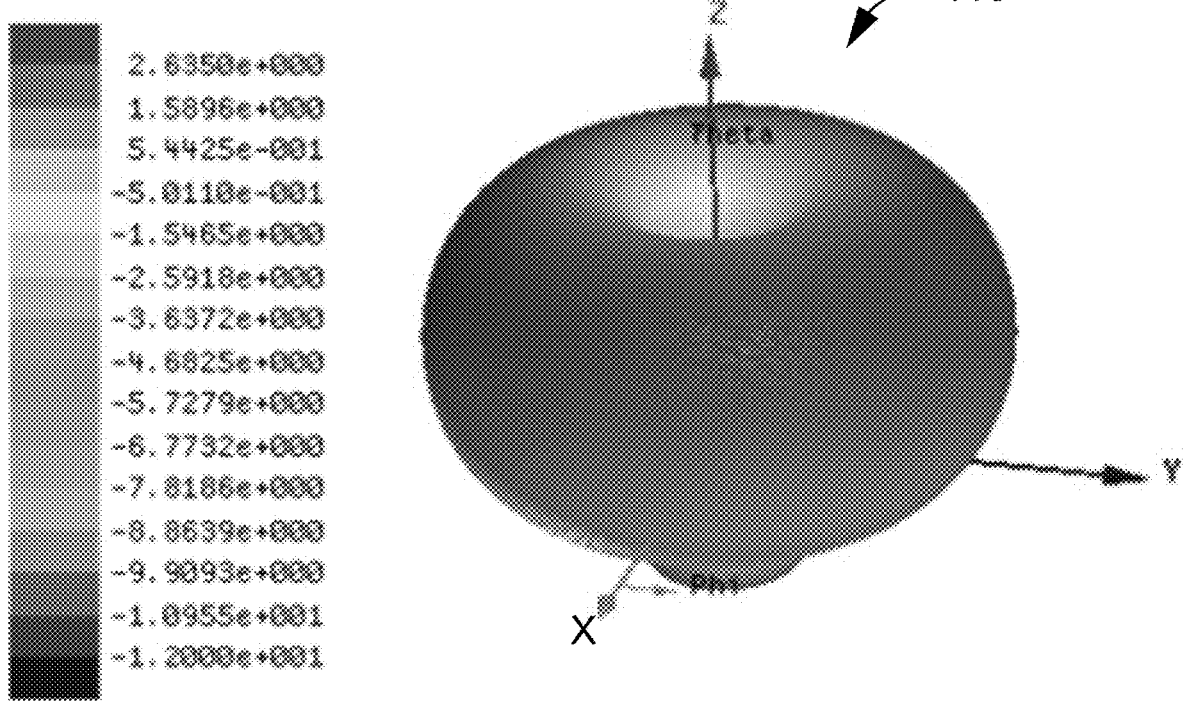
FIG. 1B depicts a field radiation pattern associated with the DRA of FIG. 1A.
Figure 1C:
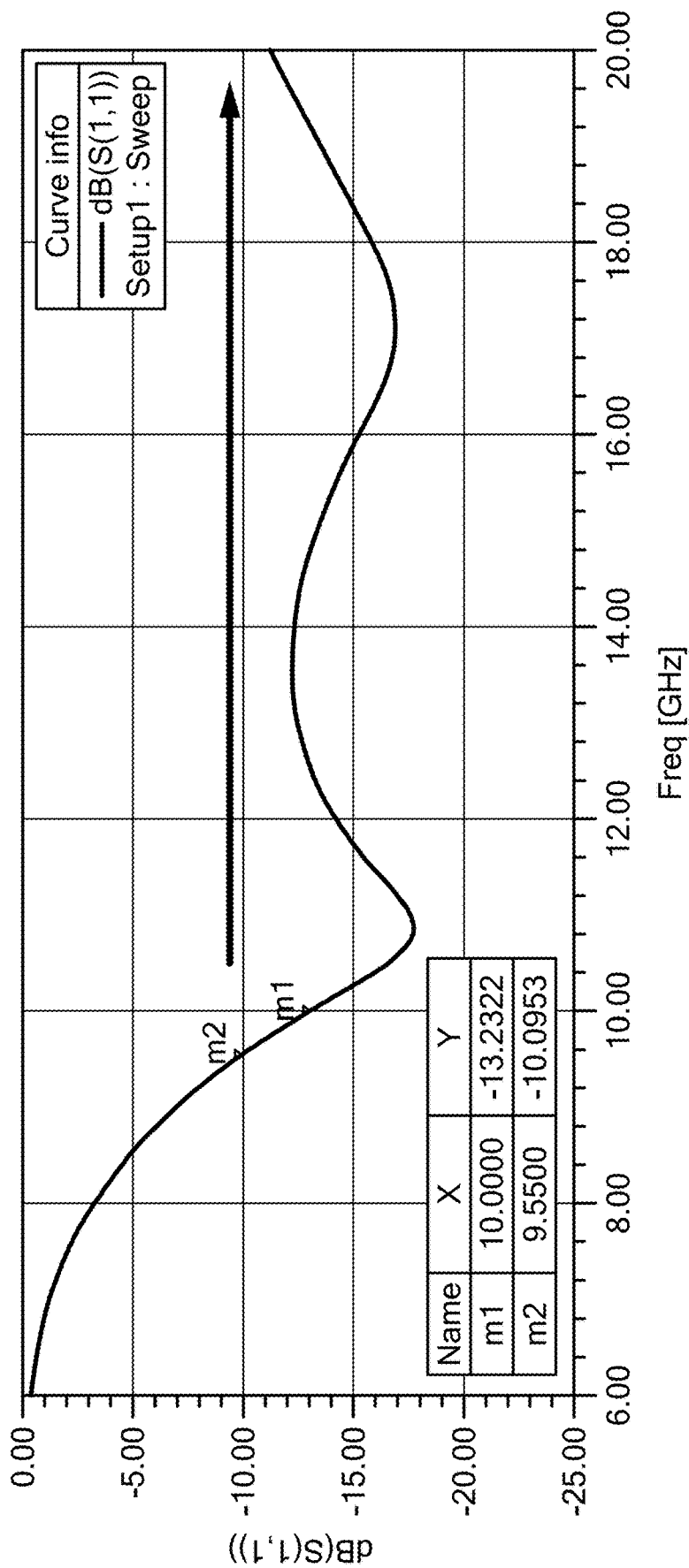
FIG. 1C depicts a return loss graph associated with the DRA of FIG. 1A.

The DRA 100 depicted in FIG. 1A produces the broadband omnidirectional donut shaped linearly polarized radiation pattern 110 as depicted in FIG. 1B, having the bandwidth and 3 dB gain as depicted in FIG. 1C. As used herein, the term 'dB' refers to the internationally recognized term 'dBi—decibels relative to an isotropic radiator'. In the analytically modeled embodiment depicted in FIG. 1A, the plurality of volumes 104 of dielectric materials of DRA 100 have a height of 8 mm and are cylindrical in shape with a circular cross section. However, it will be appreciated that other dimensions and cross section shapes may be employed to achieve a desired radiation pattern while remaining within the scope of the invention disclosed herein, such as a DRA with a different height or an elliptical cross section for example.

Figure 2A:
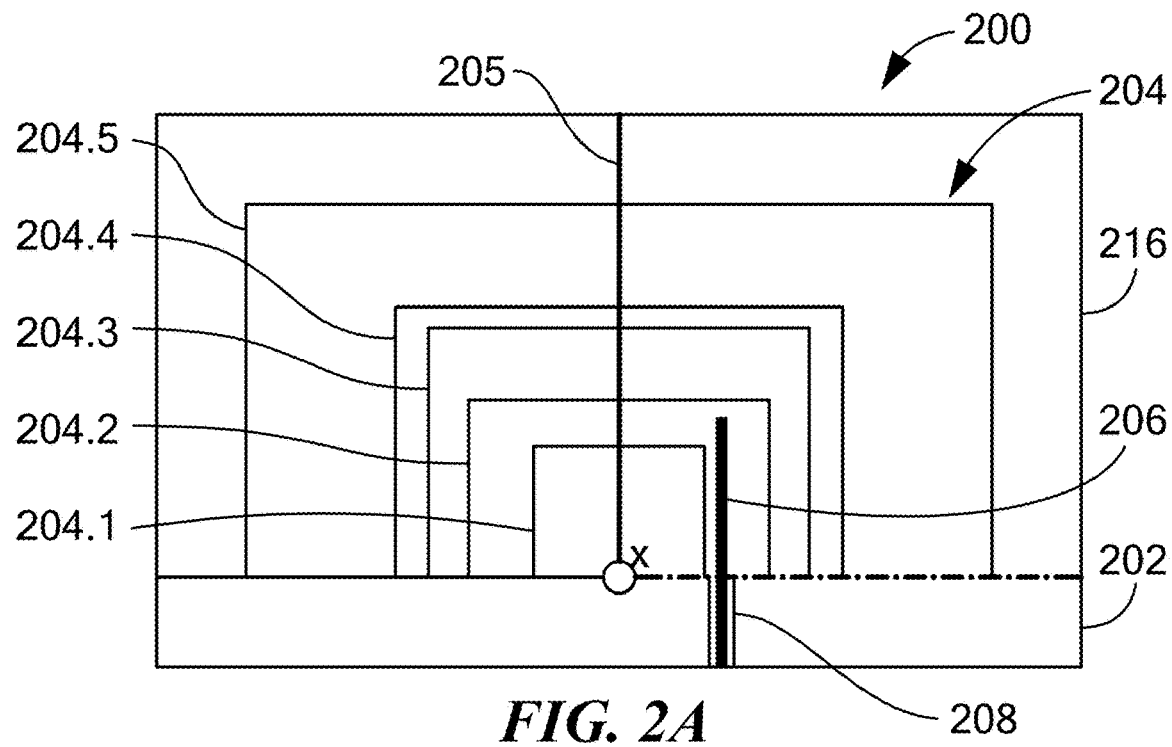
FIG. 2A depicts a block diagram side view of another DRA in accordance with an embodiment.

FIG. 2A depicts a side view of a multilayer DRA 200 in accordance with an embodiment having an electrically conductive ground structure 202, and a plurality of volumes of dielectric materials 204 disposed on the ground structure 202 comprising N volumes, N being an integer equal to or greater than 3, disposed to form successive and sequential layered volumes V(i), i being an integer from 1 to N, wherein volume V(1) forms an innermost volume 204.1, wherein a successive volume V(i+1) forms a layered shell 204.2, 204.3, 204.4 disposed over and embedding volume V(i), and wherein volume V(N) forms an outer volume 204.5 that embeds all volumes V(1) to V(N−1). As can be seen in the embodiment of FIG. 2A, N=5. However, it will be appreciated that the scope of the invention is not limited to N=5, as already previously noted.

Directly adjacent volumes of the plurality of volumes 204 of dielectric materials have different dielectric constant values that range from a relative minimum value at volume V(1) to a relative maximum value at one of volumes V(2) to V(N−1), back to a relative minimum value at volume V(N). Example dielectric constant values are discussed further below.

A signal feed 206 is disposed within an opening 208 of the ground structure 202 in non-electrical contact with the ground structure 202, wherein the signal feed 206 is disposed completely within and electromagnetically coupled to one of the plurality of volumes of dielectric materials that is other than the first volume V(1) of dielectric material 204.1. In the embodiment of FIG. 2A, the signal feed 206, is disposed completely within and electromagnetically coupled to the second volume V(2) of dielectric material 204.2.

Figure 4A:
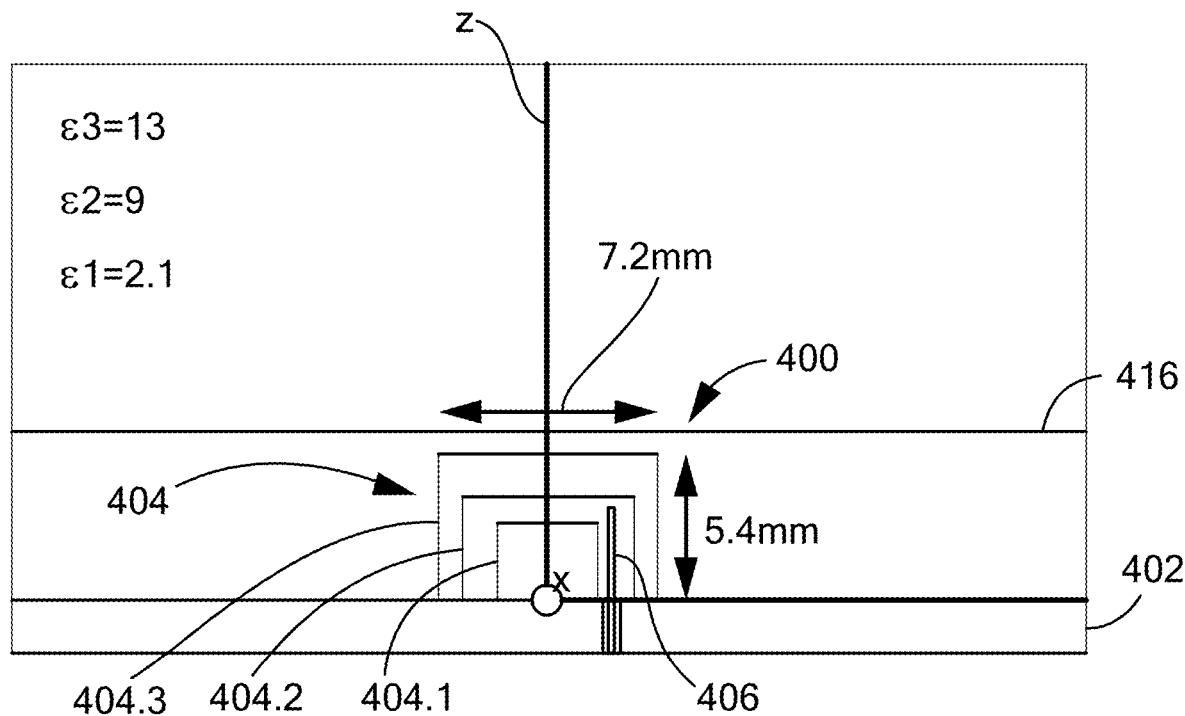
FIG. 4A depicts a block diagram side view of another DRA in accordance with an embodiment.

A DRA in accordance with an embodiment includes the plurality of volumes of dielectric materials 204 being centrally disposed relative to each other, as depicted in FIG. 2A, and FIG. 4A, which is discussed further below. That is, each volume of the plurality of volumes of dielectric materials 204 has a central longitudinal axis 205 that coexist with each other, and is perpendicular to the ground structure 202.

Figure 5A:
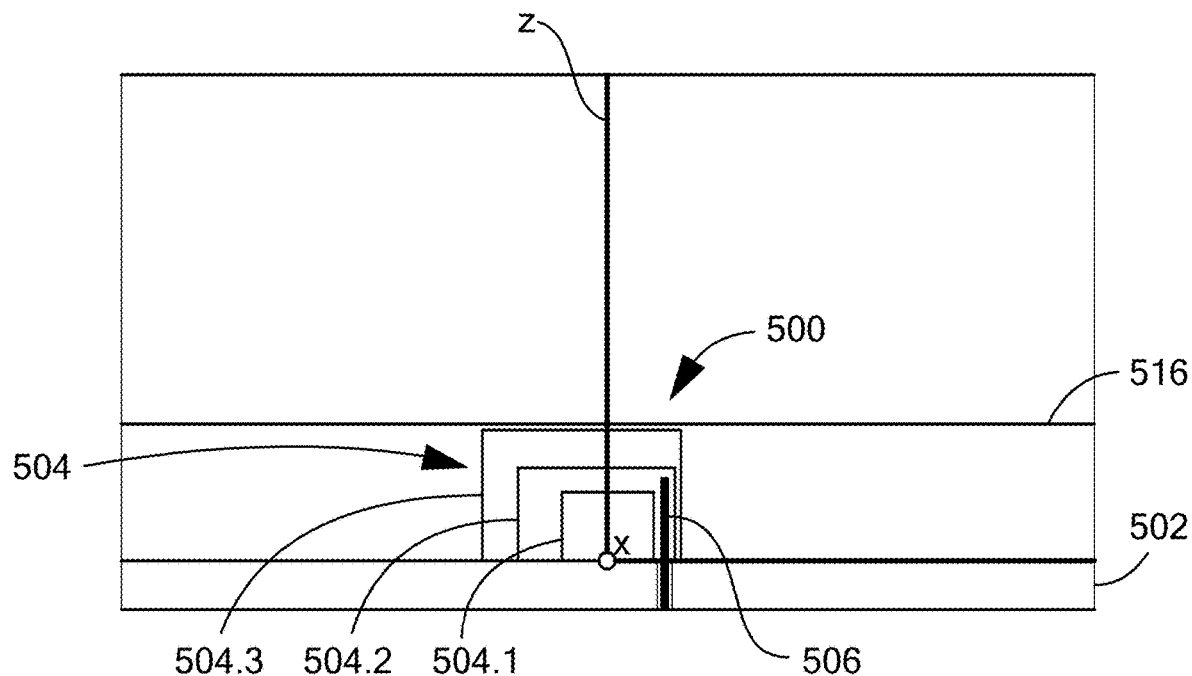
FIG. 5A depicts a block diagram side view of another DRA in accordance with an embodiment.

A DRA in accordance with another embodiment includes the plurality of volumes of dielectric materials being centrally shifted in a same sideways direction relative to each other, as depicted in FIG. 5A, which is also discussed further below.

Figure 2B:
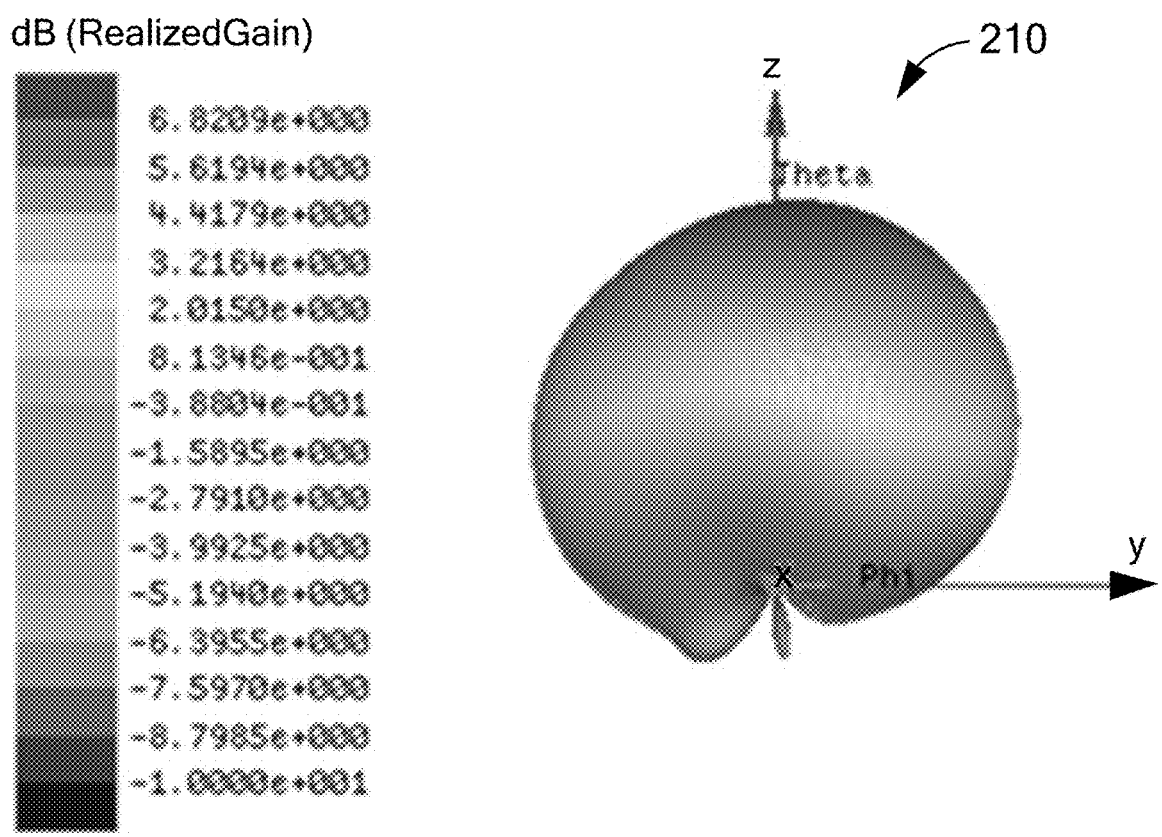
FIG. 2B depicts a field radiation pattern associated with the DRA of FIG. 2A.
Figure 2C:
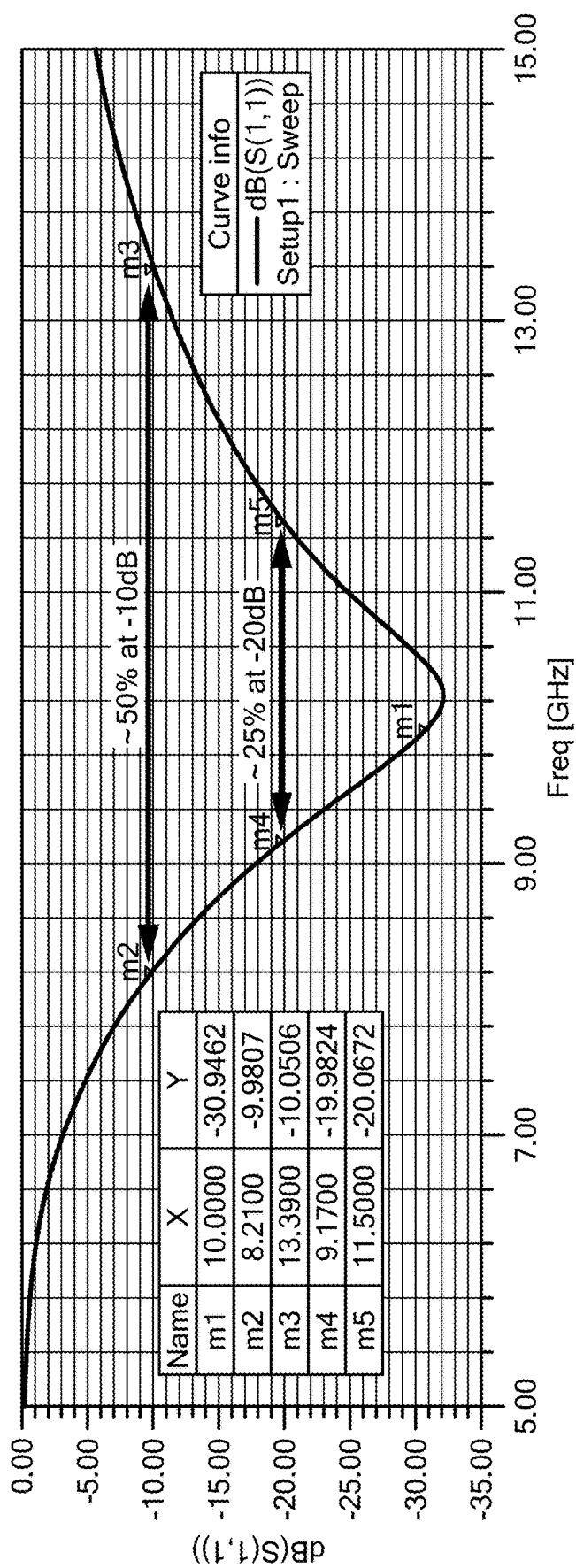
FIG. 2C depicts a return loss graph associated with the DRA of FIG. 2A.
Figure 2D:
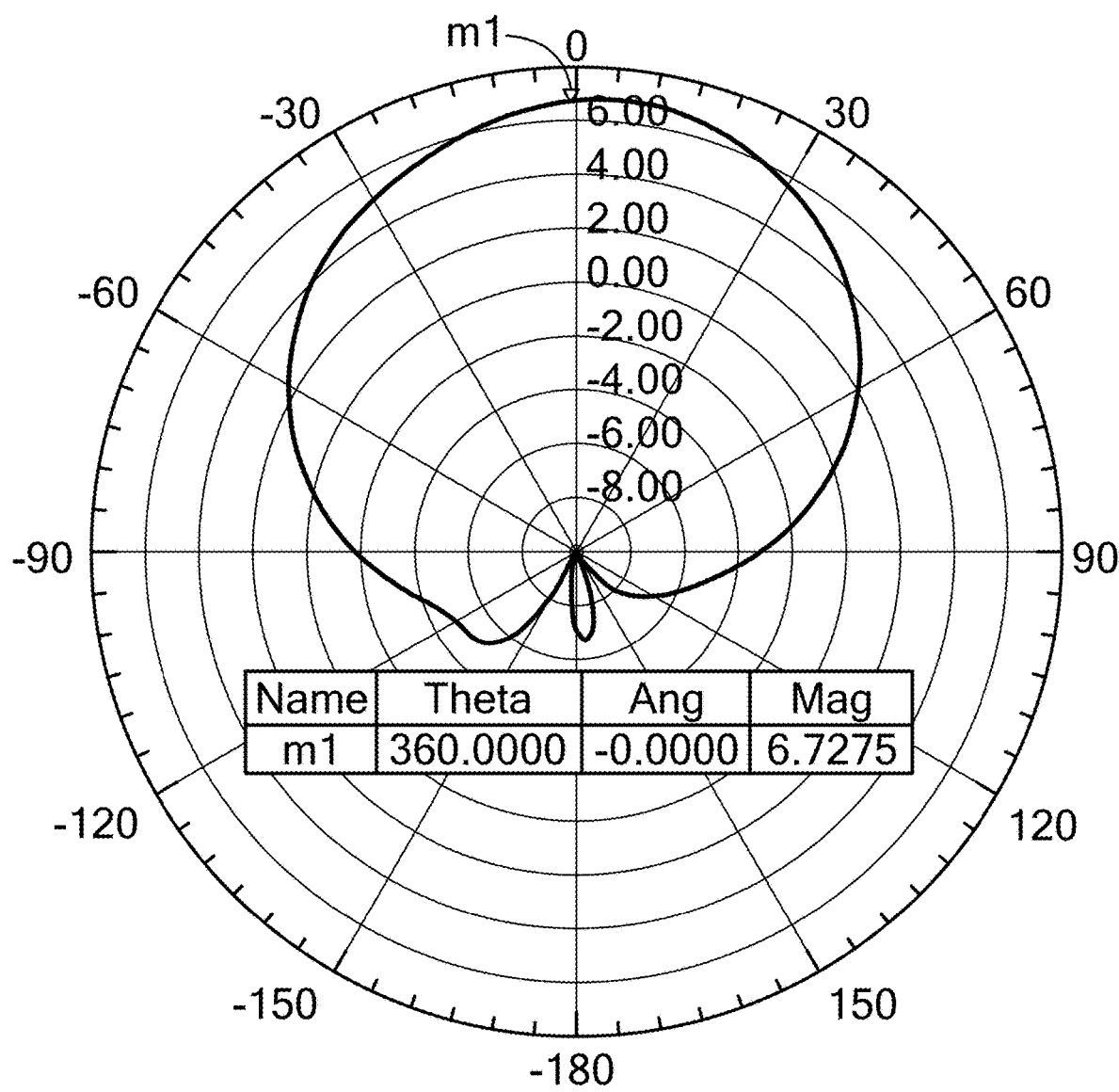
FIG. 2D depicts the gain in the elevation plane for the field radiation pattern of FIG. 2B.

The DRA 200 depicted in FIG. 2A produces the broadband omnidirectional upper half space linearly polarized radiation pattern 210 at a gain of almost 7 dB as depicted in FIGS. 2B and 2D, having about a 50% bandwidth at −10 dB and about a 25% bandwidth at −20 db as depicted in FIG. 2C. As can be seen by comparing FIG. 1A with FIG. 2A, and FIG. 1B with FIG. 2B, using similarly arranged layered shells of different dielectric materials with different excitation locations produces substantially different radiation patterns. The structural features and changes thereto that result in such differences will now be discussed with reference to FIGS. 3A-3G.

Figure 3A:
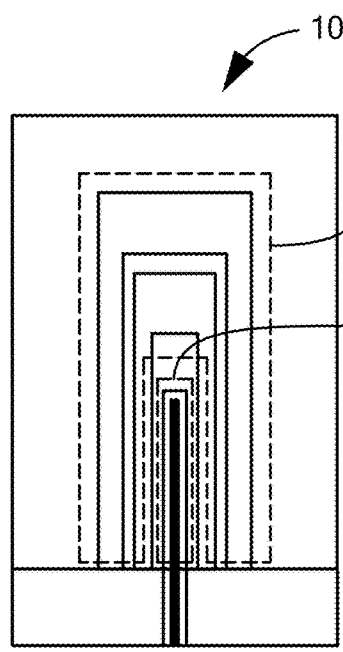
FIGS. 3A-3G depict step by step conceptual modifications to modify the DRA depicted in FIG. 1A to the DRA depicted in FIG. 2A.
Figure 3B:
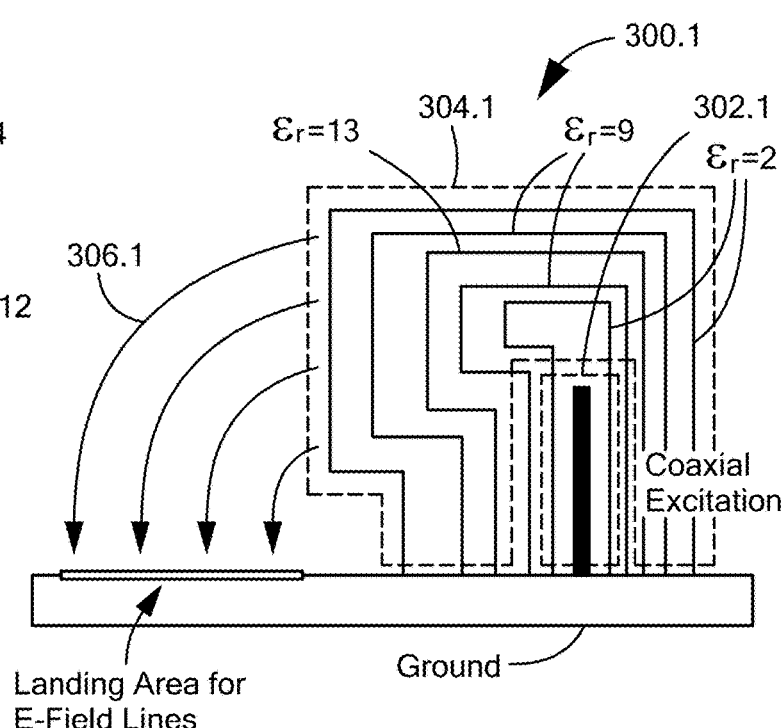
Figure 3C:
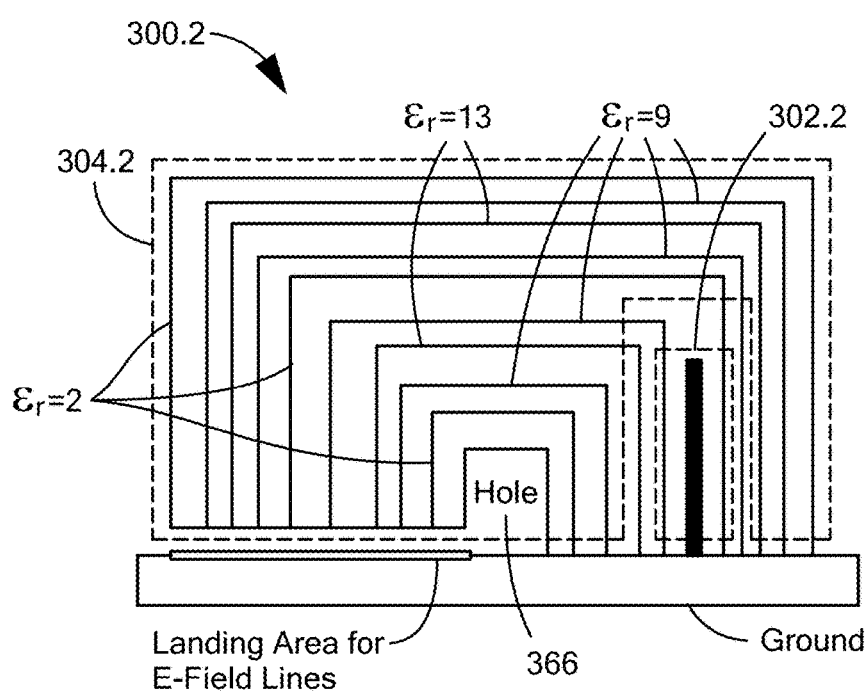
Figure 3E:
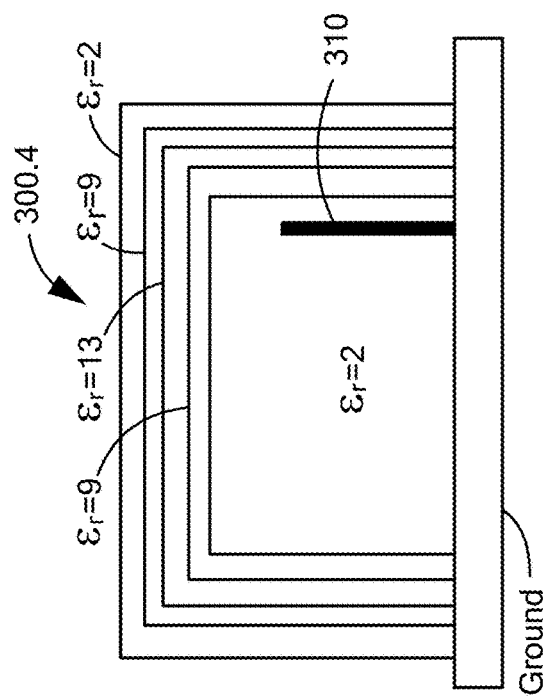
Figure 3G:
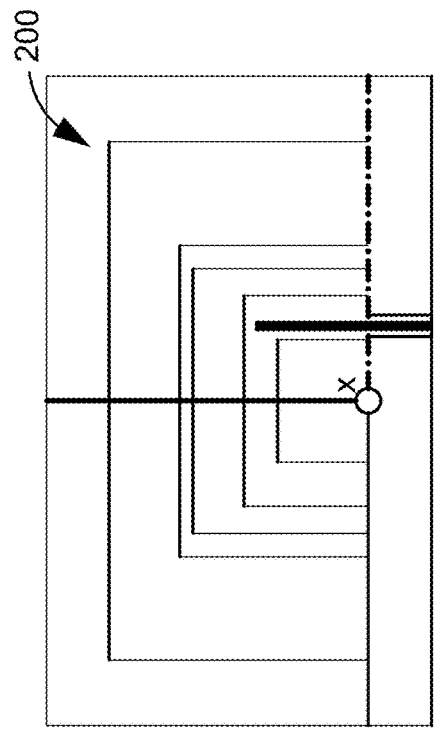
Figure 3D:
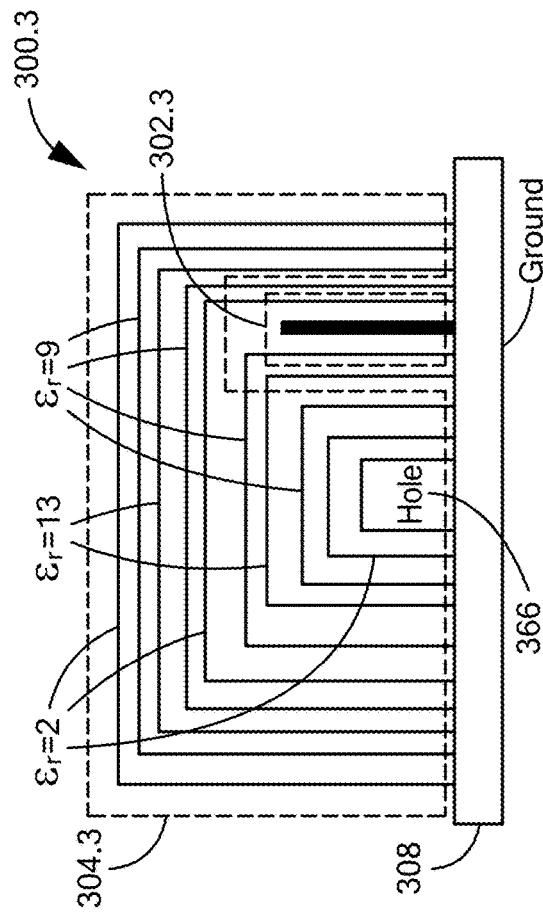
Figure 3F:
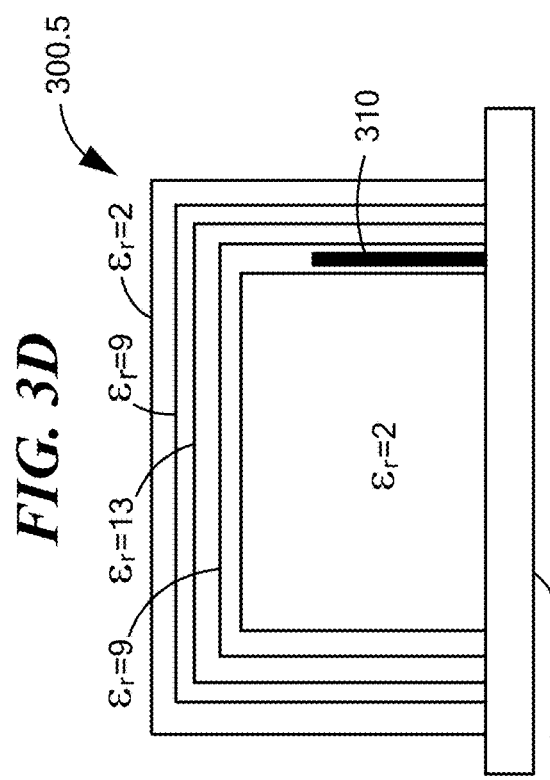

FIG. 3A depicts the DRA 100 as depicted in FIG. 1A, and FIG. 3G depicts the DRA 200 as depicted in FIG. 2A. FIGS. 3B-3F depict the conceptual steps that may be taken to modify DRA 100 into DRA 200, where both DRA's 100, 200 have five layered shells of dielectric materials having the above noted dielectric constants $\varepsilon_1=2$, $\varepsilon_2=9$, $\varepsilon_3=13$, $\varepsilon_4=9$ and $\varepsilon_5=2$. For example, in FIG. 3B the modified DRA 300.1 has a launcher portion 302.1 that is structurally similar to the launcher portion 112 of DRA 100, but has a waveguide portion 304.1 that is modified relative to the waveguide portion 114 of DRA 100. By modifying the waveguide portion 304.1 as depicted in FIG. 3B, the field lines 306.1 are bent relative to those in DRA 100, which modifies the radiation pattern mode to produce mixed symmetry and mixed polarization. In FIG. 3C, the waveguide portion 304.2 is further modified to further bend the field lines to produce further mixed symmetry, mixed pattern mode, and mixed linear-circular polarization. In the embodiment of FIG. 3C, the bending of the waveguide portion 304.2 results in a hole 306 (e.g., air), and results in a structure appearing to have nine layered shells of dielectric materials with the hole 306 embedded therein. By completing the half loop of the waveguide portion 304.3 to now be coupled to the ground structure 308, as depicted in FIG. 3D, linear polarization of the radiation pattern results. In the embodiment of FIG. 3D, the hole 306 is now fully enclosed by the nine layered shells of dielectric materials. In FIG. 3E, the central hole 306 (depicted in FIG. 3D) and the four internal layers of dielectric materials (depicted in FIG. 3D) are removed, which creates a DRA 300.4 having five layered shells of dielectric material having again the above noted dielectric constants $\varepsilon_1=2$, $\varepsilon_2=9$, $\varepsilon_3=13$, $\varepsilon_4=9$ and $\varepsilon_5=2$. However, contrary to DRA 100, DRA 300.4 has a signal feed 310 that is no longer centrally disposed with respect to the layered shells of dielectric materials. The embodiment of FIG. 3E results in enhanced bandwidth with linear polarization, but an asymmetrical radiation pattern. By placing the signal feed 310 in the second shell V(2), as depicted in FIG. 3F, a better match, and improved symmetry of the radiation pattern results. FIG. 3G depicts the final conversion step of modifying the proportions of the layered shells of dielectric materials to arrive at the structure of DRA 200, which results in a multilayer DRA design having a broadband omnidirectional upper half space linearly polarized radiation pattern, as depicted in FIG. 2B.

As can be seen from the foregoing, variations to the arrangement of the layered shells of dielectric materials and the placement of the signal feed within the layered shells can result in substantially different, tailored, radiation patterns for a given DRA. Other embodiments of DRA's falling within the scope of the invention will now be described with reference to FIGS. 4-12.

Figure 4B:
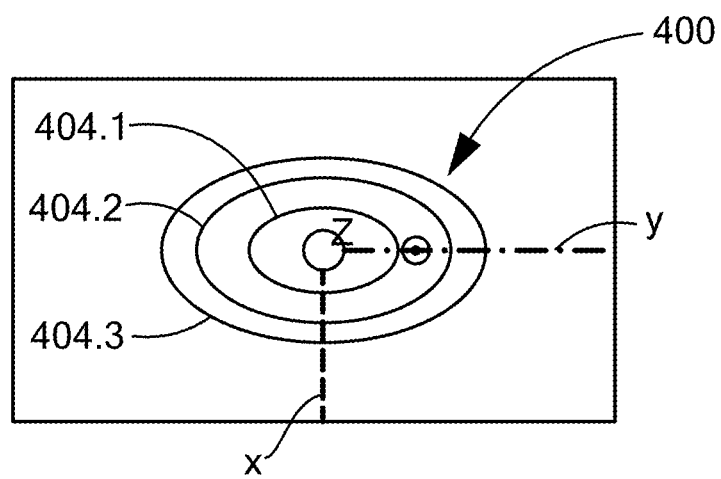
FIG. 4B depicts a block diagram top-down foot print view of the DRA of FIG. 4A.

FIGS. 4A and 4B depict a DRA 400 similar to that of DRA 200, but with three layered shells of dielectric materials as opposed to five. Similar to DRA 200, DRA 400 has a ground structure 402 with a plurality of volumes of dielectric materials 404 disposed on the ground structure 402. In the non-limiting embodiment depicted in FIGS. 4A, 4B, the first volume V(1) 404.1 has a dielectric constant $\varepsilon_1=2.1$, the second volume V(2) 404.2 has a dielectric constant $\varepsilon_2=9$, and the third volume V(3) 404.3 has a dielectric constant $\varepsilon_3=13$. Similar to the embodiment of FIG. 2A, the embodiment of FIG. 4A has a signal feed 406 disposed completely within the second volume V(2) 404.2. Also similar to the embodiment of FIG. 2A, the embodiment of FIG. 4A has the plurality of volumes of dielectric materials 404 centrally disposed relative to each other, with a respective central longitudinal axis 405 of each volume coexisting with each other and oriented perpendicular to the ground structure 402. As depicted in FIG. 4B, the plurality of volumes of dielectric materials 404 have an elliptical cross section shape, which is non-limiting as other embodiments disclosed herein have other than an elliptical cross section shape, but is merely intended to illustrate the use of different shapes to realize different radiation patterns. In the analytically modeled embodiment depicted in FIGS. 4A, 4B, the plurality of volumes of dielectric materials 404 of DRA 400 have a height of 5.4 mm and an outside dimension along the longitudinal axis of the ellipse of 7.2 mm.

Figure 5B:
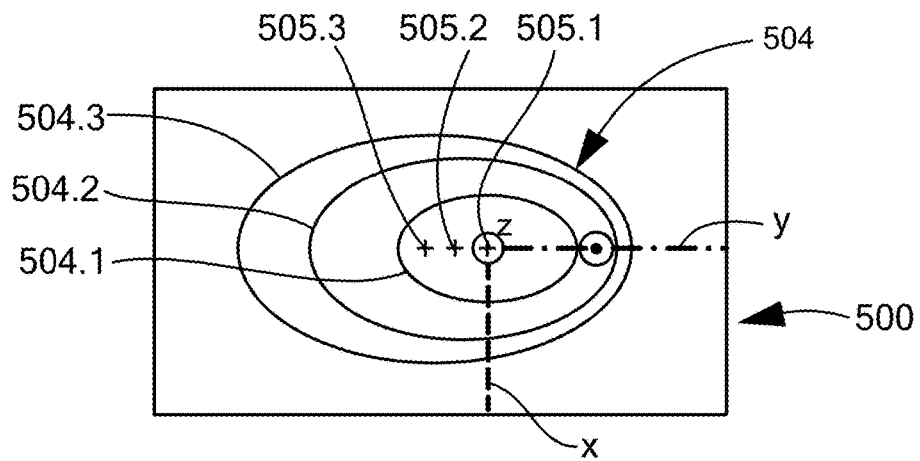
FIG. 5B depicts a block diagram top-down foot print view of the DRA of FIG. 5A.

FIGS. 5A and 5B depict a DRA 500 similar to that of DRA 400, but with each volume of the plurality of volumes of dielectric materials 504 (layered shells 504.1, 504.2, 504.3) having a central longitudinal axis 505.1, 505.2, 505.3 that is parallel and centrally sideways shifted in a same sideways direction relative to each other, coupled to a ground structure 502, with a signal feed 506 disposed within the second volume V(2) 504.2, and with each central longitudinal axis 505.1-505.3 being perpendicular to the ground structure 502. By shifting the shells, a more balanced gain about the z-axis can be achieved. By balancing the gain, it is contemplated that the gain of a single DRA can approach 8 dB with near field spherical symmetry in the radiation pattern.

Figure 6A:
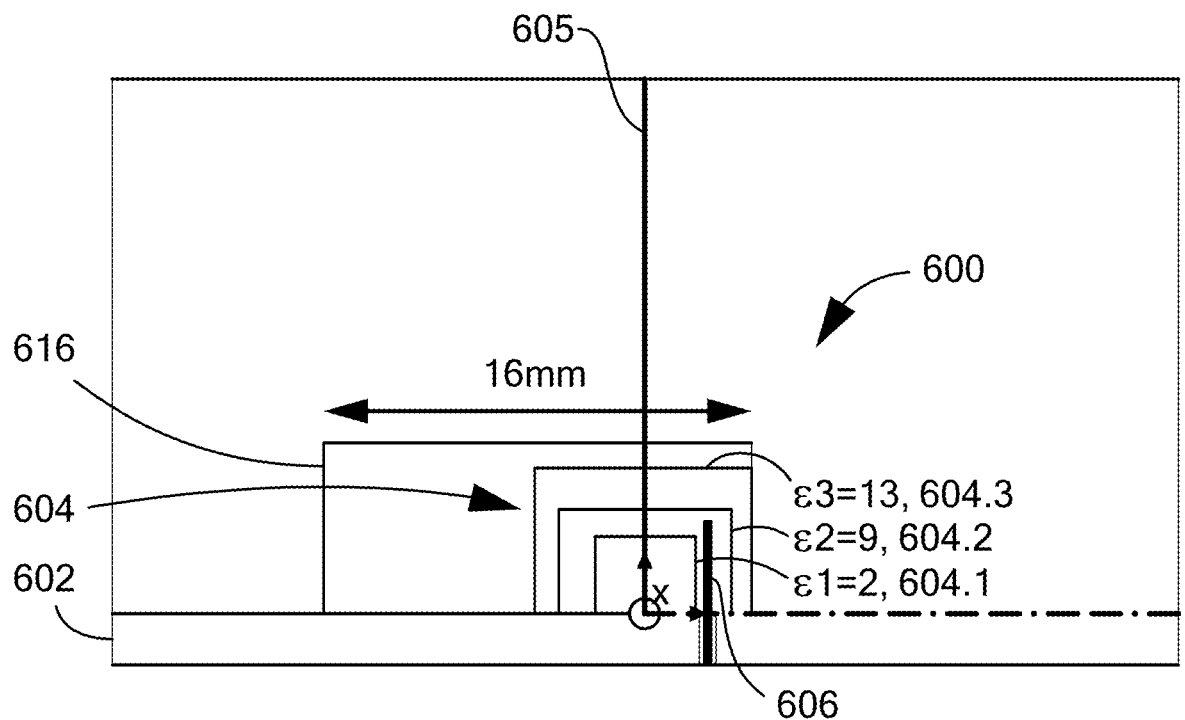
FIG. 6A depicts a block diagram side view of another DRA in accordance with an embodiment.
Figure 6B:
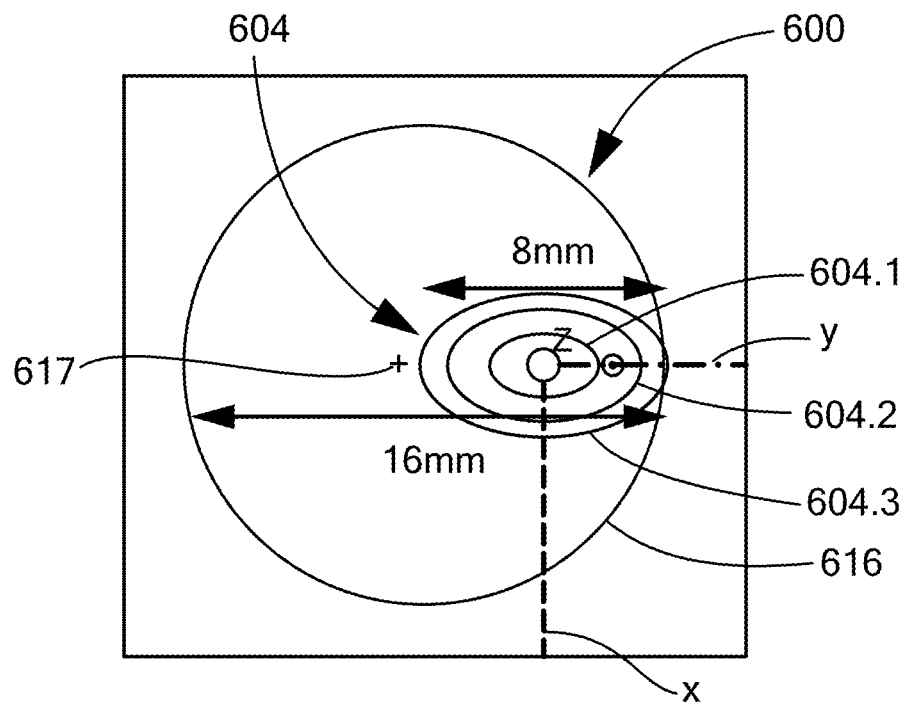
FIG. 6B depicts a block diagram top-down foot print view of the DRA of FIG. 6A.

FIGS. 6A and 6B depict a DRA 600 similar to that of DRA 400, but with the plurality of volumes of the dielectric materials 604 (layered shells 604.1, 604.2, 604.3) being embedded within a container 616, such as a dielectric material having a dielectric constant between 1 and 3, for example, and where each volume of the plurality of volumes of dielectric materials 604 has a central longitudinal axis 605 that is parallel and centrally disposed relative to each other, and the plurality of volumes of dielectric materials 604 is centrally shifted in a sideways direction relative to a central longitudinal axis 617 of the container 616, and are coupled to a ground structure 602 with a signal feed 606 disposed within the second volume V(2) 604.2. The central longitudinal axis 617 of the container 616 is disposed perpendicular to the ground structure 602 and parallel to the central longitudinal axes 605 of each volume of the plurality of volumes of dielectric materials 604. Such an arrangement where the plurality of volumes of dielectric materials are centrally disposed relative to each other, and are centrally shifted in a sideways direction relative to the container, is another way of achieving a desired balanced gain. In the analytically modeled embodiment depicted in FIGS. 6A, 6B, the plurality of volumes of dielectric materials 604 of DRA 600 have an outside dimension along the longitudinal axis of the ellipse of 8 mm, and the container 616 has a foot print diameter of 16 mm.

With reference to FIGS. 6A and 6B it is noteworthy to mention that, in an embodiment, the plurality of volumes of dielectric materials 604 define therein a first geometrical path having a first direction that extends from the signal feed 606 to a diametrically opposing side of the plurality of volumes of dielectric materials 604, and define therein a second geometrical path having a second direction that is orthogonal to the first direction of the first geometrical path, the second geometrical path having an effective dielectric constant that is less than an effective dielectric constant of the first geometrical path by virtue of the ellipsoidal shapes of the plurality of volumes of dielectric materials 604. By adjusting the effective dielectric constant along the second geometrical path to be less than the effective dielectric constant along the first geometrical path, the main path for the E-field lines will be along the favored first geometrical path (from the signal feed toward the diametrically opposing side in a direction of the major axis of the ellipsoids), the resulting DRA 600 will provide a favored TE-mode radiation along the first geometrical path and will provide suppression of undesired TE-mode radiation along the disfavored second geometrical path (orthogonal to the first geometrical path in a direction of the minor axis of the ellipsoids), an undesirable second geometrical path for the E-field lines will be in a direction orthogonal to the main first geometrical path. And from all that is disclosed herein, it will be appreciated that the herein above described adjustment of the effective dielectric constant along the second geometrical path to be less than that along the first geometrical path will be independent of the type of signal feed employed.

As a practical matter, the layered volumes of dielectric materials discussed herein with respect to DRA's 100, 200, 400, and 500 may also be embedded within a respective container 116, 216, 416 and 516, and can be either centrally disposed or sideways shifted with respect to the associated container in a manner disclosed herein for a purpose disclosed herein. Any and all such combinations are considered to be within the scope of the invention disclosed herein.

It will be appreciated from the foregoing that the container 116, or any other enumerated container disclosed herein with reference to other figures, may in some instances be the outermost volume V(N), where the term container and the term outermost volume V(N) are used herein to more specifically describe the geometric relationships between the various pluralities of volumes of dielectric materials disclosed herein.

Figure 7A:
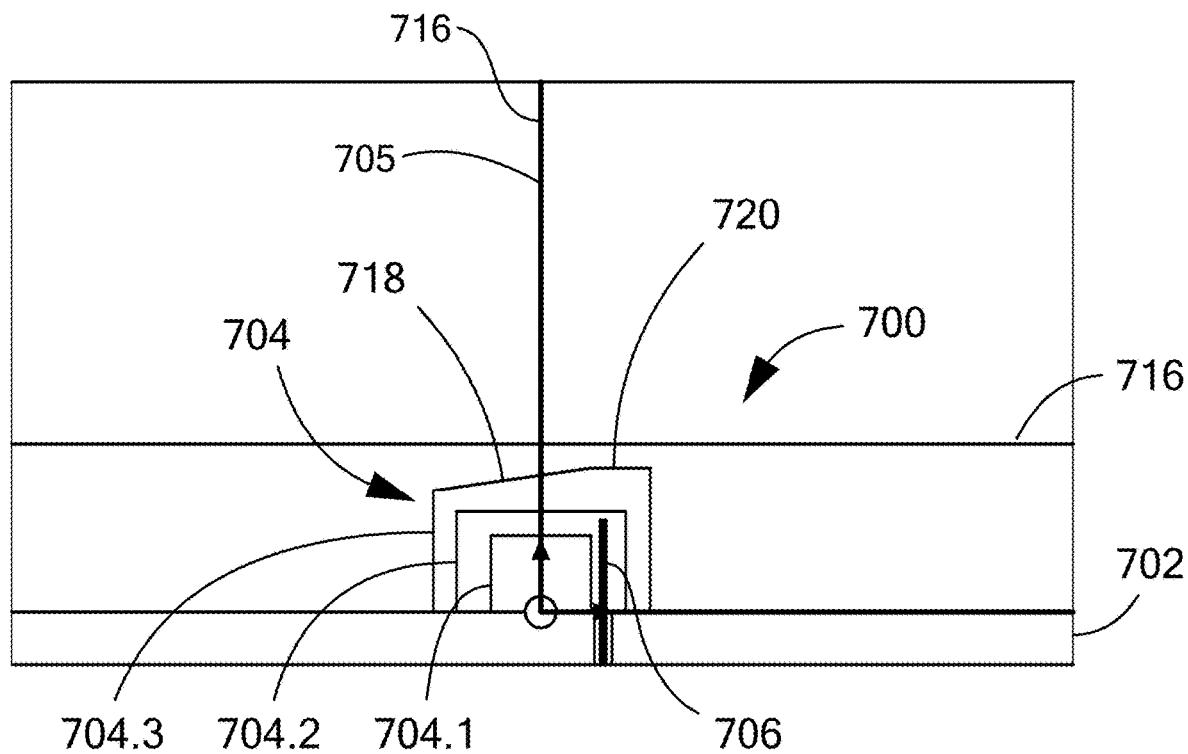
FIG. 7A depicts a block diagram side view of another DRA in accordance with an embodiment.
Figure 7B:
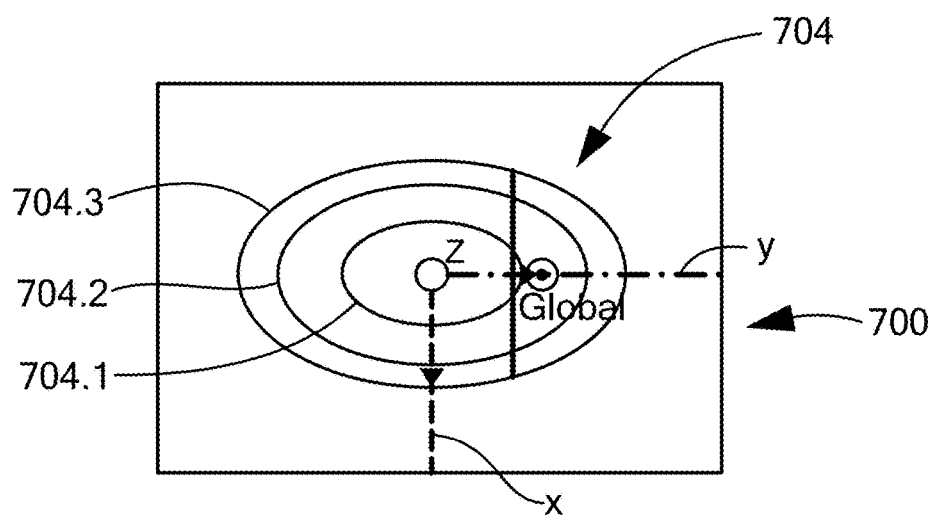
FIG. 7B depicts a block diagram top-down foot print view of the DRA of FIG. 7A.

Another way of achieving a desired balanced gain is depicted in FIGS. 7A and 7B, which depict a DRA 700 comprising a container 716 disposed on the ground structure 702, the container 716 composed of a cured resin having a dielectric constant between 1 and 3, wherein the plurality of volumes of dielectric materials 704 (layered shells 704.1, 704.2, 704.3) are embedded within the container 716 with a signal feed 706 disposed within the second volume V(2) 704.2, wherein each volume of the plurality of volumes of dielectric materials 704 has a central longitudinal axis 705 that is centrally disposed relative to each other, and centrally disposed relative to a longitudinal axis 717 of the container 716, and wherein the outer volume V(3) 704.3 of the plurality of volumes of dielectric materials 704 has an asymmetrical shape, as represented by an angled top portion 718 and a flat top portion 720, which serves to reshape the emitted radiation pattern to produce a desired balance gain. The central longitudinal axis 717 of the container 716 is disposed perpendicular to the ground structure 702 and parallel to the central longitudinal axes 705 of each volume of the plurality of volumes of dielectric materials 704. While only the outer volume V(3) 704.3 is depicted having an asymmetrical shape, it will be appreciated that other layers may also be formed with an asymmetrical shape. However, applicant has found through analytical modeling that the formation of an asymmetrical shape in just the outer layer V(N) is enough to change the radiation pattern for achieving a desired balanced gain.

Figure 8A:
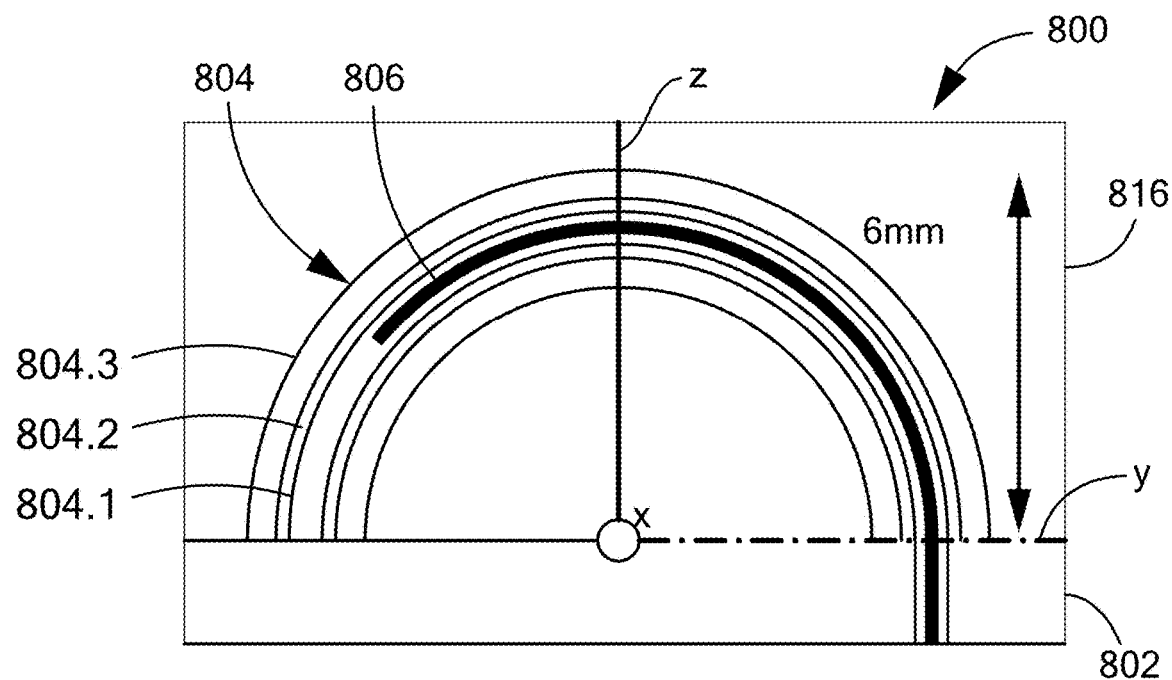
FIG. 8A depicts a block diagram side view of another DRA in accordance with an embodiment.
Figure 8B:
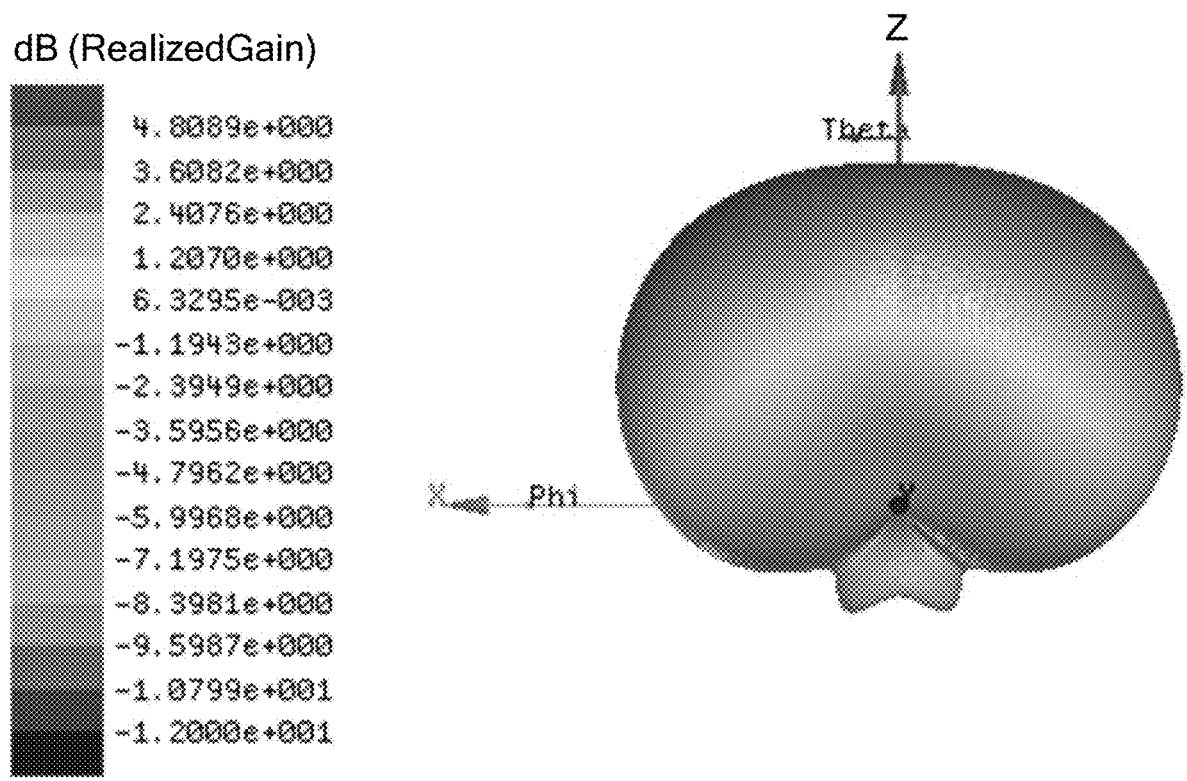
FIG. 8B depicts a field radiation pattern associated with the DRA of FIG. 8A.
Figure 8C:
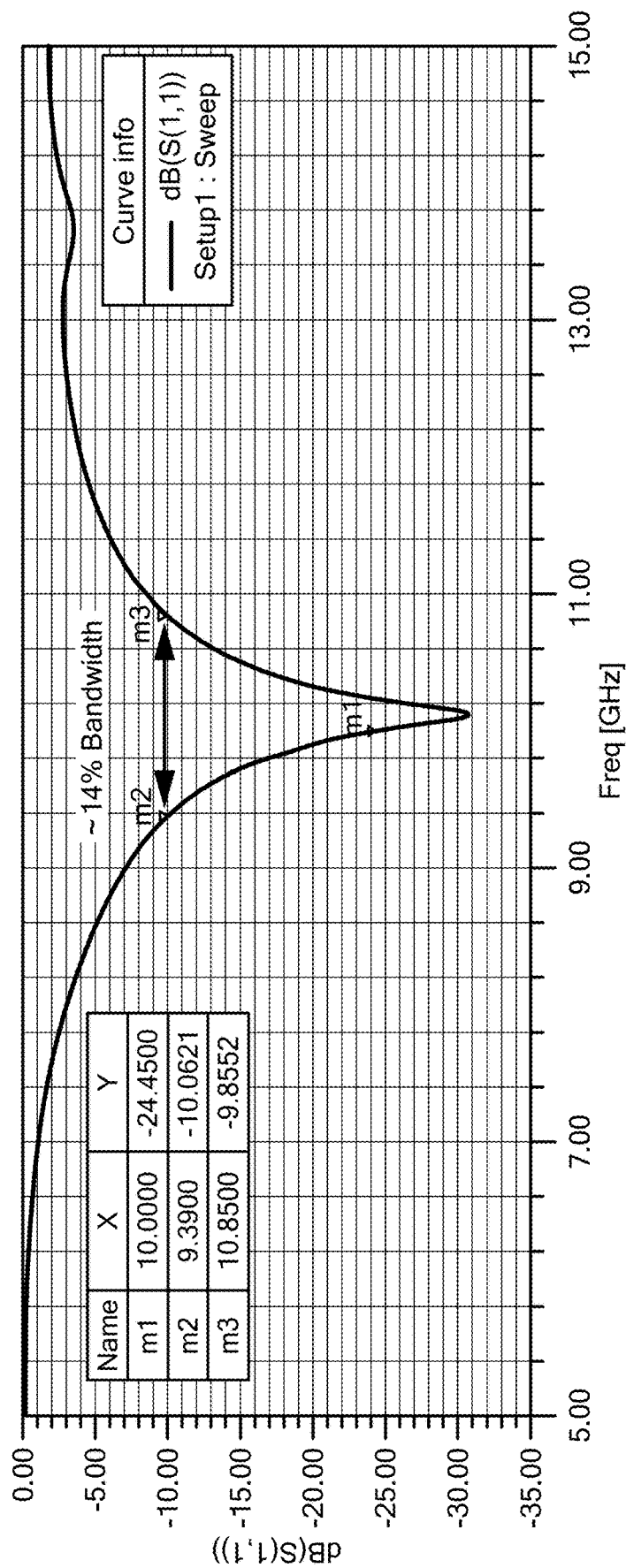
FIG. 8C depicts a return loss graph associated with the DRA of FIG. 8A.

A variation of the whip-type DRA depicted in FIG. 1A is depicted in FIG. 8A, which depicts a DRA 800 wherein each volume of the plurality of volumes of dielectric materials 804 (layered shells 804.1, 804.2, 804.3) and the embedded signal feed 806 form an arch, and wherein each arched volume of the plurality of volumes of dielectric materials 804 has both of its ends 803, 805 disposed on the ground structure 802, and are embedded in a container 816 having a dielectric constant between 1 and 3. The bending of the plurality of volumes of dielectric materials 804 and the embedded signal feed 806 to form an arch provides for a DRA with a shorter height, such as 6 mm as compared to 8 mm for example. Such an arrangement can be used to couple to the magnetic field and provides a good gain and good symmetry in the radiation pattern, as depicted in FIG. 8B, but has a narrow bandwidth of about 14% at −10 dB, as depicted in FIG. 8C.

Figure 9A:
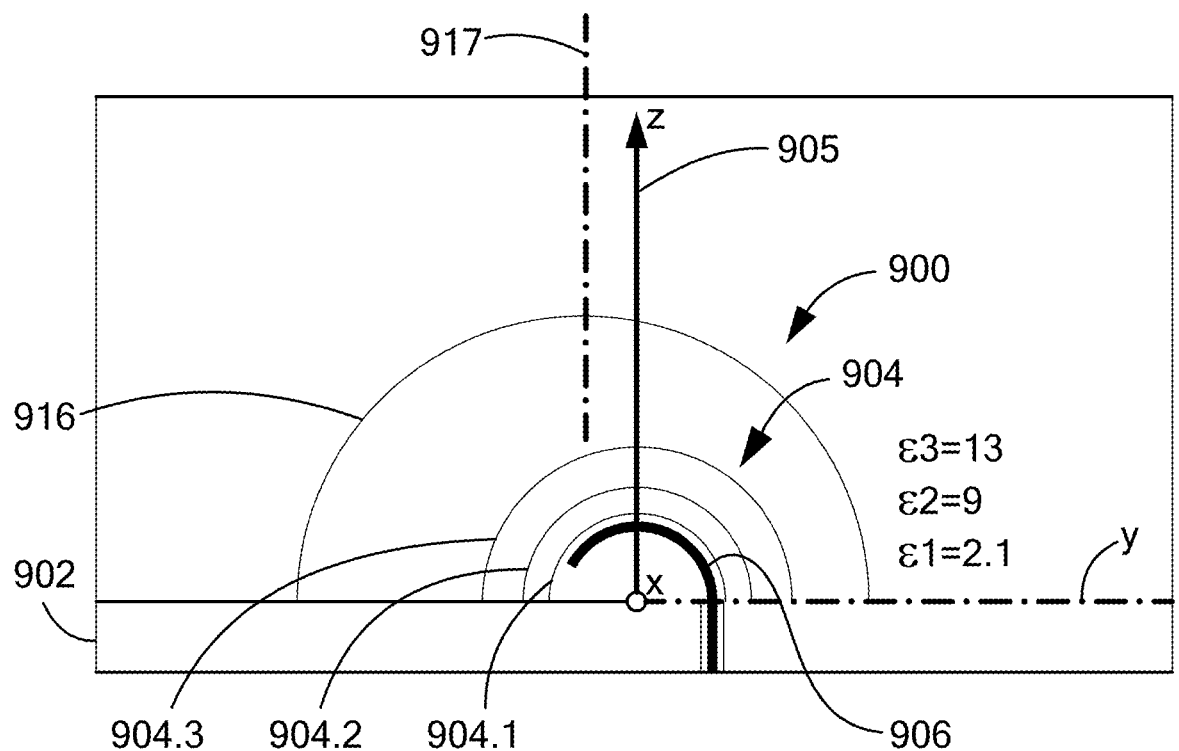
FIG. 9A depicts a block diagram side view of another DRA in accordance with an embodiment.
Figure 9B:
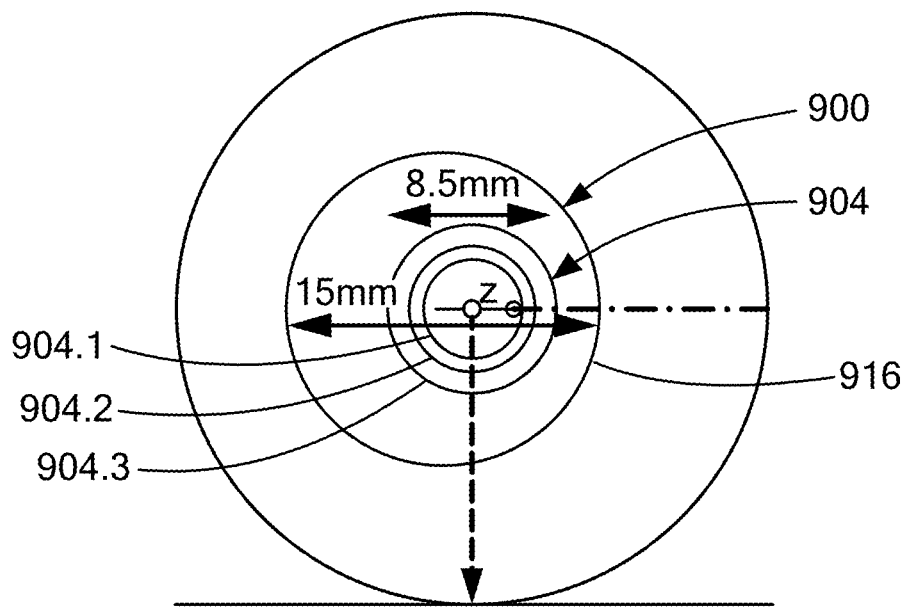
FIG. 9B depicts a block diagram top-down foot print view of the DRA of FIG. 9A.

Another variation of a DRA in accordance with an embodiment is depicted in FIGS. 9A and 9B. Here, the DRA 900 is configured with each volume of the plurality of volumes of dielectric materials 904 having an hemispherical shape and are collectively embedded in a container 916 having an hemispherical shape, disposed on the ground structure 902, and composed of a cured resin having a dielectric constant between 1 and 3, such as 2.1 for example. In the embodiment of DRA 900, the signal feed 906 is disposed within and electromagnetically coupled to the first volume V(1) of dielectric material 904.1, is arched within the first volume V(1) of dielectric material 904.1 and enters the first volume V(1) 904.1 off center from a zenith axis 905 of the first volume V(1). In the embodiment of DRA 900 depicted in FIGS. 9A, 9B, there are three layered shells of dielectric materials 904. In an embodiment, the first volume V(1) 904.1 has a dielectric constant $\varepsilon_1$=2.1, the second volume V(2) 904.2 has a dielectric constant $\varepsilon_2$=9, and the third volume V(3) 904.3 has a dielectric constant $\varepsilon_3$=13. The relatively low dielectric constant of the container 916 serves to provide the above noted relative minimum dielectric constant on an outer layer of the DRA 900. As depicted in FIGS. 9A, 9B, each volume of the plurality of volumes of dielectric materials 904 has a zenith axis 905 that is centrally disposed relative to each other, and the plurality of volumes of dielectric materials are centrally shifted in a sideways direction relative to a zenith axis 917 of the container 916, which again provides for a balanced gain. In the analytically modeled embodiment depicted in FIGS. 9A, 9B, the plurality of volumes of dielectric materials 904 of DRA 900 have a foot print diameter of 8.5 mm, and the container 916 has a foot print diameter of 15 mm.

Because of the arched signal feeds 806 and 906 of the embodiments of FIGS. 8A and 9A, each respective DRA 800, 900 couples to the magnetic fields, as opposed to the electric fields of those embodiments not having an arched signal feed.

Figure 10A:
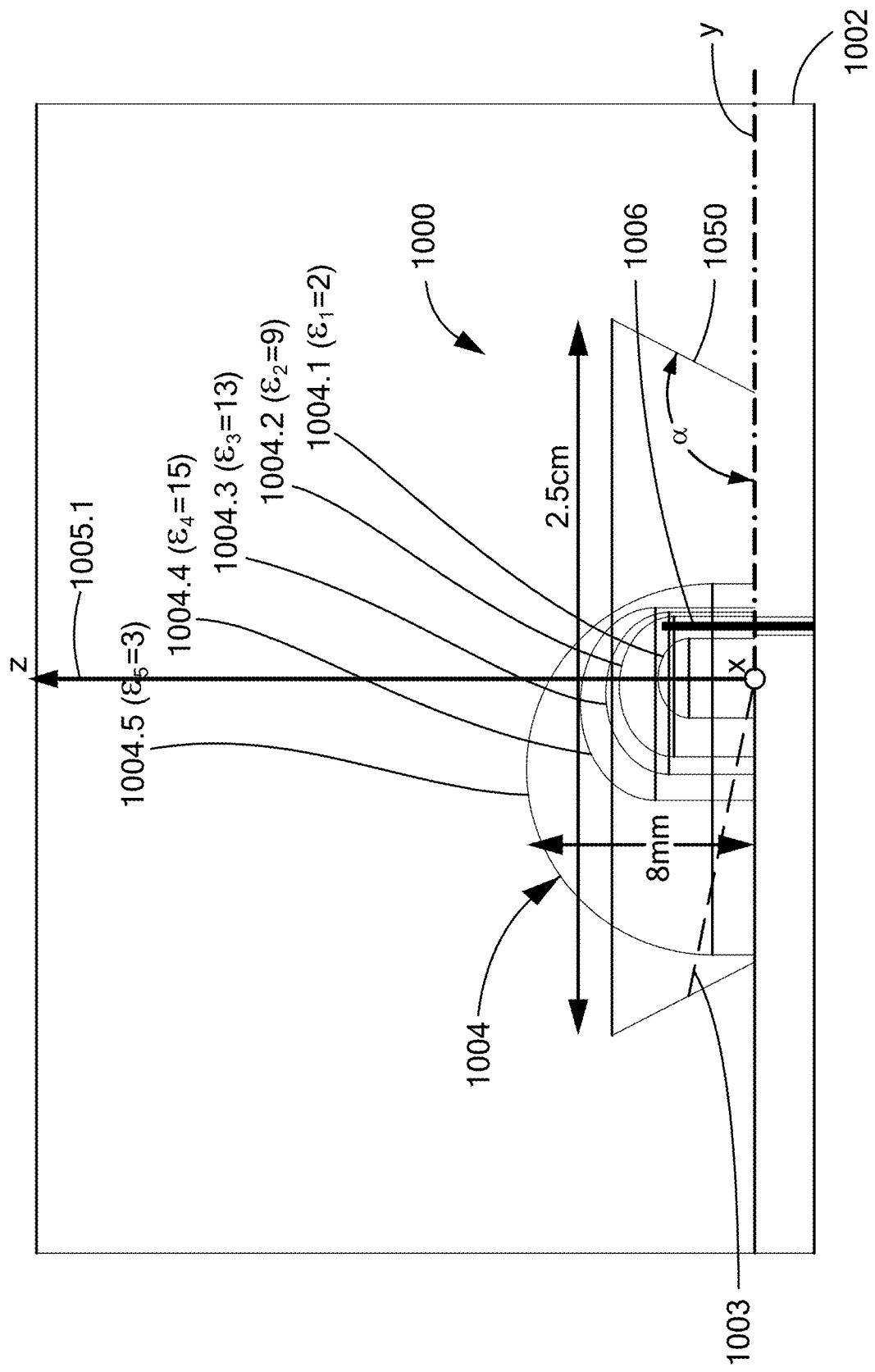
FIG. 10A depicts a block diagram side view of another DRA in accordance with an embodiment.
Figure 10B:
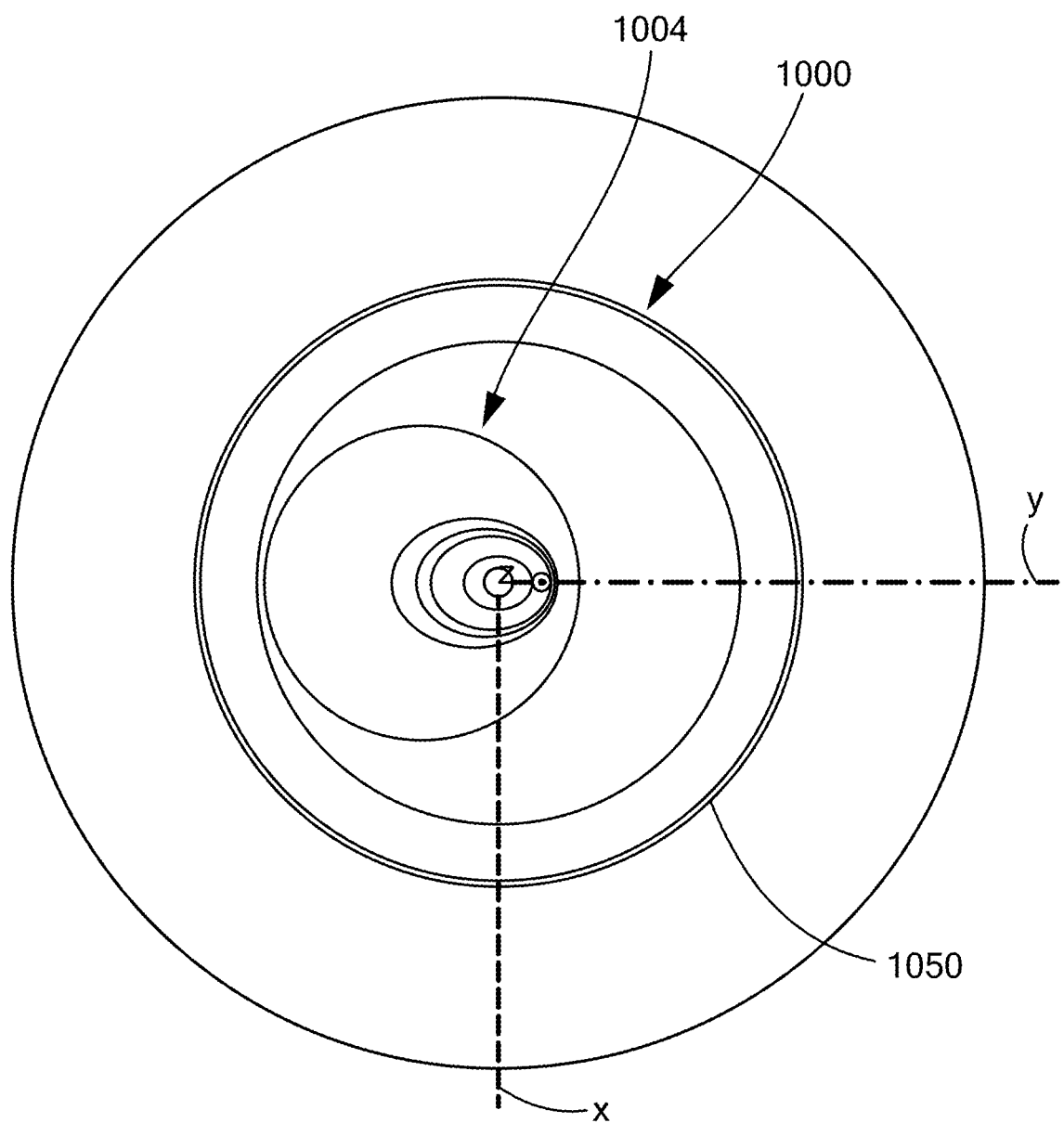
FIG. 10B depicts a block diagram top-down foot print view of the DRA of FIG. 10A.
Figure 10C:
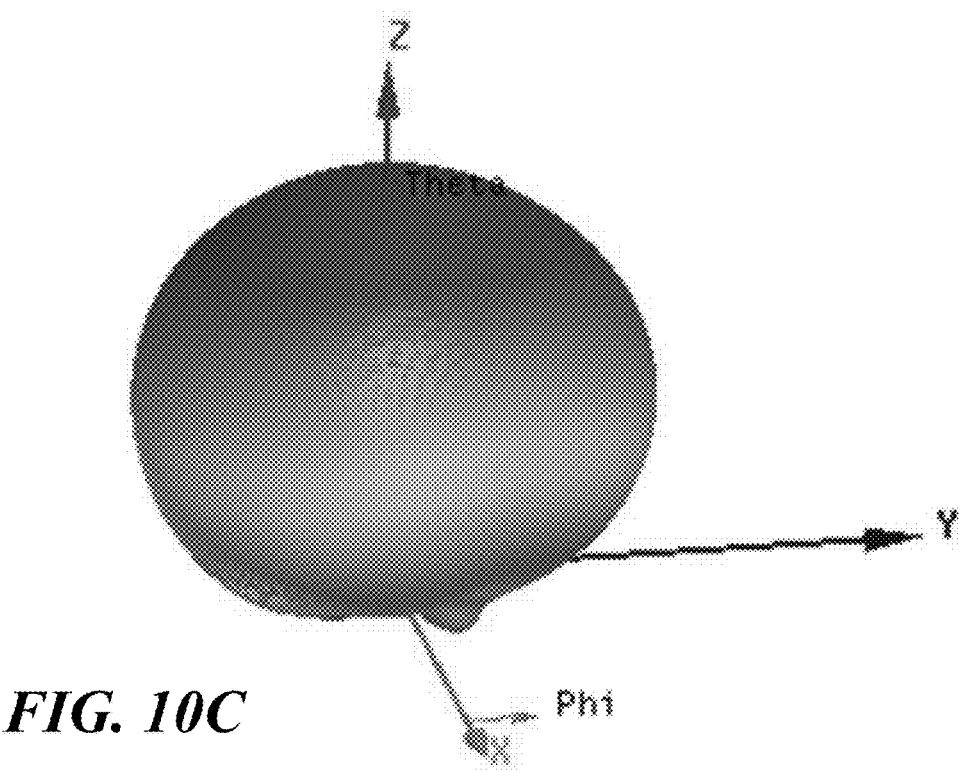
FIG. 10C depicts a field radiation pattern associated with the DRA of FIG. 10A.
Figure 10D:
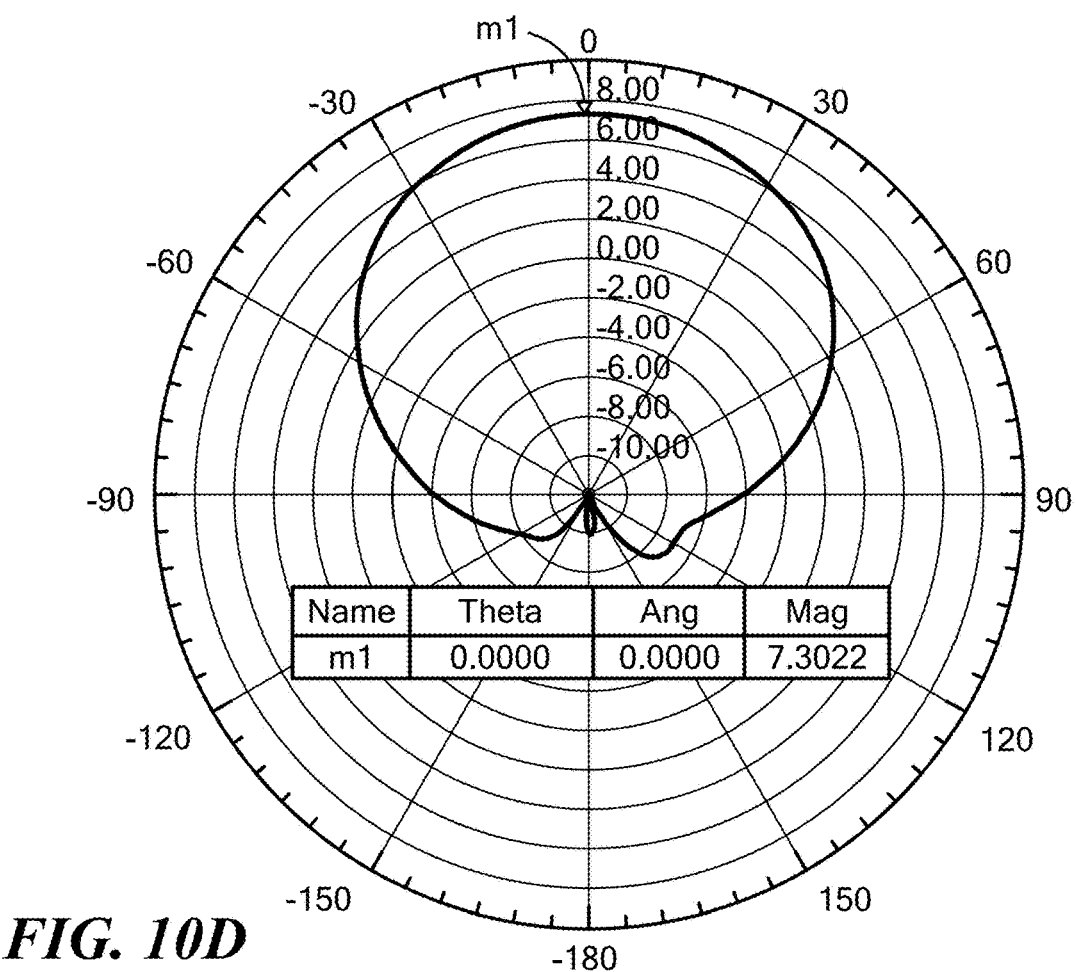
FIG. 10D depicts the gain in the elevation plane for the field radiation pattern of FIG. 10C.
Figure 10E:
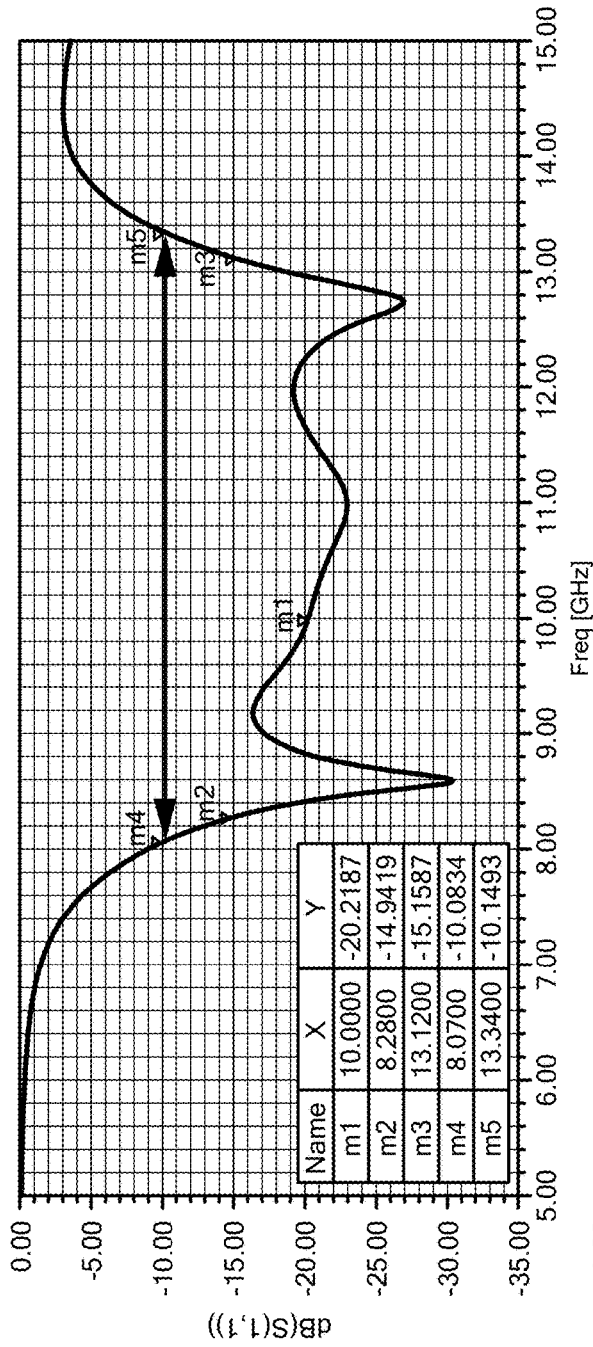
FIG. 10E depicts a return loss graph associated with the DRA of FIG. 10A.

Reference is now made to FIGS. 10A-10F, which depict another version of a DRA in accordance with an embodiment. FIGS. 10A and 10B depict a DRA 1000 having layered shells of volumes of dielectric materials 1004 having a signal feed 1006 disposed with the second volume V(2) 1004.2, similar to embodiments discussed above, but wherein each volume of the plurality of volumes of dielectric materials 1004 has an elongated dome shape oriented lengthwise to its respective longitudinal axis, see axis 1005.1 associated with volume V(1) 1004.1 for example, and further comprising an electrically conductive fence 1050 (also herein referred to and recognized in the art as being an electrically conductive electromagnetic reflector, which may herein be referred to simply as a fence or reflector for short) disposed circumferentially around the plurality of volumes of dielectric materials 1004, wherein the fence 1050 is electrically connected with and forms part of the ground structure 1002. In an embodiment, DRA 1000 has five layers of dielectric materials 1004 having respective dielectric constants $\varepsilon_1$=2, $\varepsilon_2$=9, $\varepsilon_3$=13, $\varepsilon_4$=15 and $\varepsilon_5$=3. In the embodiment of DRA 1000, the first volume V(1) 1004.1 is centrally disposed relative to a center of the circumference of the fence 1050, and all other volumes V(2)-V(5) 1004.2-1004.5 are sideways shifted in a same direction (to the left in the views of FIGS. 10A, 10B). The combination of the layered shells of dielectric materials of different dielectric constants, plus the dome shapes, plus the sideways shift, and plus the fence, results in a high gain multilayer DRA at 10 GHz resonance in accordance with an embodiment having a desired radiation pattern as depicted in FIG. 10C, a realized gain of 7.3 dB as depicted in FIG. 10D, and a desired return loss as depicted in FIG. 10E. In the analytically modeled embodiment depicted in FIGS. 10A and 10B, the fence 1050 has a plan view maximum diameter of 2.5 cm, and the outermost volume V(5) has a height of 8 mm. In an embodiment, the fence/reflector 1050 has a height that is equal to or greater than 0.2 times the overall height of the plurality of volumes of dielectric materials 1004 and equal to or less than 3 times, or equal to or less than 0.8 times, the overall height of the plurality of volumes of dielectric materials 1004.

As depicted in FIG. 10A, the fence 1050 has sidewalls that are sloped outward relative to the z-axis at an angle α relative to the ground structure 1002, which serves to suppress signal resonance within the inner boundaries of the fence 1050. In an embodiment, the angle α is equal to or greater than 90-degrees and equal to or less than 135-degrees. It will be appreciated, however, that other shapes to the sidewalls of fence 1050 may be employed for the same or similar end result, such as a parabolic sidewall outwardly curving from the ground structure 1002 upward, for example. Additionally, the fence 1050 may be a solid fence, a perforated fence, a mesh fence, a spaced-apart post fence, vias, a conductive ink fence, or any other electrically conductive fence structure suitable for a purpose disclosed herein. As depicted in FIG. 10A, the height of the fence 1050 is about 1.5 times the height of the signal feed 1006, however, it may be higher or shorter depending of the desired radiation pattern. In an embodiment, the height of the fence 1050 is equal to or greater than the height of the signal feed 1006, and equal to or less than 1.5 times the height of the signal feed 1006. In the case of a unit cell, or unit/singular DRA, the height and the angle of the fence together with the dielectric constants (also herein referred to as Dk's) of the employed materials, define the antenna aspect ratio. Depending on the desired specifications for size, bandwidth and gain, antennas with different aspect ratios may be provided. For example, a relatively high fence combined with a defined angle of the fence is contemplated to provide a relatively high gain over a relatively broad frequency bandwidth. Other combinations of fence height and fence angle are contemplated to provide other advantageous antenna performance characteristics, which could be readily analytically modeled in view of the teachings of the disclosed material provided herein.

In the embodiment of DRA 1000, a balanced gain, see FIGS. 10C and 10D for example, is achieved by employing shifted shells of layered volumes 1004 on a planar ground structure 1002. It is contemplated that other geometries will provide similar results, such as layered volumes 1004 that are less shifted, coupled with a non-planar ground structure as depicted by dashed line 1003, which would serve to bend the field lines (from the less shifted shells) to be more symmetrical about the z-axis. Any and all such variations to the embodiments depicted herein are considered to be within the scope of the invention disclosed herein.

Figure 10F:
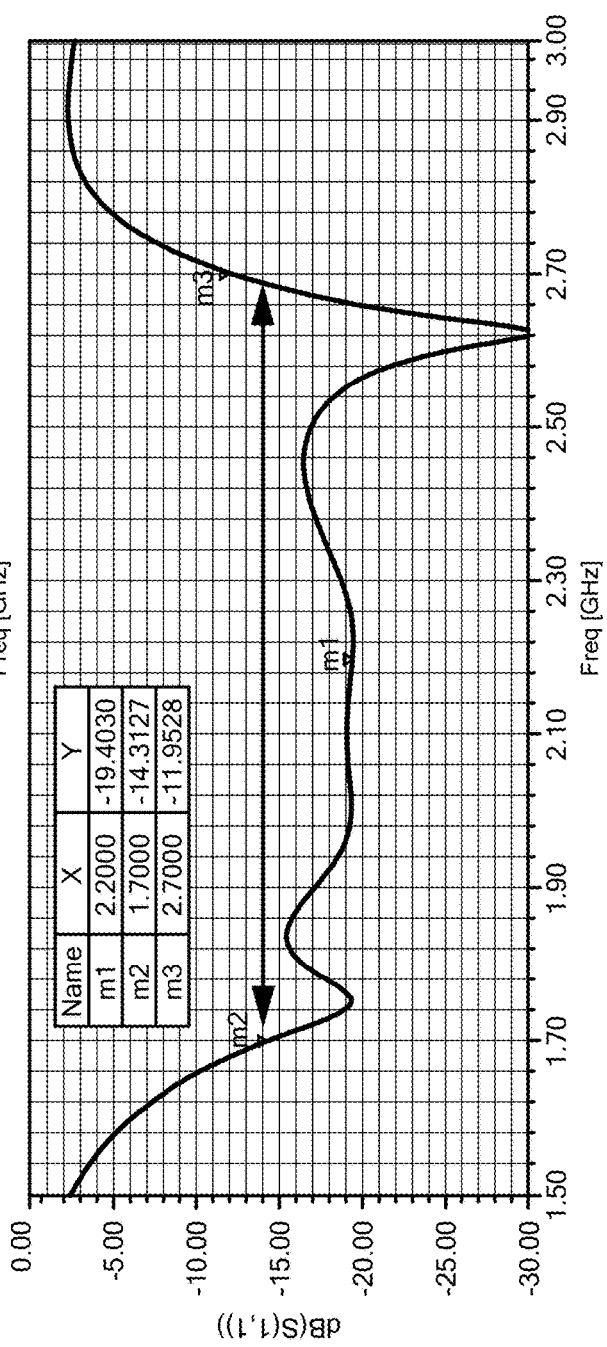
FIG. 10F depicts a return loss graph associated with a DRA similar to that of FIG. 10A, but tuned to a different operating frequency range, in accordance with an embodiment.

FIG. 10F depicts a return loss response for a DRA similar to DRA 1000 but tuned for 1700-2700 MHz operation.

With respect to the heights of different DRA's operational at different frequencies, a DRA configured to operate at about 10 GHz can have a height of about 5-8 mm, while a DRA configured to operate at about 2 GHz can have a height of about 25-35 mm. In an embodiment, the analytical model depicted in FIG. 10A has a bottom diameter of the fence of about 20 mm to produce the radiation pattern depicted in FIG. 10C.

Figure 11A:
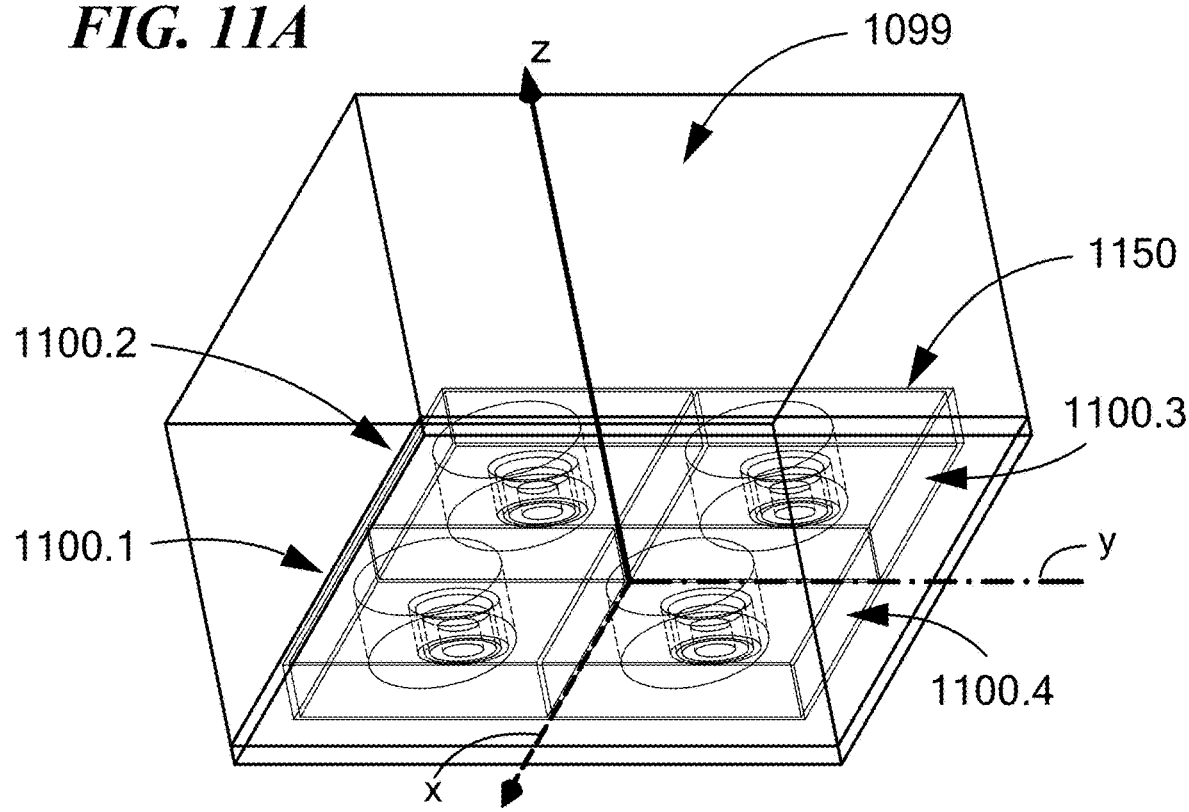
FIG. 11A depicts in block diagram perspective view a two-by-two array employing DRAs in accordance with an embodiment.
Figure 11B:
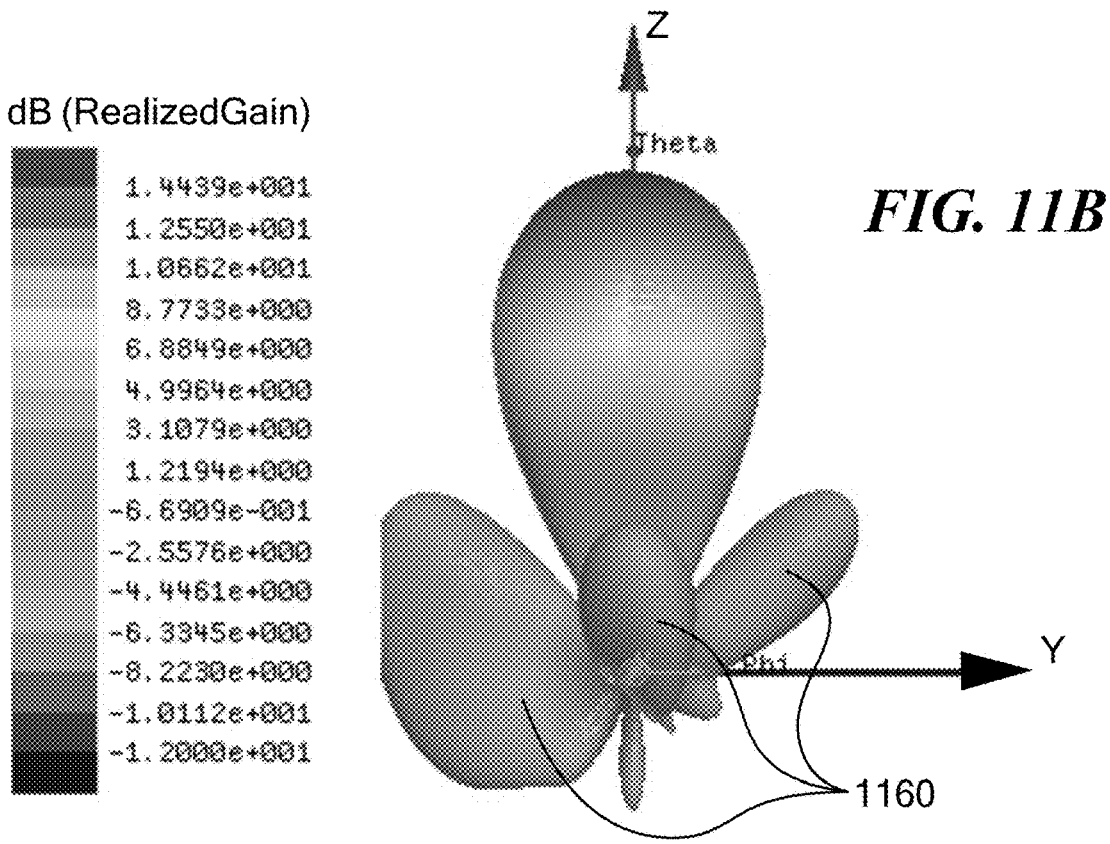
FIG. 11B depicts a field radiation pattern associated with array of FIG. 11A.

Reference is now made to FIG. 11A, which depicts an example 2×2 array 1099 employing four DRA's 1100.1, 1100.2, 1100.3, 1100.4 (collectively referred to as DRA's 1100) similar to DRA 600, in accordance with an embodiment, which produces a gain of 14.4 dB along the z-axis of the radiation pattern as depicted in FIG. 11B. In an embodiment, the analytical model depicted in FIG. 11A has overall x and y dimensions of about 60 mm×60 mm to produce the radiation pattern depicted in FIG. 11B. More specifically, each DRA 1100 has a plurality of volumes of the dielectric materials being embedded within a container, such as a dielectric material having a dielectric constant between 1 and 3, for example, and where the plurality of volumes of dielectric materials are centrally disposed relative to each other, and are centrally shifted in a sideways direction relative to the container, similar to the description above in reference to DRA 600. As discussed above in connection with DRA 1000, each DRA 1100 has an electrically conductive fence 1150 that surrounds each respective DRA 1100. The analytically modeled embodiment depicted in FIG. 11A produces the radiation pattern depicted in FIG. 11B, which can be seen to have asymmetrical secondary lobes 1160 at or about z=0. These asymmetrical secondary lobes 1160 are attributed to the analytical model having a rectangular fence 1150 surrounding each cylindrical DRA 1100 (via cylindrical geometry of the container), and it is contemplated that a reduction in the secondary lobes 1160 and an improvement in the realized gain (14.4 dB in FIG. 11B) may be achieved by employing a fence geometry having more uniform symmetry with respect to the cylindrical DRA's 1100.

From the foregoing, it will be appreciated that other arrays may be constructed having any number of x by y array components comprised of any of the DRA's described herein, or any variation thereof consistent with an embodiment disclosed herein. For example, the 2×2 array 1099 depicted in FIG. 11A may be expanded into an array having upwards of 128×128 or more array elements having overall x and y dimensions upwards of about 1-foot×1-foot (30.5 cm×30.5 cm) or more, for example. An overall height of any array 1099 can be equal to or greater than 1 mm and equal to or less than 30 mm. While the x, y array 1099 depicted herein has been described with x equal to y, it will be appreciated that array structures having x not equal to y are also contemplated and considered within the scope of the invention disclosed herein. As such, FIG. 11A is presented in a non-limiting way to represent an array 1099 of any DRA element disclosed herein having any number of x and y array elements consistent for a purpose disclosed herein. As further example, Applicant has analytically modeled a 128× 128 array of DRA's disclosed herein having overall x and y dimensions of 32 cm by 32 cm, with a resulting focused directional gain of about 50 dB. Any and all such combinations are considered to be within the scope of the invention disclosed herein.

Reference is now made to FIG. 12A, which depicts an artistic rendering of an example embodiment of a plurality of volumes of dielectric materials 1204 disposed on an electrically conductive ground structure 1202, similar to other embodiments of volumes of dielectric materials disclosed herein. With reference to FIG. 12A, the coupling of resonances between individual ones of the plurality of volumes of dielectric materials can be explained by virtue of adjacent ones of the volumes being disposed in direct intimate contact with each other. For example, the embodiment of FIG. 12A has four volumes of dielectric materials V(1)-V(4) 1204.1, 1204.2, 1204.3 and 1204.4. The dashed lines within each volume represent a signal path and define a resonance. The electrical length of a given path defines "dominantly" the resonant frequency. Each resonant frequency can be fine-tuned by adjusting the layer thickness. A multiple resonant system, as disclosed herein, can be achieved by the coupling of relatively closed electrical lengths ($\sim d*sqrt(\varepsilon)$), that define the fundamental resonances of $\lambda/2$. As used herein the mathematical operator $\sim$ means approximately. Broad band response, as disclosed herein, can be achieved by strongly coupled electrical paths from the relatively lowest dielectric constant material (relatively larger shell thickness) to the relatively highest dielectric constant material (relatively smallest shell thickness). FIGS. 12B and 12C depict the change in bandwidth when decoupled resonances are coupled. Embodiments disclosed herein operate on this principle of coupled resonances by employing a plurality of volumes of dielectric materials as layered shells that are in direct intimate contact with each other to produce strongly coupled electrical paths in the associated DRA for broadband performance in microwave and millimeter wave applications.

Figure 13A:
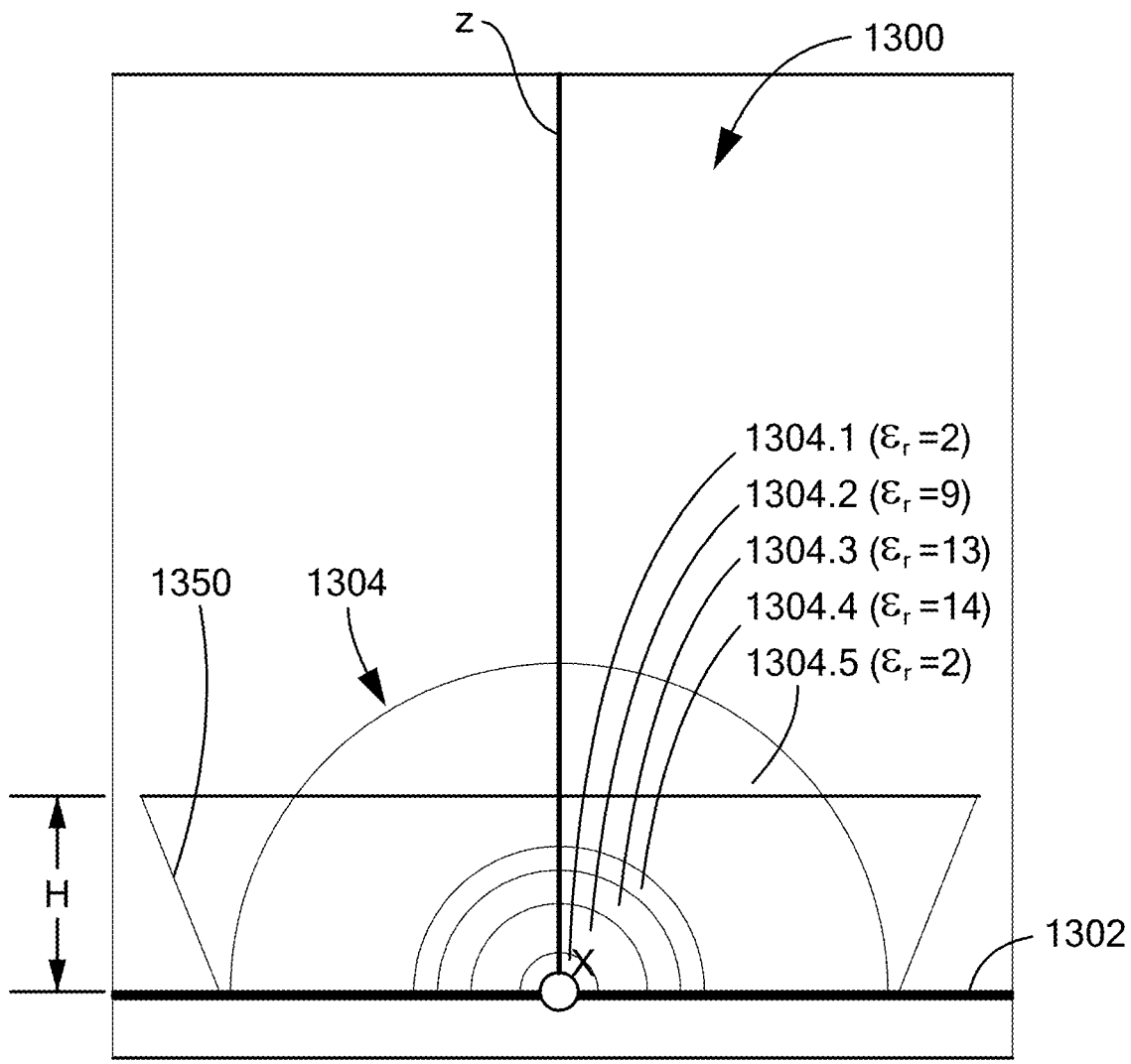
FIG. 13A depicts a block diagram side view of another DRA in accordance with an embodiment.
Figure 13B:
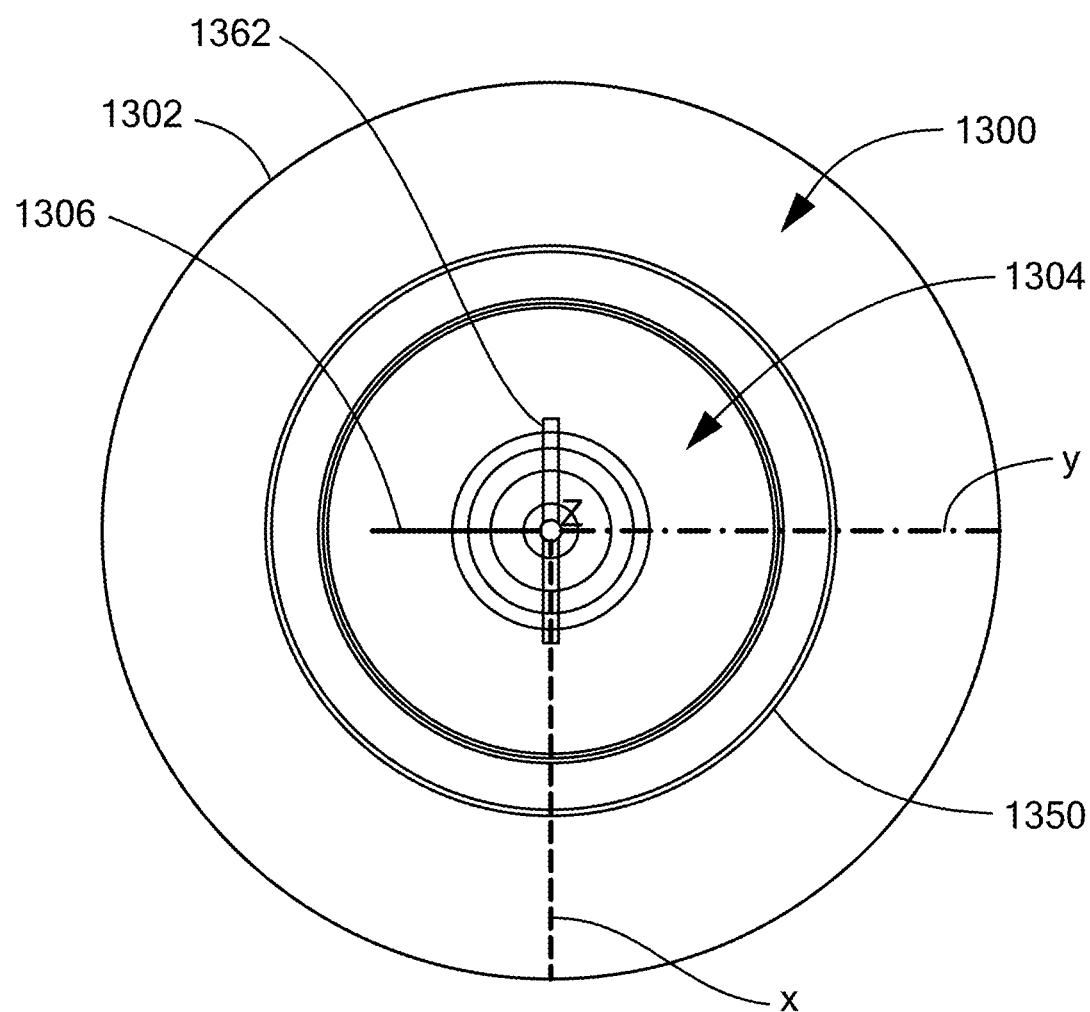
FIG. 13B depicts a block diagram top-down foot print view of the DRA of FIG. 13A.
Figure 13C:
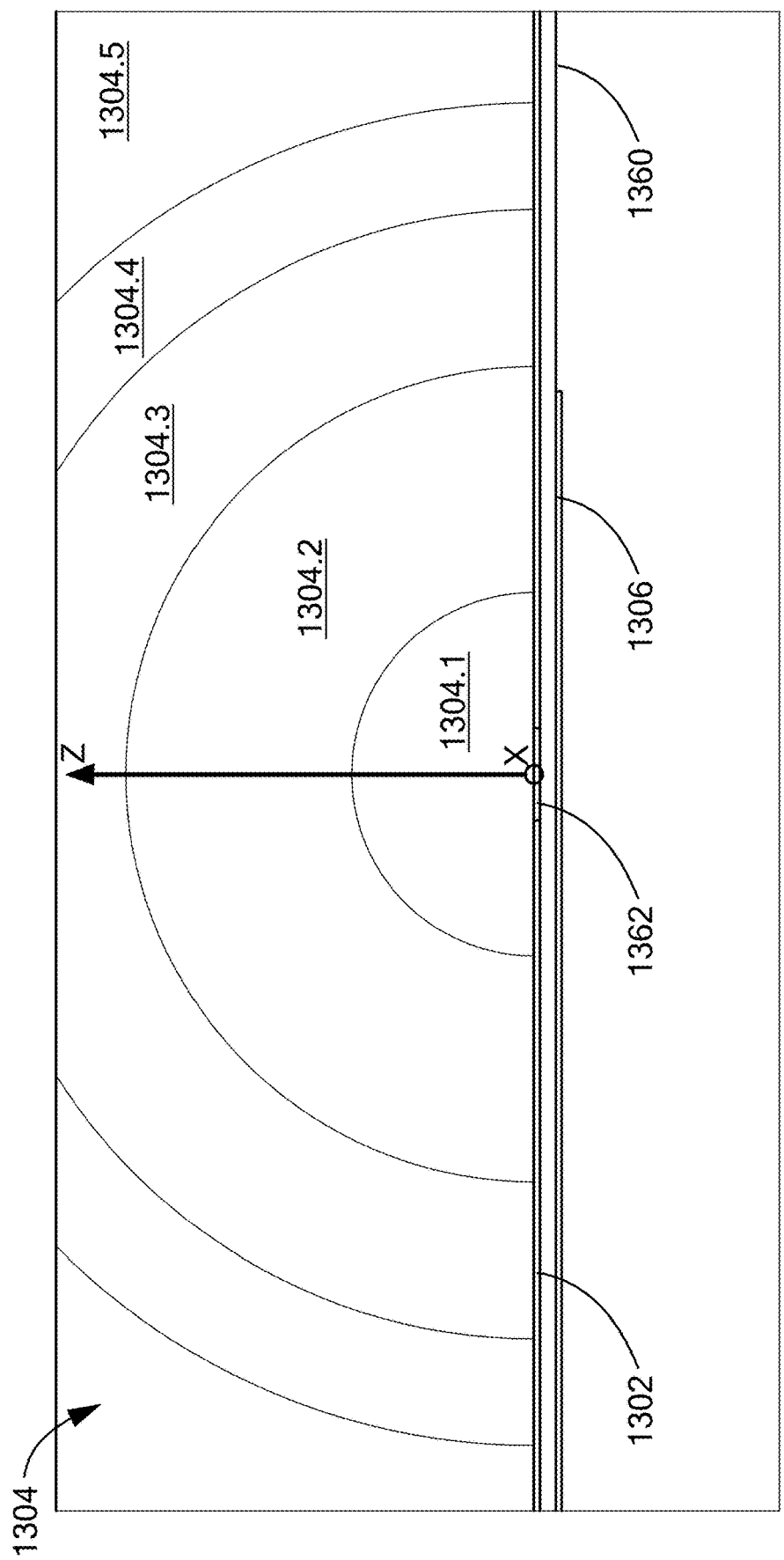
FIG. 13C depicts an expanded view of a central portion of the DRA of FIG. 13A.
Figure 13D:
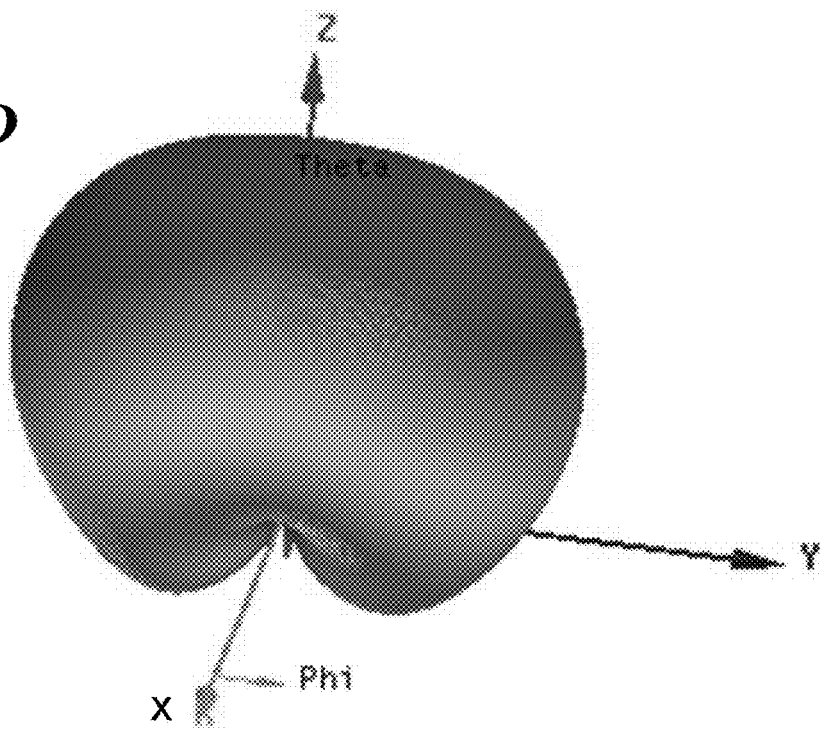
FIG. 13D depicts a field radiation pattern associated with the DRA of FIG. 13A.
Figure 13E:
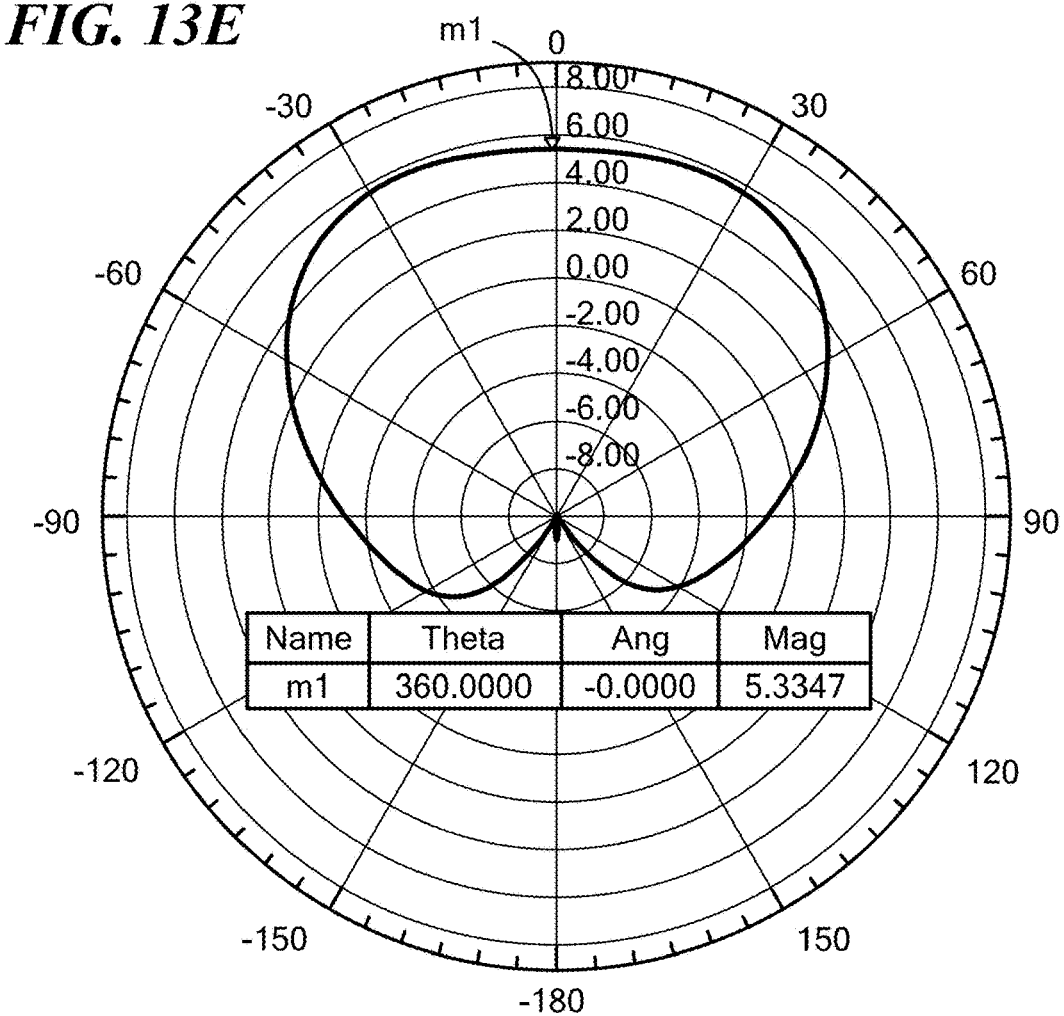
FIG. 13E depicts the gain in the elevation plane for the field radiation pattern of FIG. 13D.
Figure 13F:
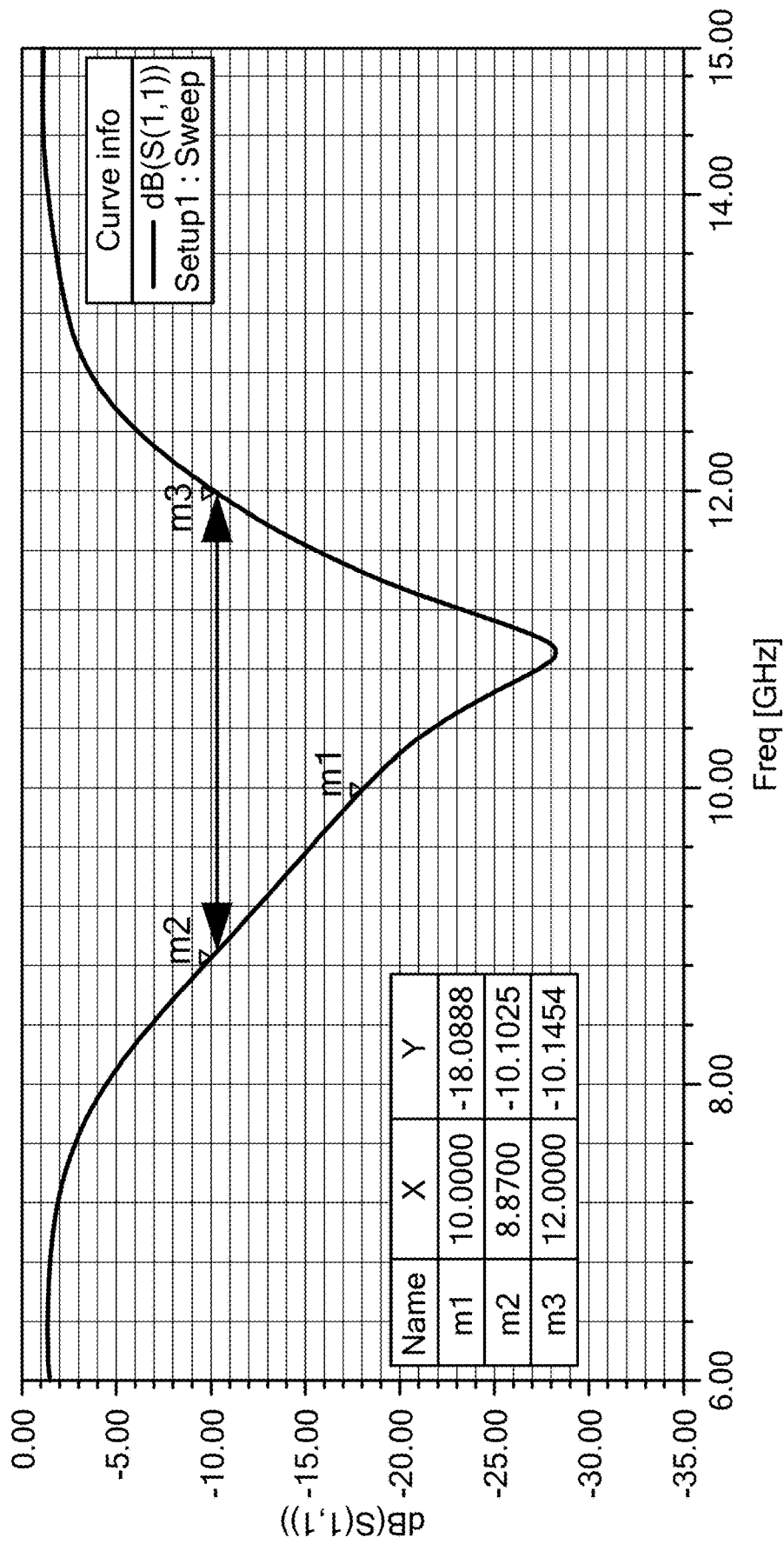
FIG. 13F depicts a return loss graph associated with the DRA of FIG. 13A.

Reference is now made to FIGS. 13A-13F, which depict another version of a DRA in accordance with an embodiment. FIGS. 13A-13C depict a DRA 1300, or a portion thereof in FIG. 13C, having layered shells of volumes of dielectric materials 1304 and a microstrip signal feed (microstrip) 1306 disposed under a ground structure 1302 with a dielectric substrate 1360 disposed between the microstrip 1306 and the ground structure 1302. In the embodiment of FIGS. 13A-13C, each volume of the plurality of volumes of dielectric materials 1304 has an hemispherical shape, with an electrically conductive fence 1350 disposed circumferentially around the plurality of volumes of dielectric materials 1304, where the fence 1350 is electrically connected with and forms part of the ground structure 1302 and has a construction as described above in connection with fence 1050. In an embodiment, DRA 1300 has five layers of dielectric materials 1304 having respective dielectric constants $\varepsilon_1=2$, $\varepsilon_2=9$, $\varepsilon_3=13$, $\varepsilon_4=14$ and $\varepsilon_5=2$. However, the scope of the invention is not limited to five layers, and may include any number of layers. In the embodiment of DRA 1300, each of the five volumes V(1)-V(5) 1304.1-13.04.5 of the plurality of volumes of dielectric materials 1304 are centrally disposed relative to a center of the circumference of the fence 1350. The ground structure 1302 has a slotted aperture 1362 formed therein, where the microstrip 1306 and the lengthwise dimension of the slotted aperture 1362 are disposed orthogonal to each other as depicted in the plan view of FIG. 13B. In an embodiment, the slotted aperture has a length of 10 millimeters (mm) and a width of 0.6 mm, but may have different dimensions depending on the desired performance characteristics. In an embodiment, the microstrip 1306 has an impedance of 50 ohms, and the substrate 1360 has a thickness of 0.1 mm. DRA 1300 is also herein referred to as an aperture coupled microstrip DRA. In an embodiment, the combination of the layered shells of dielectric materials of different dielectric constants, plus the hemispherical shapes, plus the fence, as herein disclosed, results in the radiation pattern depicted in FIG. 13D, a realized gain of about 7.3 dB as depicted in FIG. 13E, an a bandwidth of greater than 30% as depicted in FIG. 13F. It is contemplated that the bandwidth can be much larger by selecting different dielectric constants and thicknesses for the different layers. In an embodiment, the ground structure 1302 has more than one slotted aperture 1362, which may be used for the microstrip signal feed 1306 and for aligning the plurality of volumes of dielectric materials 1304 with the fence 1350. In some embodiments, the microstrip may be replaced with a waveguide, such as a surface integrated waveguide for example.

Figure 14A:
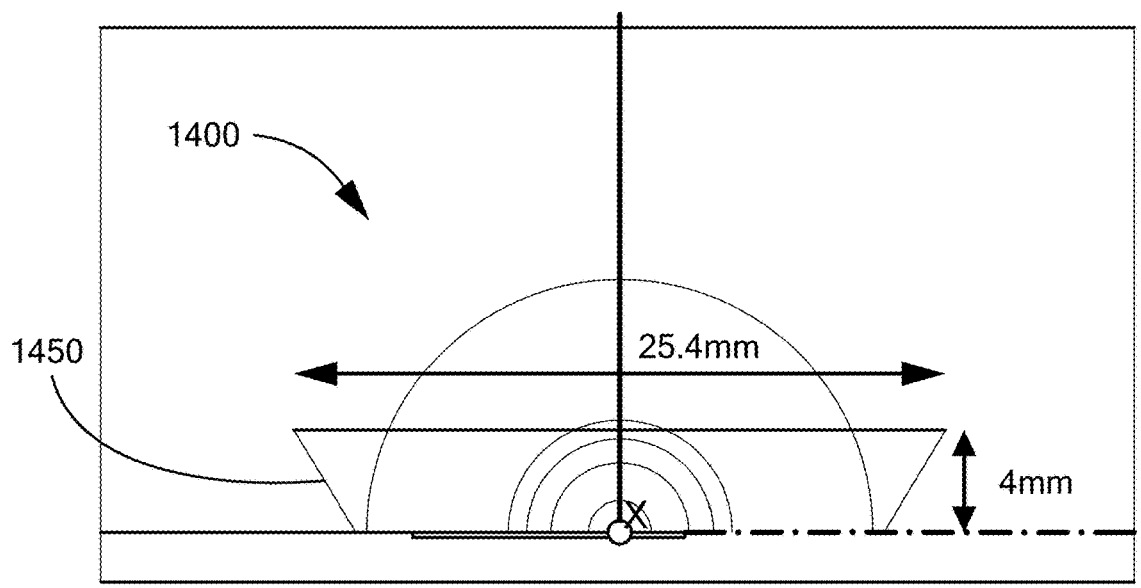
FIG. 14A depicts a block diagram side view of a DRA similar to that depicted in FIG. 13A, but having a fence with different dimensions.
Figure 14B:
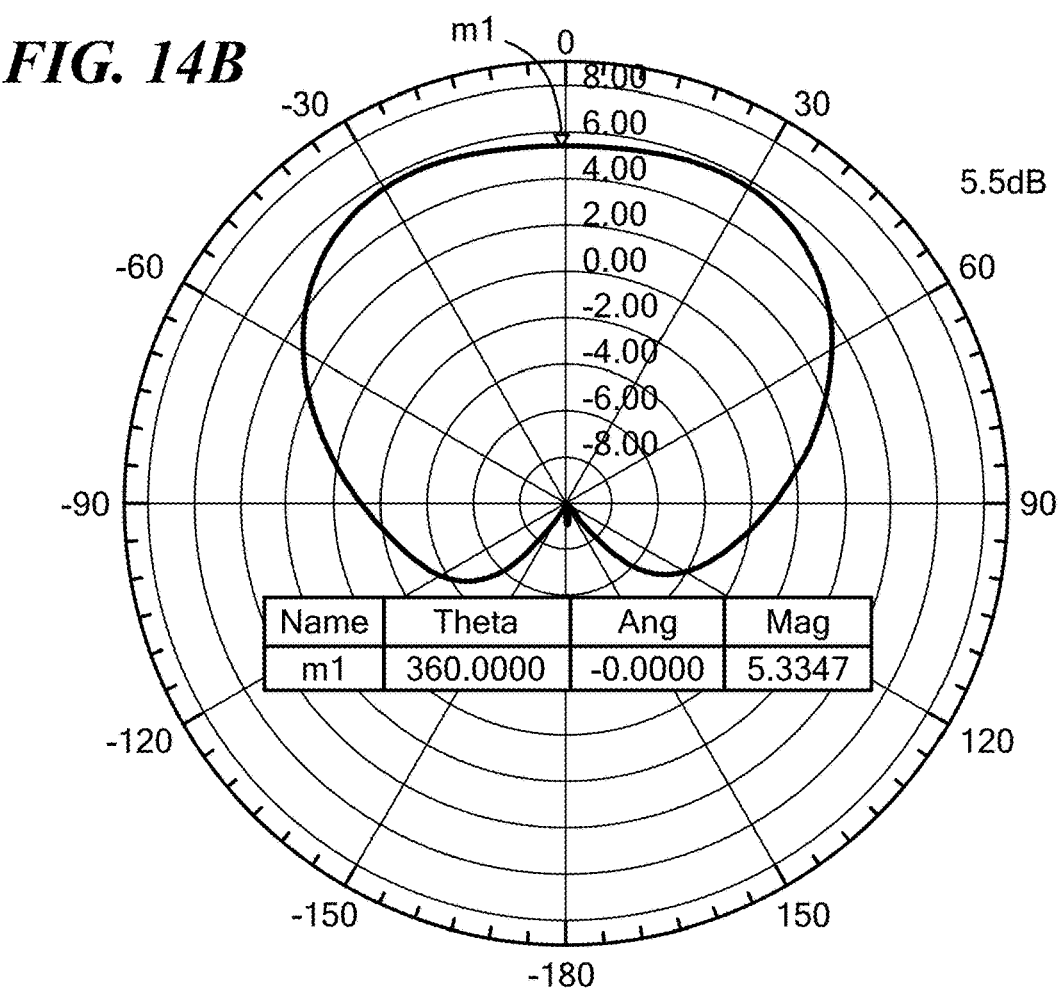
FIG. 14B depicts the gain in the elevation plane for the DRA of FIG. 14A.
Figure 15A:
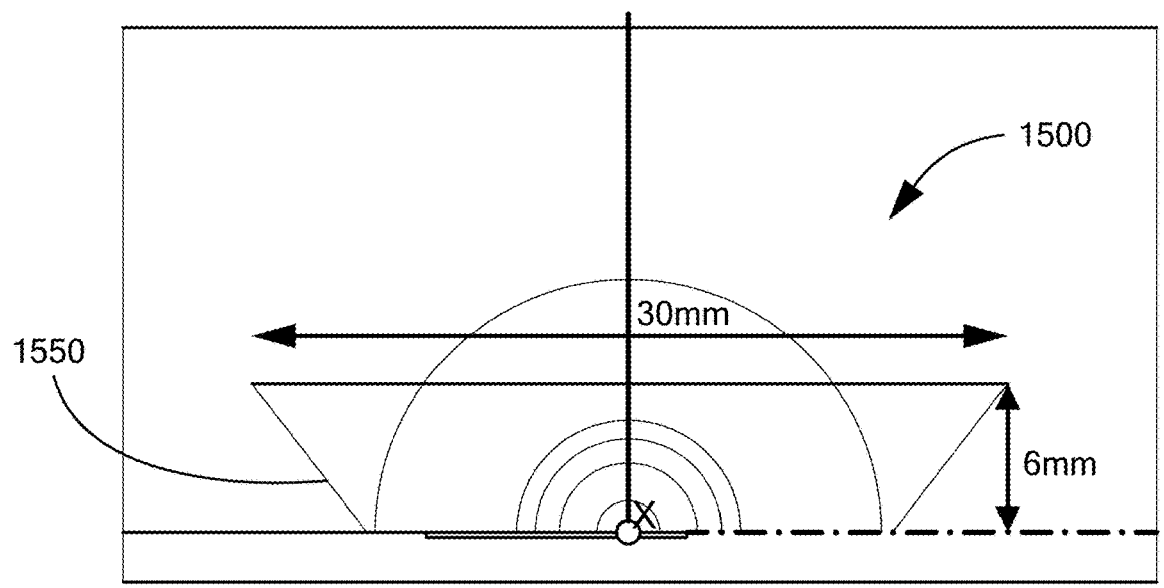
FIG. 15A depicts a block diagram side view of another DRA similar to those depicted in FIGS. 13A and 14A, but having a fence with different dimensions.
Figure 15B:
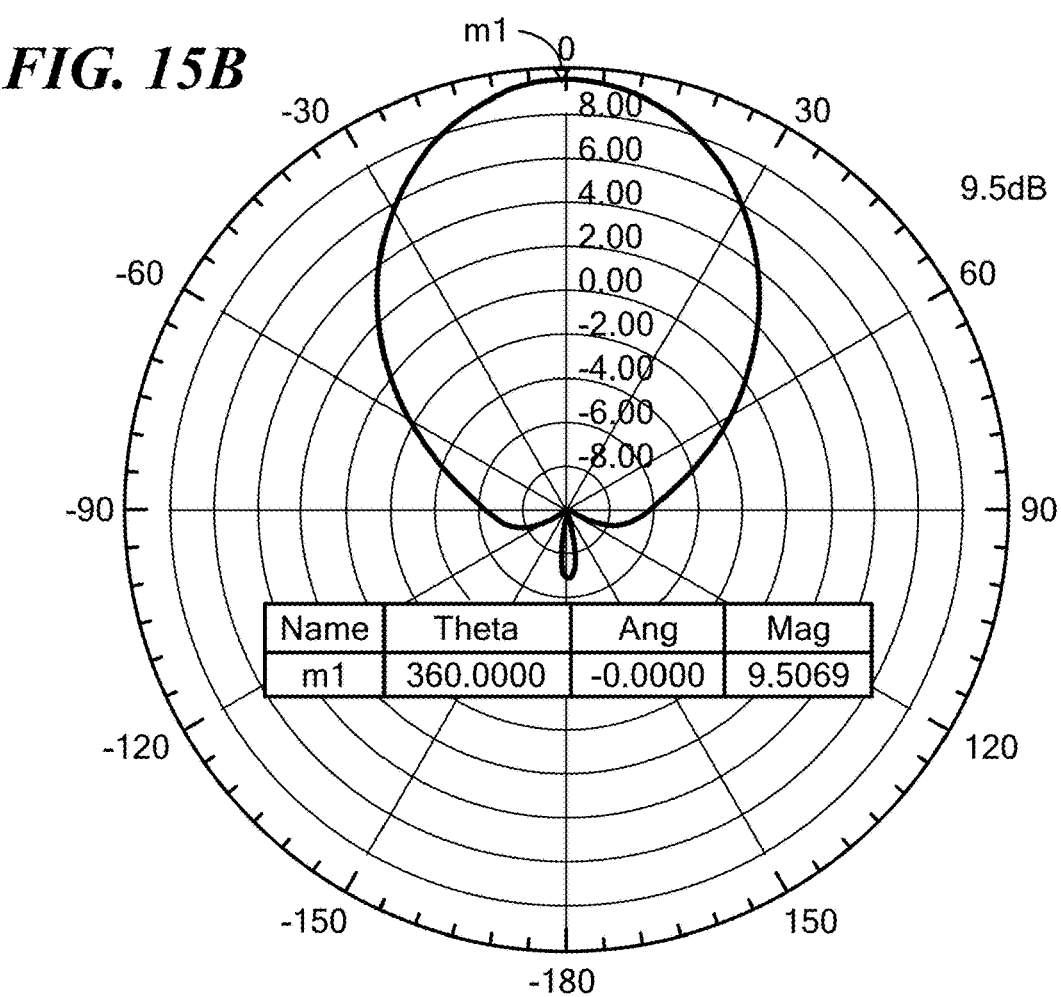
FIG. 15B depicts the gain in the elevation plane for the DRA of FIG. 15A.

FIGS. 14A and 15A depict DRA's 1400 and 1500, respectively, having a similar construction to that of DRA 1300, both with microstrip signal feeds, but with different dimensions for the fences 1450 and 1550, respectively, as compared to each other and as compared to the fence 1350 of FIG. 13A. A common feature between the three DRA's 1300, 1400 and 1500, is the plurality of volumes of dielectric materials 1304, which are all the same. In the embodiment depicted in FIG. 14A, the fence 1450 has a plan view maximum diameter of 25.4 mm, and a height of 4 mm, resulting in the DRA 1400 having a realized gain of 5.5 dB as depicted in FIG. 14B. In the embodiment depicted in FIG. 15A, the fence 1550 has a plan view maximum diameter of 30 mm and a height of 6 mm, resulting in the DRA 1500 having a realized gain of 9.5 dB as depicted in FIG. 15B. As will be appreciated by comparing the similar constructions for DRA's 1300, 1400 and 1500, with each DRA having the same plurality of volumes of dielectric materials, but with different fence dimensions, the realized gain (and the radiation pattern) can be varied and tuned by adjusting the dimensions of the fence in order to produce a desired performance characteristic. It is contemplated that the bandwidth may decrease as the gain increases by varying the fence geometry as herein described.

Reference is now made to FIGS. 16-28, which are used to illustrate an inter-play between the Transverse Electric (TE) mode electrical path and the Transverse Magnetic (TM) mode geometrical path in a DRA, and the role that DRA symmetry plays in overall antenna performance.

DRA's have radiating modes that are understood and classified in terms of TE modes and TM modes. Alternatively the radiating modes can be represented and classified in terms of fundamental TE-magnetic dipoles and TM-electric dipoles. Non-radiating modes can be represented with paired dipoles, whereas radiating modes can be represented with un-paired dipoles. Among the various modes the fundamental radiating $TE_{01}$ and $TM_{01}$ modes play an important role on DRA overall performance. Antenna bandwidths include an impedance (matching) bandwidth that is defined at −10 dB match, and a radiating bandwidth that might be quite different and is defined by considering the 3 dB Gain bandwidth for the desired mode. Usually the radiating bandwidth is a fraction of the matching bandwidth. Symmetry of the DRA layers plays a role in the overall antenna performance by favoring or disfavoring the fundamental orthogonal radiating TE and TM modes.

Simplified calculations based on symmetry-assisted electrical paths can provide insights on expected DRA performance. TE and TM modes are favored by geometrically different paths that are enhanced or suppressed by resonator shape and symmetry, and have radiation patterns that are also topologically very different. The greater the difference between the geometrical and electrical paths, the further apart in frequency are the TE and TM radiating modes, and the more distinguished are the gains in their preferred directions. On the contrary, the proximity between the geometrical paths implies frequency proximity, and makes the antenna less directive and decreases both TE and TM radiation performance.

Cylindrical and rectangular layered DRA's favor the proximity between the TE and TM geometrical and electrical paths, resulting in frequency proximity and a DRA that might have a good matching bandwidth but it does not radiate well in either mode. By using a hemispherical layered DRA design, the geometrical paths become more distinguished, which implies frequency separation and less TE and TM interaction. Radiation patterns also become more distinguished topologically and the associated gains are higher, resulting in an antenna that may have a smaller matching bandwidth, but improved radiating bandwidth and gain.

An embodiment of a DRA design as disclosed herein have improved TE mode radiating performance, while the vertical path (associated with the TM mode) is substantially or totally suppressed via embedded low dielectric constant (Dk) material or air filled ellipsoids. Simplified calculations, discussed in more detail below, also provide an upper limit for the TE radiating bandwidth at about 60%. This upper limit suggests the maximum separation that can be achieved between the TE and TM frequencies. In the simplified calculations provided herein a highest relative permittivity of $\varepsilon_r = 9$ is assumed. However, it is contemplated that the radiation bandwidth would improve further by going to higher Dk material. In an embodiment, the presence of a cavity would tend to reduce the TE and TM frequency distance by affecting more the TM mode (through symmetry considerations). A half empirical formula, discussed in more detail below, approximately predicts the TE and TM gain vs frequency separation or path/symmetry factor α.

With respect to radiation patterns, radiating un-paired magnetic dipoles (TE mode) result in end-fire radiation patterns, while radiating un-paired electric dipoles (TM mode) result in broadside radiation patterns.

Figure 16:
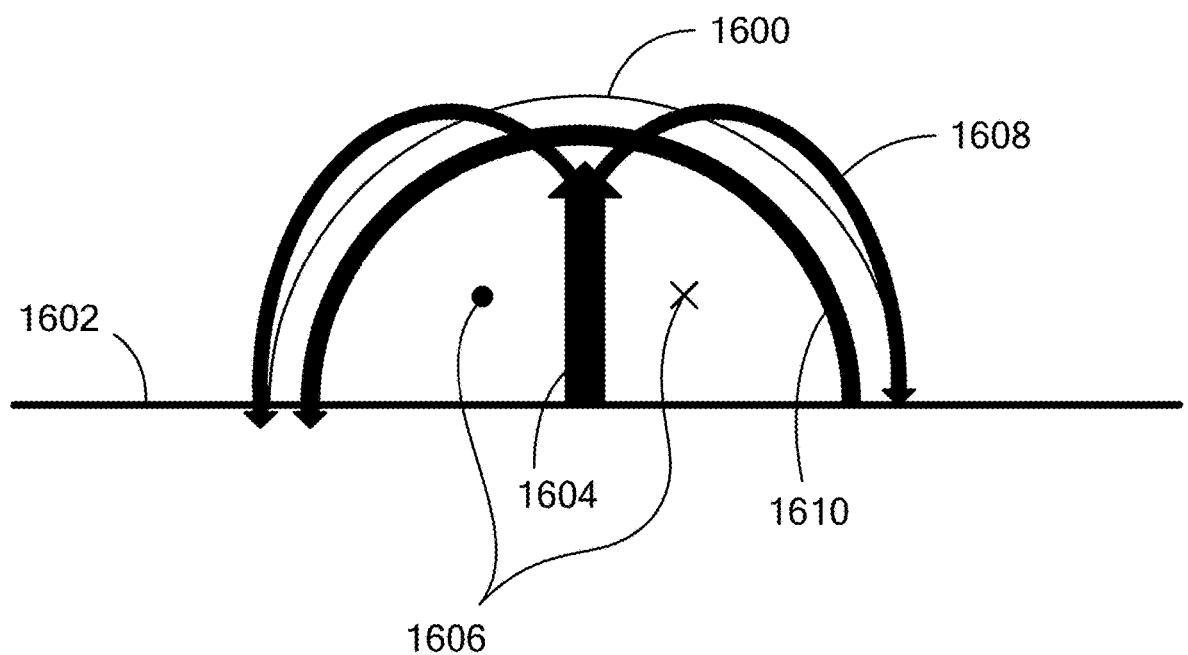
FIG. 16 depicts a block diagram side view of a model of an example DRA illustrating radiating mode fundamental geometrical and electrical paths in the near field.

Reference is now made to FIG. 16, which depicts a model of an example hemispherical DRA 1600 disposed on an electrically conductive ground structure 1602 for purposes of illustrating geometrical and electrical fundamental paths in the near field. The central vertical arrow 1604 represents the TM radiating mode (electric dipole) that produces magnetic field 1606 and fundamental field paths 1604 (central path) and 1608 proximate an outer region of the hemispherical DRA 1600, and the arched arrow 1610 represents the TE radiating mode (magnetic dipole) and associated fundamental field path proximate an outer region of the hemispherical DRA 1600. An advantage of an embodiment can be achieved by suppressing the TM mode and amplifying the TE mode, making frequency separation achievable and hence distinguished gains in preferred directions (end-fire) and increased radiating bandwidths.

Figure 17:
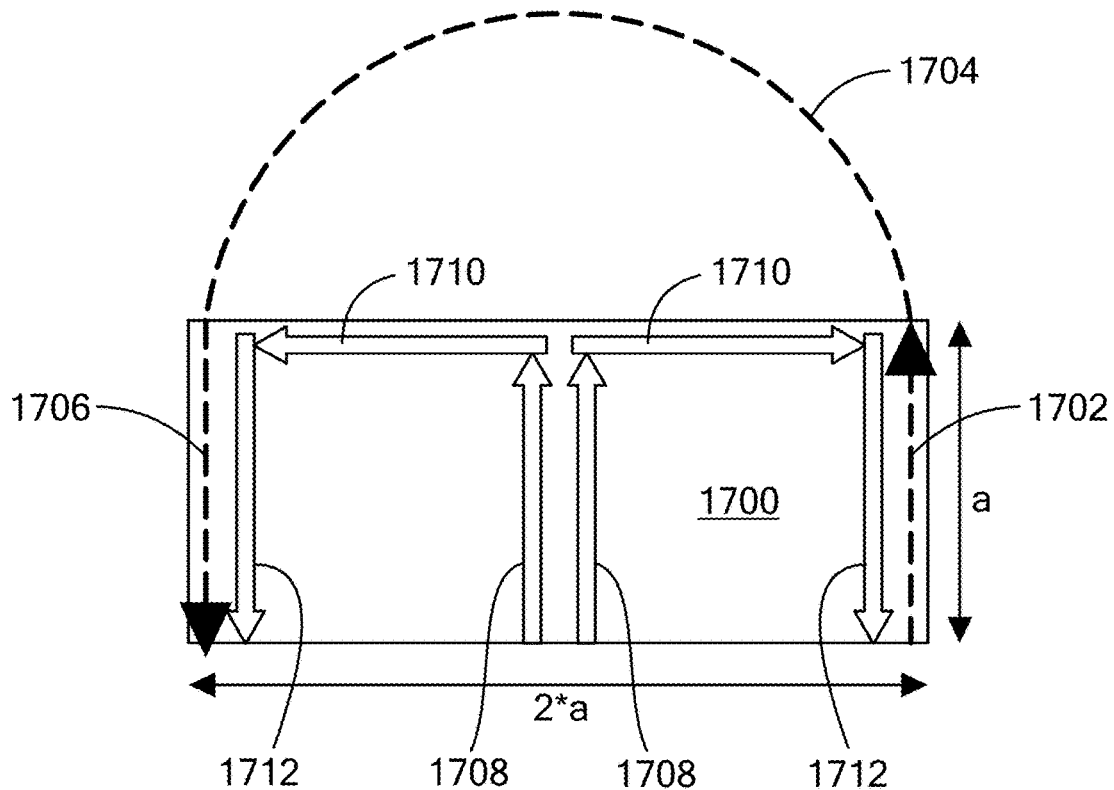
FIG. 17 depicts a block diagram side view of a model of an example cylindrical or rectangular DRA illustrating associated radiating mode geometrical and electrical paths.

Reference is now made to FIG. 17, which depicts a model of an example cylindrical/rectangular DRA 1700 having height "a" and diameter "2a". The TE mode field lines are depicted by reference numerals 1702, 1704 and 1706 (Path-1), and the TM mode field lines are depicted by reference numerals 1708, 1710 and 1712 (Path-2). Recognizing that the electrical path defines resonance at 2\12 (half wavelength resonance), equations for the TE mode half wavelength resonance (Path-1) and the TM mode half wavelength resonance (Path-2) can, for a purpose disclosed herein, be defined (≡) by:

$$\text{TE Half Wavelength Resonance} \equiv 2a\sqrt{\varepsilon_r} + \pi a\sqrt{\varepsilon_{Air}}; \text{ and} \quad \text{Equa. 1}$$

$$\text{TM Half Wavelength Resonance} \equiv 3a\sqrt{\varepsilon_r}. \quad \text{Equa. 2}$$

Assuming that $\varepsilon_r=9$ (discussed above for simplified yet reasonable calculations) for the DRA 1700, provides the following results for the two paths of Equas. 1 and 2:

$$\text{Path-1: } 6a+\pi a=(6+\pi)a\approx\delta_{TE}/2; \text{ and} \quad \text{Equa. 3}$$

$$\text{Path-2: } 9a\approx\lambda_{TM}/2. \quad \text{Equa. 4}$$

Taking the ratio of Path-1 to Path-2 yields the result:

$$\text{Path-1/Path-2}=(6+\pi)a/9a\approx1.01. \quad \text{Equa. 5}$$

As a result, the electrical paths of the TE and TM modes for cylindrical/rectangular type DRA's are almost the same, resulting in TE and TM resonances being close to each other, such that if TE mode resonance is at 10 GHz, the TM mode resonance will be very close to 10 GHz. The end result is that such cylindrical/rectangular DRA's have TE and TM resonances that steal energy from each other and produce poor gains.

Figure 18:
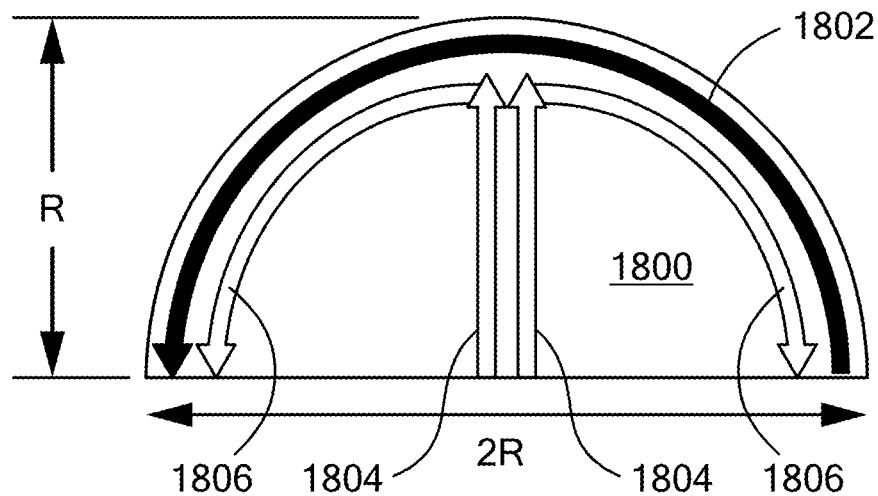
FIG. 18 depicts a block diagram side view of a model of an example hemispherical DRA illustrating associated radiating mode geometrical and electrical paths.

Reference is now made to FIG. 18, which depicts a model of an example hemispherical DRA 1800 having overall height "R" and base diameter "2R". The TE mode field lines are depicted by reference numeral 1802 (Path-1), and the TM mode field lines are depicted by reference numerals 1804 and 1806 (Path-2). Similar above, equations for the TE mode half wavelength resonance (Path-1) and the TM mode half wavelength resonance (Path-2) can, for a purpose disclosed herein, be defined by:

$$\text{TE Half Wavelength Resonance} \equiv \pi R\sqrt{\varepsilon_r}; \text{ and} \quad \text{Equa. 6}$$

$$\text{TM Half Wavelength Resonance} \equiv (R+\pi R/2)\sqrt{\varepsilon_r}. \quad \text{Equa. 7}$$

Again assuming that $\varepsilon_r=9$ (discussed above for simplified yet reasonable calculations) for the DRA 1800, provides the following results for the two paths of Equas. 6 and 7:

$$\text{Path-1: } 3\pi R\approx\lambda_{TE}/2; \text{ and} \quad \text{Equa. 8}$$

$$\text{Path-2: } 3((2+\pi)/2)R\approx\lambda_{TM}/2. \quad \text{Equa. 9}$$

Taking the ratio of Path-1 to Path-2 yields the result:

$$\text{Path-1/Path-2}=\pi R/(((2+\pi)/2)R)\approx1.22. \quad \text{Equa. 10}$$

In the embodiment of FIG. 18, if TE resonance is at 10 GHz, the TM resonance will be at approximately 12.2 GHz, which is a better separation than the embodiment of FIG. 17, but still leaves room for improvement.

Figure 19:
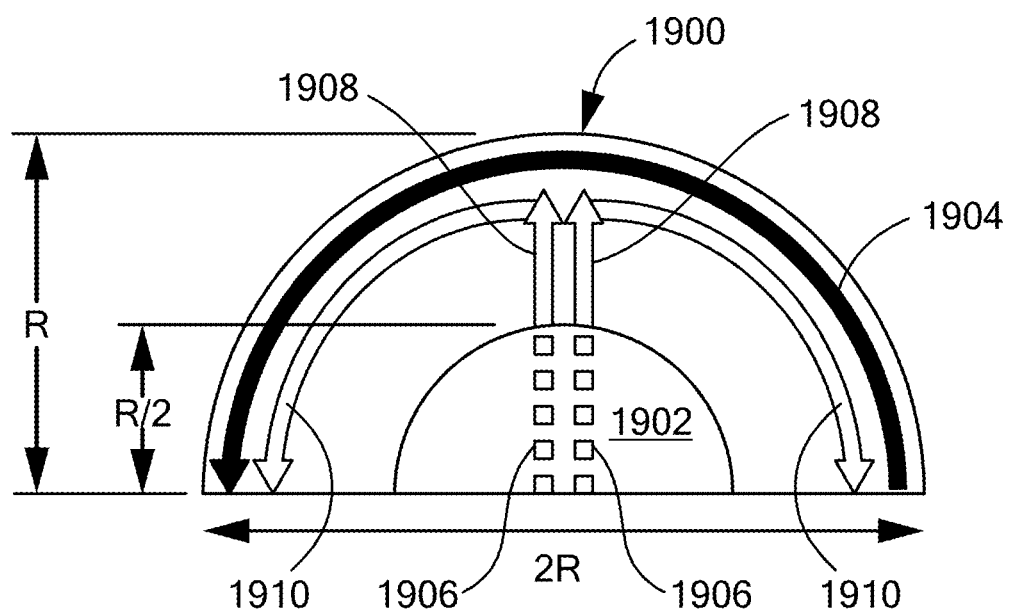
FIG. 19 depicts a block diagram side view of a model of an example hemispherical DRA similar to that of FIG. 18, but having two dielectric materials, and illustrating associated radiating mode geometrical and electrical paths.

Reference is now made to FIG. 19, which depicts a model of an example hemispherical DRA 1900 having overall height "R" and base diameter "2R" similar to the embodiment of FIG. 18, but having a central region 1902 formed from air or from a low Dk material. The TE mode field lines are depicted by reference numeral 1904 (Path-1), and the TM mode field lines are depicted by reference numerals 1906, 1908 and 1910 (Path-2). Similar to above, equations for the TE mode half wavelength resonance (Path-1) and the TM mode half wavelength resonance (Path-2) can, for a purpose disclosed herein, be defined by:

$$\text{TE Half Wavelength Resonance} \equiv \pi R\sqrt{\varepsilon_r}; \text{ and} \quad \text{Equa. 11}$$

$$\text{TM Half Wavelength Resonance} \equiv \left(\frac{R}{2}\right)\sqrt{\varepsilon_{Air}} + \left(\frac{R}{2}\right)\sqrt{\varepsilon_r} + \pi R/2\sqrt{\varepsilon_r}. \quad \text{Equa. 12}$$

Again assuming that $\varepsilon_r=9$ (discussed above for simplified yet reasonable calculations) for the DRA 1900, provides the following results for the two paths of Equas. 11 and 12:

$$\text{Path-1: } 3\pi R\approx\lambda_{TE}/2; \text{ and} \quad \text{Equa. 13}$$

$$\text{Path-2: } (1/2+3/2+(3/2)\pi)\approx\lambda_{TM}/2. \quad \text{Equa. 14}$$

Taking the ratio of Path-1 to Path-2 yields the result:

$$\text{Path-1/Path-2}=3\pi R/(((4+3\pi)/2)R)\approx1.4. \quad \text{Equa. 15}$$

In the embodiment of FIG. 19, if TE resonance is at 10 GHz, the TM resonance will be at approximately 14 GHz, which is a better separation than the embodiments of FIGS. 17 and 18, but yet still leaves room for improvement.

Figure 20:
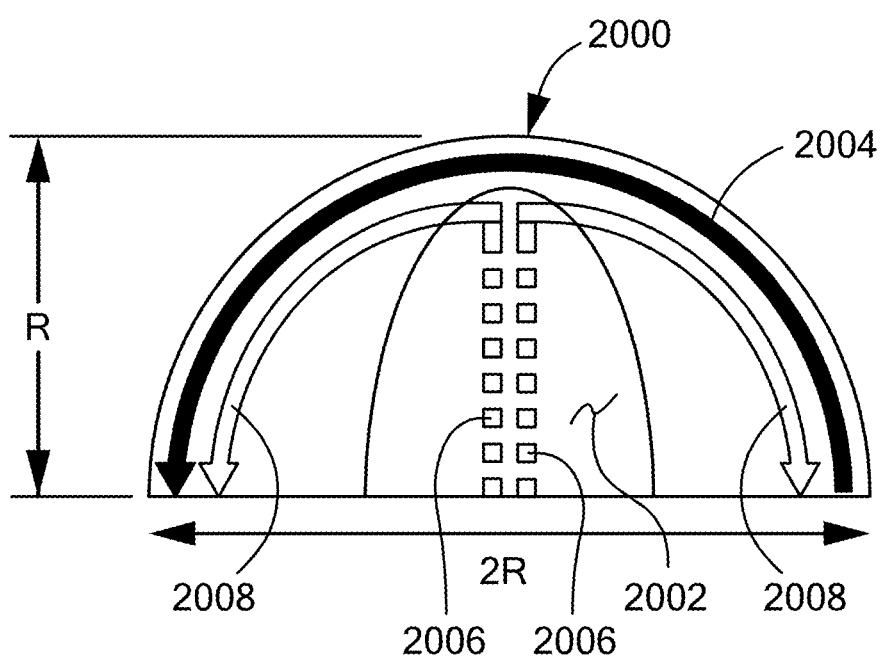
FIG. 20 depicts a block diagram side view of a model of an example hemispherical DRA similar to that of FIG. 19, but having an ellipsoidal shaped central region, and illustrating associated radiating mode geometrical and electrical paths.

Reference is now made to FIG. 20, which depicts a model of an example hemispherical DRA 2000 having overall height "R" and base diameter "2R" similar to the embodiments of FIGS. 18 and 19, but having a central region 2002 that is not only formed from air or from a low Dk material, but is also formed having a vertically oriented (axially oriented) ellipsoidal shape. While a signal feed is not specifically illustrated in FIG. 20 (or in some other subsequent figures), it will be appreciated from all that is disclosed herein that a signal feed is employed with the embodiment of FIG. 20, in a manner disclosed herein, for electromagnetically exciting the DRA 2000 for a purpose disclosed herein. The TE mode field lines are depicted by reference numeral 2004 (Path-1), and the TM mode field lines are depicted by reference numerals 2006 and 2008 (Path-2). Similar to above, equations for the TE mode half wavelength resonance (Path-1) and the TM mode half wavelength resonance (Path-2) can, for a purpose disclosed herein, be defined by:

$$\text{TE Half Wavelength Resonance}=\pi\sqrt{\varepsilon_r}; \text{ and} \quad \text{Equa. 16}$$

$$\text{TM Half Wavelength Resonance}=R\sqrt{\varepsilon_{Air}}+\pi R/2\sqrt{\varepsilon_r}. \quad \text{Equa. 17}$$

Again assuming that $\varepsilon_r=9$ (discussed above for simplified yet reasonable calculations) for the DRA 2000, provides the following result s for the two paths of Equas. 16 and 17:

$$\text{Path-1: } 3\pi R\approx\lambda_{TE}/2; \text{ and} \quad \text{Equa. 18}$$

$$\text{Path-2: } (1+(3/2)\pi)R\approx\lambda_{TM}/2. \quad \text{Equa. 19}$$

Taking the ratio of Path-1 to Path-2 yields the result:

$$\text{Path-1/Path-2}=3\pi R/(((2+3\pi)/2)R)\approx1.65. \quad \text{Equa. 20}$$

In the embodiment of FIG. 20, if TE resonance is at 10 GHz, the TM resonance will be at approximately 16.5 GHz, which is substantially better separation than the embodiments of FIGS. 17, 18 and 19.

As can be seen from the foregoing example embodiments of FIGS. 17-20, a substantially improved frequency separation can be achieved when the central path for the TM mode is substantially or completely suppressed by utilizing a hemispherical-ellipsoidal layered DRA having a central internal region that is not only formed from air or from a low Dk material, but is also formed having a vertically oriented (axially oriented) ellipsoidal shape, or any other shape with axial symmetry suitable for a purpose disclosed herein, that serves to effectively suppress the TM mode path in that region.

While the embodiments of FIGS. 19 and 20 depict only a two-layered DRA 1900, 2000 with an inner region 1902, 2002 having a dielectric constant different than and lower than the outer region (also herein referred to by reference numerals 1900, 2000), it will be appreciated that this is for illustration purposes only and for presenting simplified calculations, and that the scope of the invention disclosed herein is not directed to just two layers but encompasses any number of layers equal to or greater than three layers consistent with the disclosure and purpose disclosed herein.

The frequency proximity of the TE and TM modes defines the topological properties of energy distribution in the far field zone. An immediate practical implication of which is a "smooth" gain over relatively broad angles. Conversely, a "bumpy" antenna gain can highly affect the quality of data transmission. The intrinsic antenna directive properties and gain can be characterized topologically by the closed curves defined inside the space where the antenna energy is distributed. TE and TM radiating modes have very different topological structures that can be represented by homotopy groups. A pure TE mode can be represented by one type of curves, is usually associated with high gain, and can be a very directive mode. A pure TM mode can be represented with two types of curves, and is usually not as directive as the TE mode. A mixed symmetry of the far field energy distribution implies an inter-play between the TE and TM modes, can be represented by more than two types of curves, and is usually associated with low gain.

Figure 21A:
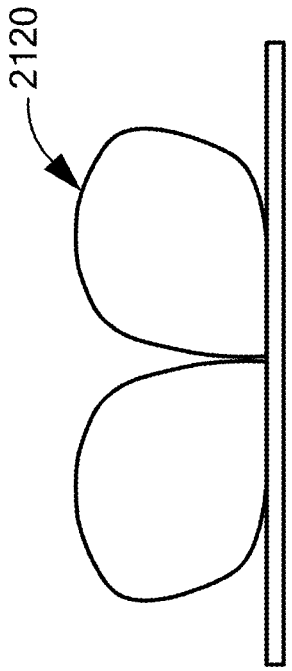
FIGS. 21A, 21B and 21C depict artistic renditions of topological structure and homotopy groups of the far field energy distribution for pure TE radiating mode, a pure TM radiating mode, and a combination of TE and TM radiating modes.
Figure 21B:
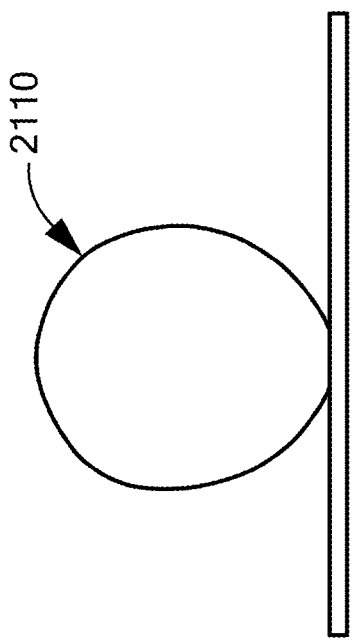
Figure 21C:
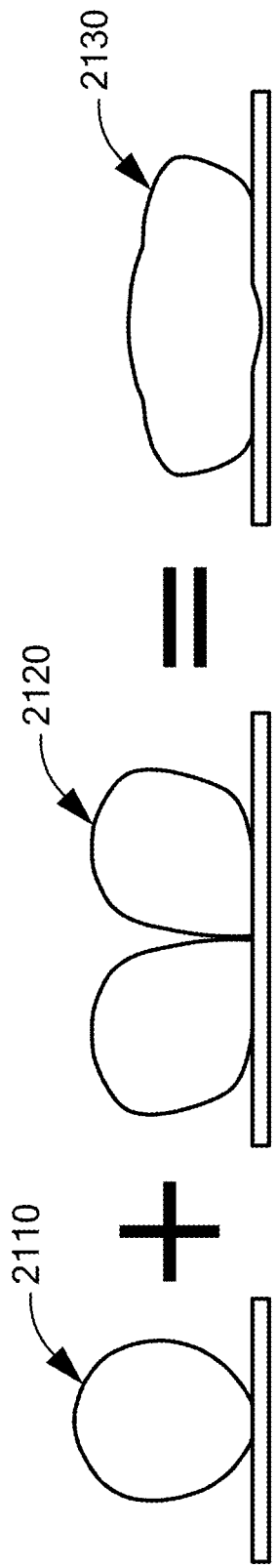

FIGS. 21A and 21B depict artistic renditions of far field 3D gain cross sections and homotopy groups for a pure TE radiating mode 2110 and a pure TM radiating mode 2120, respectively. While depicted as flat 2D renditions, the far field radiation patterns are 3D. Accordingly the associated homotopy groups of 2110 and 2120 correspond more correctly to closed loops in 3D. More explicitly, 2110 represents the radiation pattern and the associated homotopy group of a spheroid-like shape, whereas 2120 represents the radiating pattern and the associated homotopy group of a toroidal-like shape. As can be seen, the two topologies of FIGS. 21A and 21B have substantially different radiation patterns indicative of the TE and TM modes having far apart frequencies. FIG. 21C depicts an artistic rendition of a combination of the cross sections for far field 3D radiation patterns and homotopy groups of 2110 and 2120 to produce the radiation pattern and homotopy group of 2130, which results in the TE and TM modes being in close frequency proximity, and the antenna being less directive than either a pure TE mode or a pure TM mode antenna.

3D radiation patterns for the fundamental TE and TM modes consist of different topological spaces that can be classified via homotopy groups. Homotopy groups are defined on the families of closed loops. The simplest homotopy group is the one that is composed by the family of contractible loops at one point, which has only one element, the unity. FIGS. 22A and 22B depict artistic renditions of homotopy groups of the family of closed loops 2110 and 2120, respectively, but with additional artistic renditions of families of curves associated with each group. In FIG. 22A, all of the closed loops belong to one family. In the pure TE radiating mode, all of the curves 2210 are contractible (shrinkable, reducable) at a single point (represented by the inner ellipses and central point) within the energy distribution of the antenna radiation, which is a typical far field structure of TE radiating modes. Topologically they can be represented with the homotopy group with only one element, the unity, also referred to as a single element homotopy group. Practically, this means that the antenna associated gain and directivity can be "massaged" to be very high. In FIG. 22B, two families of curves are depicted, a first family 2220 having single point contractibility similar to that of curves 2210, and a second family 2230 that is not contractible at single point, as the single point 2231 depicted in FIG. 22B is not contained within the energy distribution of the antenna radiation. The two classes of curves make the associated homotopy group with two elements, unity (curves that are contractible at one point) and the other nontrivial element with the curves that cannot be contractible at one point. Practically, this means that there are intrinsic difficulties that don't allow us to "massage" the antenna gain and directivity at any shape that we want. The energy distribution depicted by FIG. 22B is typical of the far field structure of TM radiating modes. Here, the associated gain can also be high, but not as high as in the TE mode.

FIG. 22C depicts an artistic rendition of the combination of homotopy groups of 2110 and 2120 that results in homotopy group of 2130, similar to that depicted in FIG. 21C, but with the families of curves 2210, 2220, 2230 superimposed thereon. The additional families of curves 2240 and 2250 depicted in FIG. 22C are the result of the interaction between the broadside radiation pattern of homotopy group of 2120 and the end-fire radiation pattern of homotopy group of 2110. The result is a 3D pattern or topological space that can be represented by a homotopy group with many elements (classes of curves). The mixed symmetry and many elements of homotopy group of 2130 is associated with close frequency proximity of the TE and TM modes. The far field radiation pattern can be topologically described by the family of contractible curves that define the homotopy group structure of the far field, where the number (n) of the family of curves defines the class of the respective homotopy group. For a pure TE radiating mode, such as depicted by homotopy group of 2110, n is equal to 1. For a pure TM radiating mode, such as depicted by homotopy group of 2120, n is equal to 2. For a mixed symmetry TE-TM radiating mode, such as depicted by homotopy group of 2130, n is greater than 2. As can be seen by comparing homotopy groups of 2110, 2120 and 2130 with each other, an antenna becomes less directive (more field cancellations) as the number of classes n (families of curves) increases. With respect to the number of classes n, the average gain of an antenna may be approximated by:

$$\text{Average Gain} \approx 1/(n^\delta); \quad \text{Equa. 21}$$

where n defines the class number, and $\delta > 2$ with the actual value of $\delta$ being dependent on antenna structure and size.

Based on the symmetry considerations disclosed herein, an empirical formula for TE and TM mode gains can be defined as:

$$\text{Gain}_{TE,TM} \approx 6 \text{ dB} - [5(0.6-\alpha)] \text{ dB}; \quad \text{Equa. 22}$$

$$\text{where } \alpha \equiv (f_{TM} - f_{TE})/f_{TE}; \quad \text{Equa. 23}$$

and where $f_{TE}$ is the frequency of the TE radiating mode, and $f_{TM}$ is the frequency of the TM radiating mode. In the above equations, $\alpha$ is the percentage frequency difference, which represents the difference between the electrical paths excited respectively for the TE and TM radiating modes, depends on the symmetry of the radiating structure, and satisfies the following relationship:

$$0 = <\alpha = <0.6. \quad \text{Equa. 24}$$

Variable α also defines the upper limit for the radiating bandwidth to be 60%, as noted by reference to FIG. 20 and the associated description thereto above, particularly Equa. 20 showing closer to 65%.

Recognizing that Equa. 22 is an empirically derived formula, it should be noted that the "6 dB" value correlates to and is determined by the size of the ground structure of the antenna, that the "0.6" value correlates to the maximum bandwidth of 60% discussed herein above, and that the "5" value serves to force a 3 dB gain at α=0. As can be seen by Equa. 22, at α=0 the antenna gain is approximately 3 dB in all directions, the TE, TM frequencies coincide, and none of the radiating directions are dominant. At α=0.6, the TE and TM frequencies are far apart and both have respectively high gains.

An alternative empirical formula for TE and TM mode gains utilizing Equas. 21 and 22 can be defined as:

$$\text{Gain}_{TE,TM} = 6 \text{ dB} - [5(0.6 - 0.6/n^\delta)]\text{dB} = 6 \text{ dB} - [3(1 - 1/n^\delta)]\text{dB}. \quad \text{Equa. 25}$$

As discussed above, in Equa. 25 n=1 represents a pure TE radiating mode, n=2 represents a pure TM radiating mode, and n>2 represents a TE, TM mixed radiating mode.

Referring back to FIG. 19 and the associated equations, a more general formula for the special case of two concentric hemispherical layers can be developed as follows:

$$\text{TE Half Wavelength Resonance (Path-1)} = \pi R \sqrt{\varepsilon_1}; \text{ and} \quad \text{Equa. 26}$$

$$\text{TM Half Wavelength Resonance (Path-2)} = \beta R \sqrt{\varepsilon_2} + (1-\beta) R \sqrt{\varepsilon_1} + \pi R/2 \sqrt{\varepsilon_1}. \quad \text{Equa. 27}$$

Where:
R is defined above;
$\varepsilon_1$ represents a high Dk material of the outer layer;
$\varepsilon_2$ represents a low Dk material of the inner layer; and
β is a parameter, where $0 \leq \beta \leq 1$.

The case of β=0 represents a solid hemisphere similar to that of FIG. 18, and the case of β=1 represents a hemispherical layered DRA similar to that of FIG. 19.

The ratio of Path-1 to Path-2 yields the result:

$$\text{Path} - 1 / \text{Path} - 2 = \quad \text{Equa. 28}$$

$$\pi R \sqrt{\varepsilon_1} \Big/ \left[ \beta R \sqrt{\varepsilon_2} + (1-\beta) R \sqrt{\varepsilon_1} + \pi R/2 \sqrt{\varepsilon_1} \right] =$$

$$\pi \sqrt{\varepsilon_1} \Big/ \left[ \beta \sqrt{\varepsilon_2} + (1-\beta) R \sqrt{\varepsilon_1} + \pi R/2 \sqrt{\varepsilon_1} \right]. \quad \text{Equa. 29}$$

As can be seen from Equa. 29 the ratio of (Path-1/Path-2) is independent of the radius R of the DRA for this special case.

For the case of β=0;

$$\text{Path} - 1 / \text{Path} - 2 = \left[ \frac{2\pi}{2 + \pi} \right]. \quad \text{Equa. 30}$$

For the case of β=½;

$$\text{Path} - 1 / \text{Path} - 2 = \left[ \frac{2\pi \sqrt{\varepsilon_1}}{\sqrt{\varepsilon_2} + (\pi + 1) \sqrt{\varepsilon_1}} \right]. \quad \text{Equa. 31}$$

For the case of β=1 (disclosed embodiment type);

$$\text{Path} - 1 / \text{Path} - 2 = \left[ \frac{2\pi \sqrt{\varepsilon_1}}{2\sqrt{\varepsilon_2} + \pi \sqrt{\varepsilon_1}} \right]. \quad \text{Equa. 32}$$

With respect to frequency separation for the TE and TM modes for this special case of two concentric hemispherical layers of dielectric material, the percentage frequency separation can also be written in terms of the paths as follows:

$$\frac{f_{TM} - f_{TE}}{f_{TE}} = \frac{\Delta f}{f_{TE}} = \quad \text{Equa. 33}$$

$$\frac{\frac{c}{\lambda_{TM}} - \frac{c}{\lambda_{TE}}}{\frac{c}{\lambda_{TE}}} = \frac{\frac{1}{\lambda_{TM}} - \frac{1}{\lambda_{TE}}}{\frac{1}{\lambda_{TE}}} = \quad \text{Equa. 34}$$

$$\frac{\frac{\lambda_{TE} - \lambda_{TM}}{\lambda_{TM} \lambda_{TE}}}{\frac{1}{\lambda_{TE}}} = \frac{\lambda_{TE} - \lambda_{TM}}{\lambda_{TM}} = \quad \text{Equa. 35}$$

$$(\text{Path1} - \text{Path2}) / \text{Path2} = \quad \text{Equa. 36}$$

$$\frac{\pi R \sqrt{\varepsilon_1} - \left( \beta R \sqrt{\varepsilon_2} + (1-\beta) R \sqrt{\varepsilon_1} + \frac{\pi R}{2} \sqrt{\varepsilon_1} \right)}{\beta R \sqrt{\varepsilon_2} + (1-\beta) R \sqrt{\varepsilon_1} + \frac{\pi R}{2} \sqrt{\varepsilon_1}} = \quad \text{Equa. 37}$$

$$\frac{\pi R \sqrt{\varepsilon_1} - \beta R \sqrt{\varepsilon_2} - (1-\beta) R \sqrt{\varepsilon_1} - \frac{\pi R}{2} \sqrt{\varepsilon_1}}{\beta R \sqrt{\varepsilon_2} + (1-\beta) R \sqrt{\varepsilon_1} + \frac{\pi R}{2} \sqrt{\varepsilon_1}} = \quad \text{Equa. 38}$$

$$\frac{\pi R \sqrt{\varepsilon_1} - 2\beta R \sqrt{\varepsilon_2} - 2(1-\beta) R \sqrt{\varepsilon_1}}{2\beta R \sqrt{\varepsilon_2} + 2(1-\beta) R \sqrt{\varepsilon_1} + \pi R \sqrt{\varepsilon_1}} = \quad \text{Equa. 39}$$

$$\frac{[\pi - 2(1-\beta)] \sqrt{\varepsilon_1} - 2\beta \sqrt{\varepsilon_2}}{[\pi + 2(1-\beta)] \sqrt{\varepsilon_1} + 2\beta \sqrt{\varepsilon_2}} = \quad \text{Equa. 40}$$

$$= \begin{cases} 22\% \text{ for } \beta = 0, \varepsilon_1 = 9, \varepsilon_2 = 1 \\ 40\% \text{ for } \beta = \frac{1}{2}, \varepsilon_1 = 9, \varepsilon_2 = 1 \\ 65\% \text{ for } \beta = 1, \varepsilon_1 = 9, \varepsilon_2 = 1 \\ (\beta = 1, \text{ disclosed embodiment type}) \end{cases} \quad \text{Equa. 41}$$

Comparing Equa. 41 for β=1 with Equa. 20 shows consistency in the 65% frequency separation for the TE and TM modes for an embodiment having structure disclosed herein.

Figure 23A:
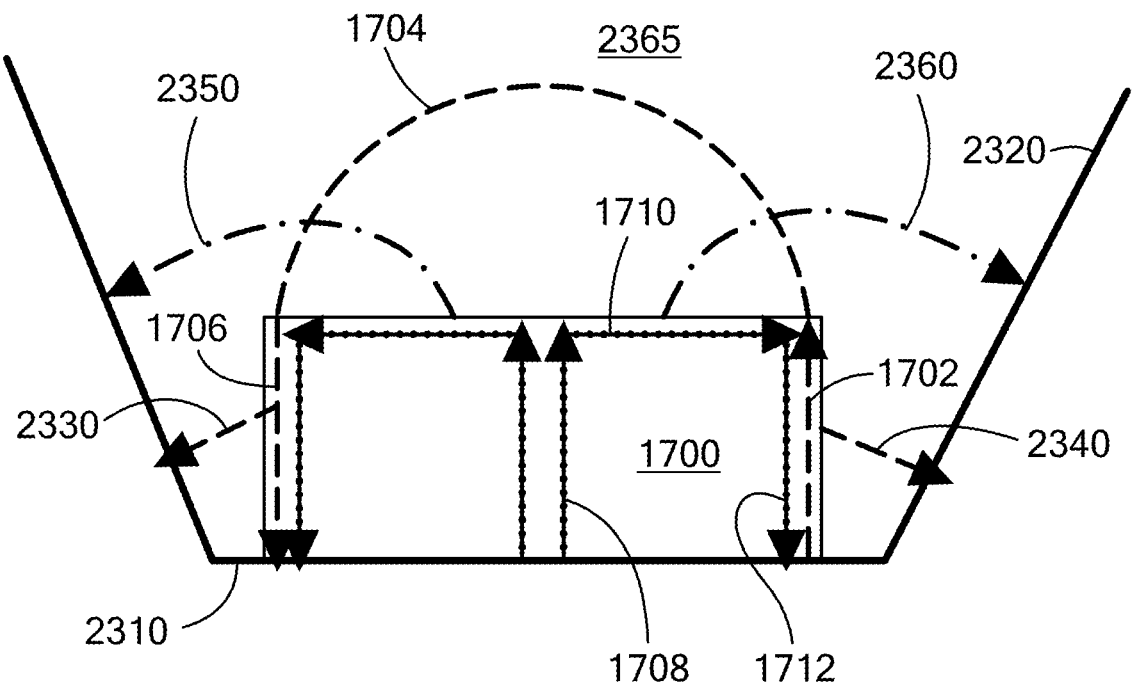
FIG. 23A depicts the DRA of FIG. 17, but with a ground structure and grounded fence.
Figure 23B:
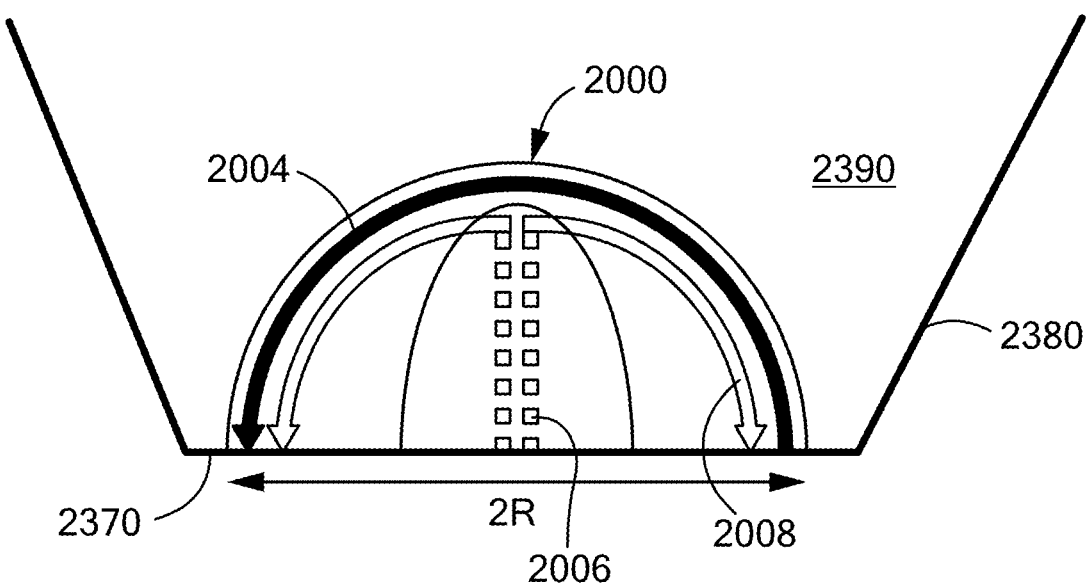
FIG. 23B depicts the DRA of FIG. 20, but with a ground structure and grounded fence.

Reference is now made to FIGS. 23A and 23B, which compare TE and TM mode field lines for the embodiments depicted in FIGS. 17 and 20, respectively, but with a fenced ground structure, similar to that depicted in FIGS. 13A, 14A and 15A. In FIG. 23A the DRA 1700 (see FIG. 17 for example) sits on an electrically conductive ground structure 2310 with electrically conductive side fences 2320 electrically connected to the ground structure 2310 and surrounding the DRA 1700. As depicted in FIG. 23A, the presence and proximity of the fence 2320 deforms both the TE and TM mode field lines, and can also introduce other paths and radiating modes the negatively affect the performance of the DRA 1700. In addition to the TE mode field lines 1702, 1704 and 1706 (see also FIG. 17 for example), the fence 2320 introduces TE mode filed lines 2330 and 2340. And, in addition to the TM mode field lines 1708, 1710 and 1712

(see also FIG. 17 for example), the fence 2320 introduces TM mode filed lines 2350 and 2360. In comparison see FIG. 23B where the DRA 2000 (see FIG. 20 for example) sits on an electrically conductive ground structure 2370 with electrically conductive side fences 2380 electrically connected to the ground structure 2370 and surrounding the DRA 2000, but as can be seen the presence and proximity of the fence 2380 does not deform the TE and TM mode field lines 2004, 2006, 2008 (see also FIG. 20 for example), or introduce other paths. In the case of DRA 2000 with ground structure 2370 and fence 2380, the TE radiating modes become DRA-cavity radiating modes, the cavity 2390 being the region within the fence 2380, where the cavity 2390 can highly improve the radiation pattern and the DRA gain, particularly where the cavity 2390 symmetry closely matches the DRA 2000 symmetry.

Figures 24A, 24B:
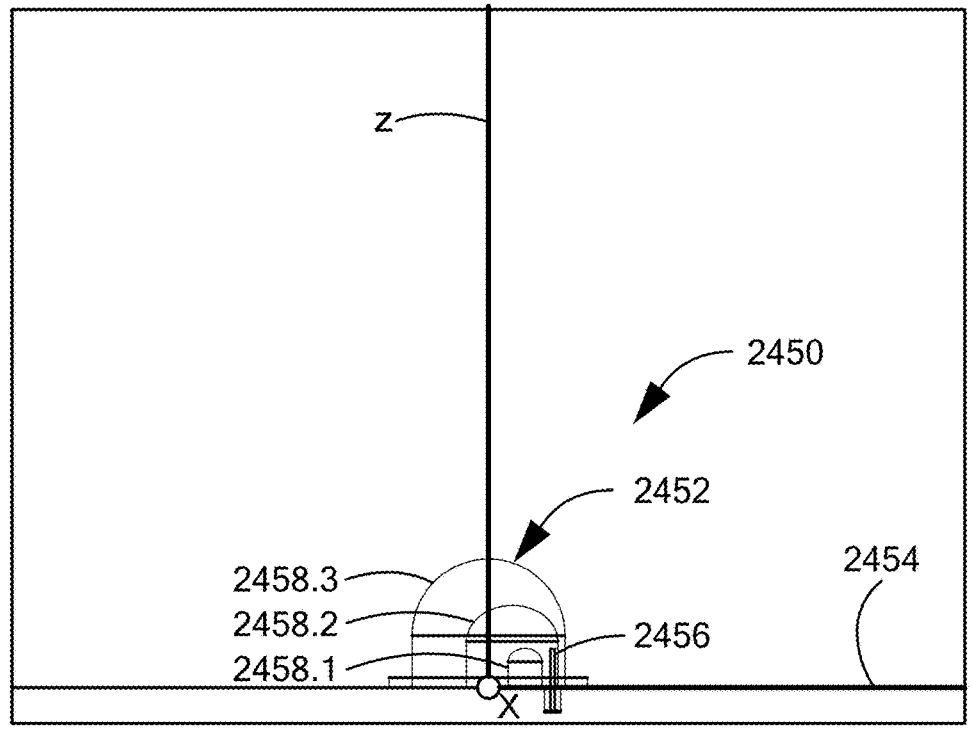
FIG. 24A depicts a model of a stacked cylindrical DRA on a ground structure.
FIG. 24B depicts a model of a three-layer sideways shifted hemispherical DRA on a ground structure.

Reference is now made to FIGS. 24A and 24B. FIG. 24A depicts a model 2400 of a stacked cylindrical DRA 2402 on a ground structure 2404 with an offset feed line 2406. Three dielectric layers are depicted 2408.1, 2408.2, 2408.3 having respective permittivities $\epsilon 1$, $\epsilon 2$, $\epsilon 3$, respective loss tangents $\tan(\delta\epsilon 1)$, $\tan(\delta\epsilon 2)$, $\tan(\delta\epsilon 3)$, and respective height dimensions H1, H2, H3, as presented in FIG. 24A. The diameter of the stacked DRA 2402, the size of the ground structure 2404, and associated dimensions of the feed line 2406 are also presented in FIG. 24A. FIG. 24B depicts a model 2450 of a three-layer hemispherical DRA 2452 in accordance with an embodiment. Similar to FIG. 24A, the DRA 2452 sits on a ground structure 2454 with an offset feed line 2456. The three dielectric layers 2458.1, 2458.2, 2458.3 are axially offset (sideways shifted) with respect to each other similar to DRA 1004 depicted in FIG. 10A, but with only three layers as opposed to five as in FIG. 10A. Other material and structural properties for the dielectric layers 2458.1, 2458.2, 2458.3, the ground structure 2454, and feed line 2456, are similar to or at least model-wise comparable to those presented with respect to the model 2400 of FIG. 24A.

Figure 25:
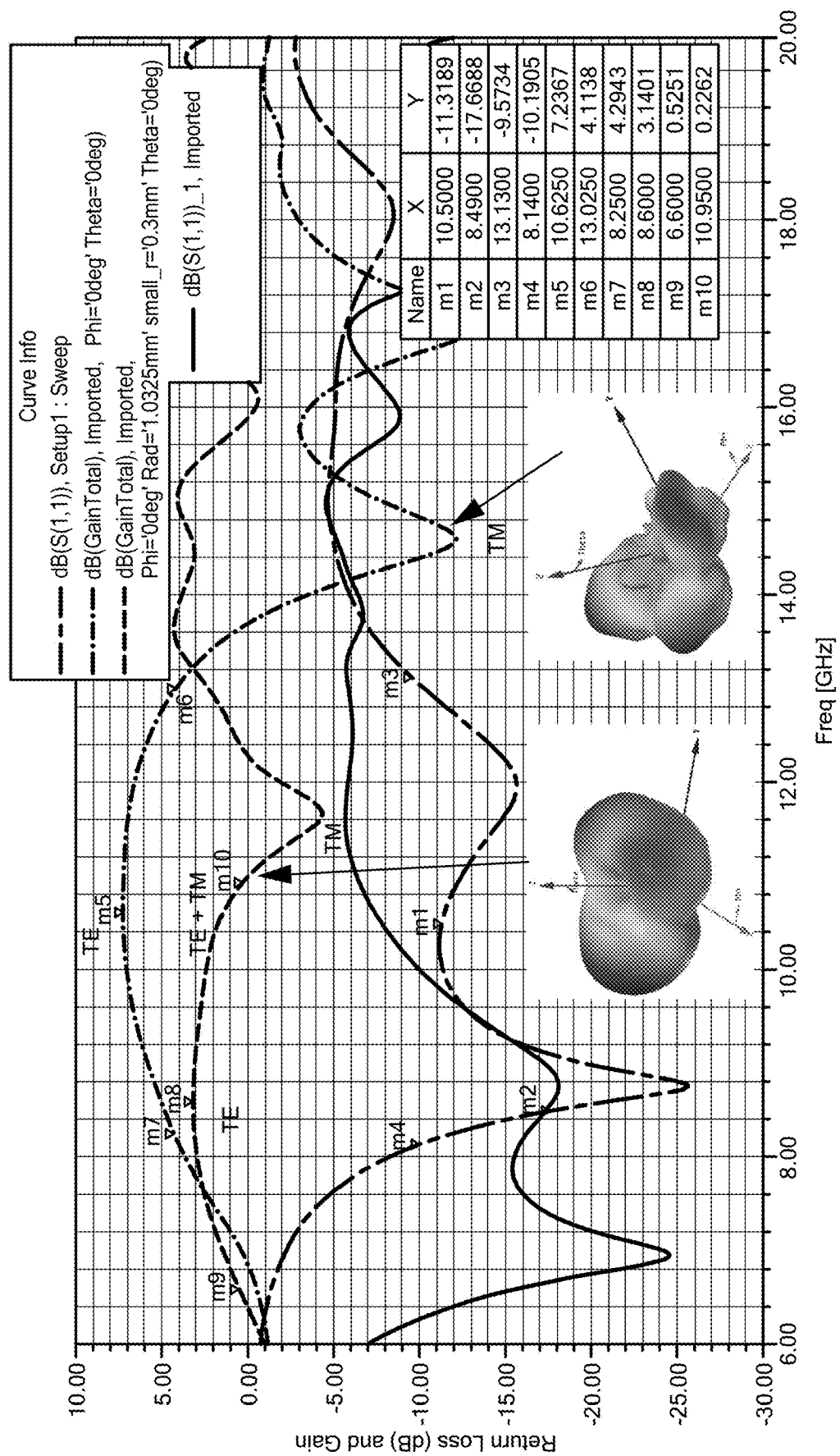
FIG. 25 depicts resulting TE and TM radiating modes and their respective gain and boresight for the models of FIGS. 24A and 24B.
Figure 26A:
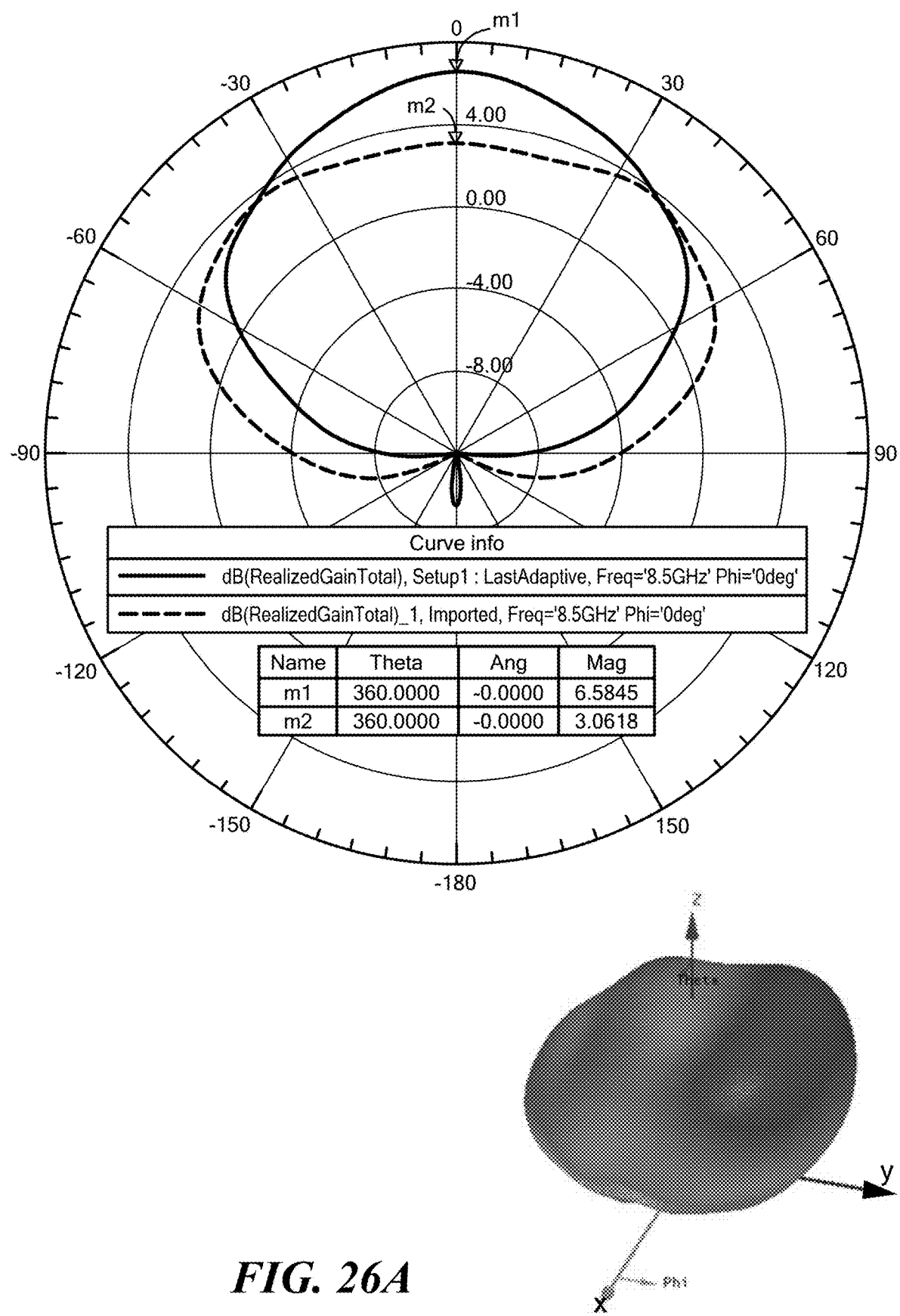
FIGS. 26A and 26B depict resulting radiation pattern for the models of FIGS. 24A and 24B.
Figure 26B:
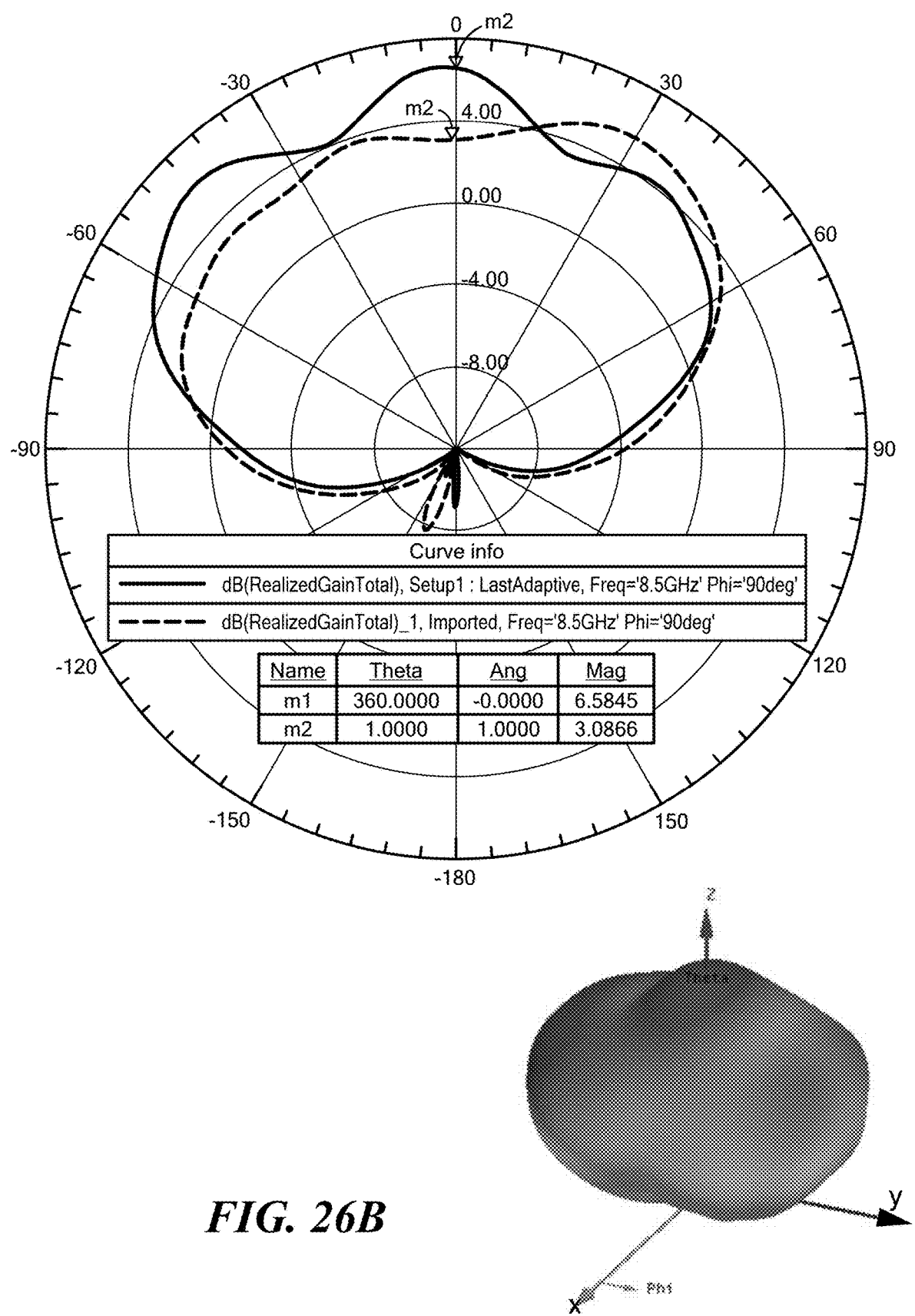

The resulting TE and TM radiating modes for both models 2400 and 2450 are depicted in FIG. 25, and the associated radiation patterns for both models 2400 and 2450 are depicted in FIGS. 26A and 26B. FIG. 25 illustrates that model 2450 with DRA 2452 has better frequency separation between the TE and TM radiating modes and a gain of about 7.2 dB as identified by marker m5 and noted in the presented table, as compared to the mixed symmetry model 2400 with DRA 2402 that results in a gain of only about 3.1 dB as identified by marker m8 and noted in the presented table. FIGS. 26A (x-plane distribution) and 26B (y-plane distribution) illustrate that model 2450 with DRA 2452 is significantly more directive than model 2400 with DRA 2402 by a factor of about 6.5 to 3 as identified by markers m1 and m2, respectively, and noted in the presented table.

Figure 27A:
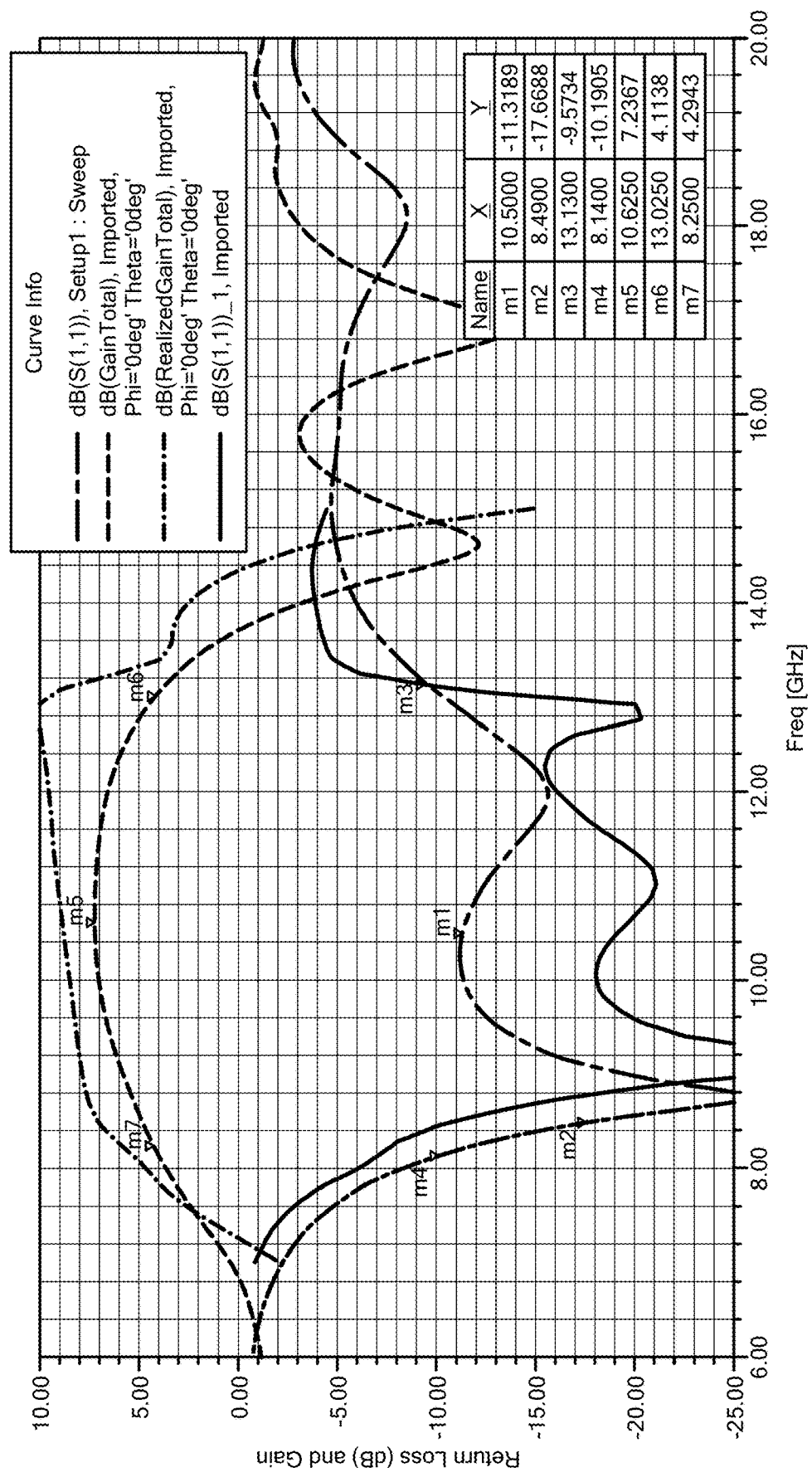
FIGS. 27A and 27B depict resulting return loss and gain for the model of FIG. 24B, with and without a fence.
Figure 27B:
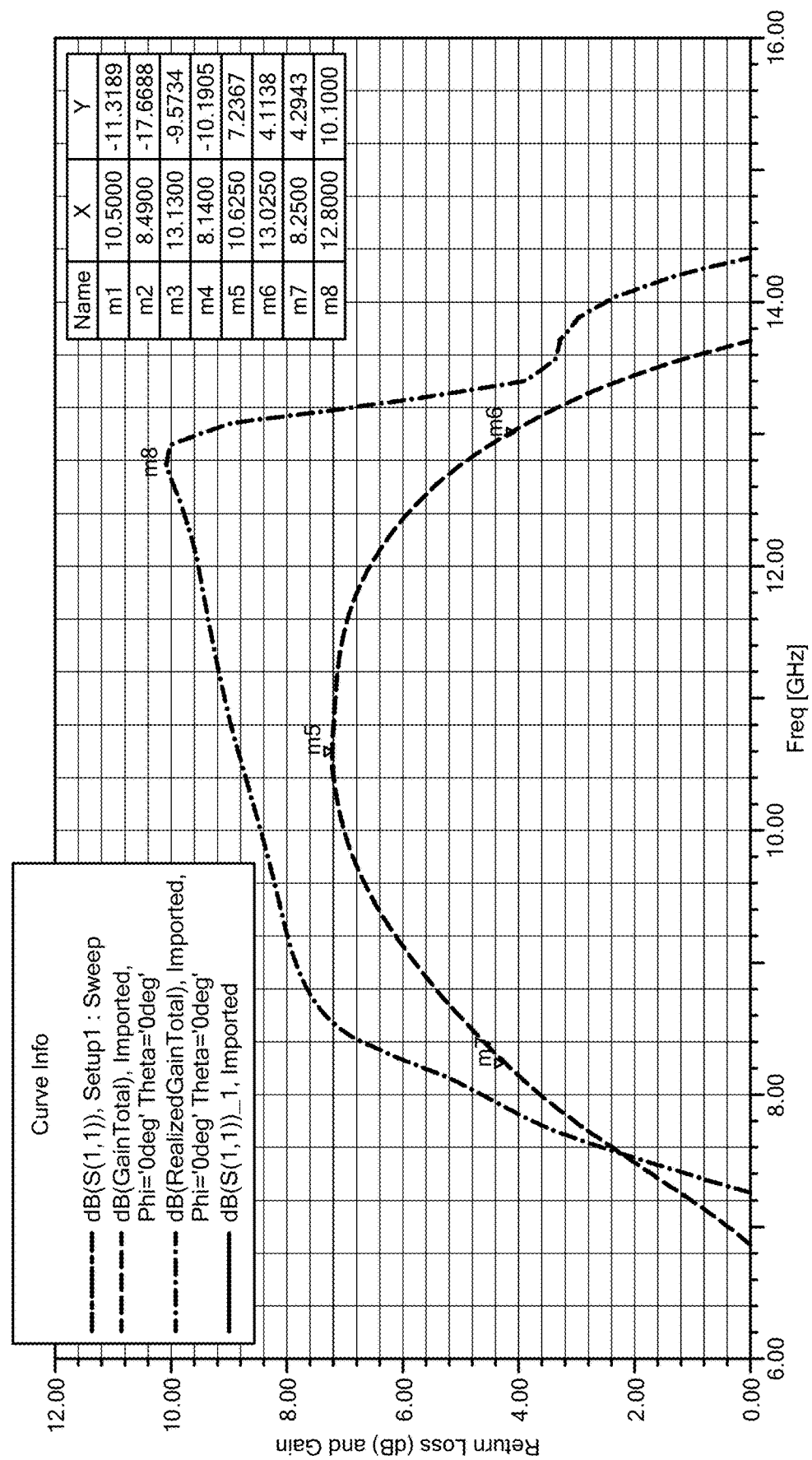

FIGS. 27A and 27B depict the S(1,1) return loss and gain of an embodiment disclosed herein by way of model 2450 with DRA 2452, without a fence-producing cavity as depicted in FIG. 24B, and with a fence-producing cavity 2390 as depicted in FIG. 23B. FIGS. 27A and 27B (higher resolution at the peaks as compared to FIG. 27A) illustrate that the gain of model 2450 with DRA 2452 improves with the presence of a fence 2380 by a factor of about 10.1 to 7.2 as identified by markers m8 and m5, respectively, and noted in the presented table of FIG. 27B.

Figure 28:
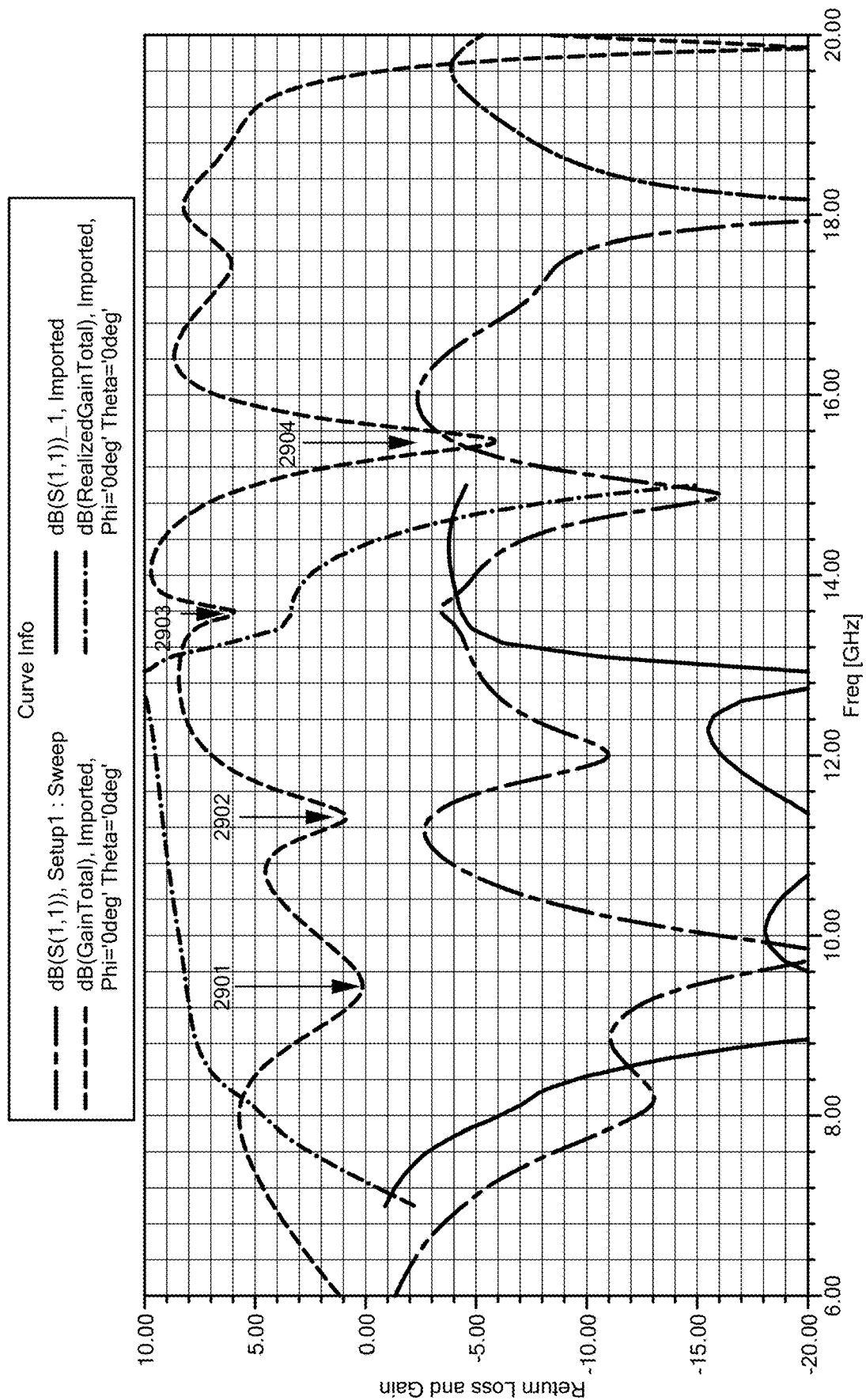
FIG. 28 depicts resulting return loss and gain for the model of FIG. 24A, but with a fence.

In comparison, FIG. 28 depicts S(1,1) return loss and gain of model 2400 with DRA 2402 depicted in FIG. 24A, but with a fence-producing cavity 2365 as depicted in FIG. 23A. FIG. 28 illustrates that the resulting gain of model 2400 with DRA 2402 has multiple radiation modes 2901, 2902, 2903, 2904 with the presence of a fence 2320 (best seen with reference to FIG. 23A), resulting in the enhancement of field imperfections.

In view of the foregoing, and particularly with respect to FIGS. 16-28 taken in combination with the other figures and associated descriptions, an embodiment of the disclosure provided herein includes a dielectric resonator antenna having a plurality of volumes of dielectric materials wherein each volume of the plurality of volumes is hemispherically or dome shaped. In an embodiment, each volume of the plurality of volumes of dielectric materials is axially centered with respect to each other volume. In another embodiment, each volume of the plurality of volumes of dielectric materials is centrally shifted in a same sideways direction relative to each other volume. In an embodiment, the first volume V(1) has a vertically oriented ellipsoidal shape. In an embodiment, the vertically oriented ellipsoidal shape of the first volume V(1) is axially oriented with respect to a central z-axis of the plurality of volumes. In an embodiment, the first volume V(1) has a dielectric constant equal to that of air. In an embodiment, a peripheral geometrical path at a periphery of the plurality of volumes of dielectric materials (see 2008, FIG. 20, for example) has a dielectric constant that supports a TM radiating mode in the peripheral geometrical path, and a central geometrical path within the plurality of volumes of dielectric materials (see 2006, FIG. 20, for example) has a dielectric constant that suppresses the TM radiating mode in the central geometrical path. In an embodiment, the TM radiating mode in the central geometrical path is completely suppressed. In an embodiment, the plurality of volumes of dielectric materials have a first electrical path with a first path length defined by a TE half wavelength resonance, and have a second geometrical path with a second path length defined by a TM half wavelength resonance, a ratio of the first path length to the second path length being equal to or greater than 1.6. While the foregoing embodiments described herein above with particular reference to FIGS. 16-28 have been described individually, it will be appreciated that other embodiments include any and all combinations of features described herein that are consistent with the disclosure herein.

Figure 29:
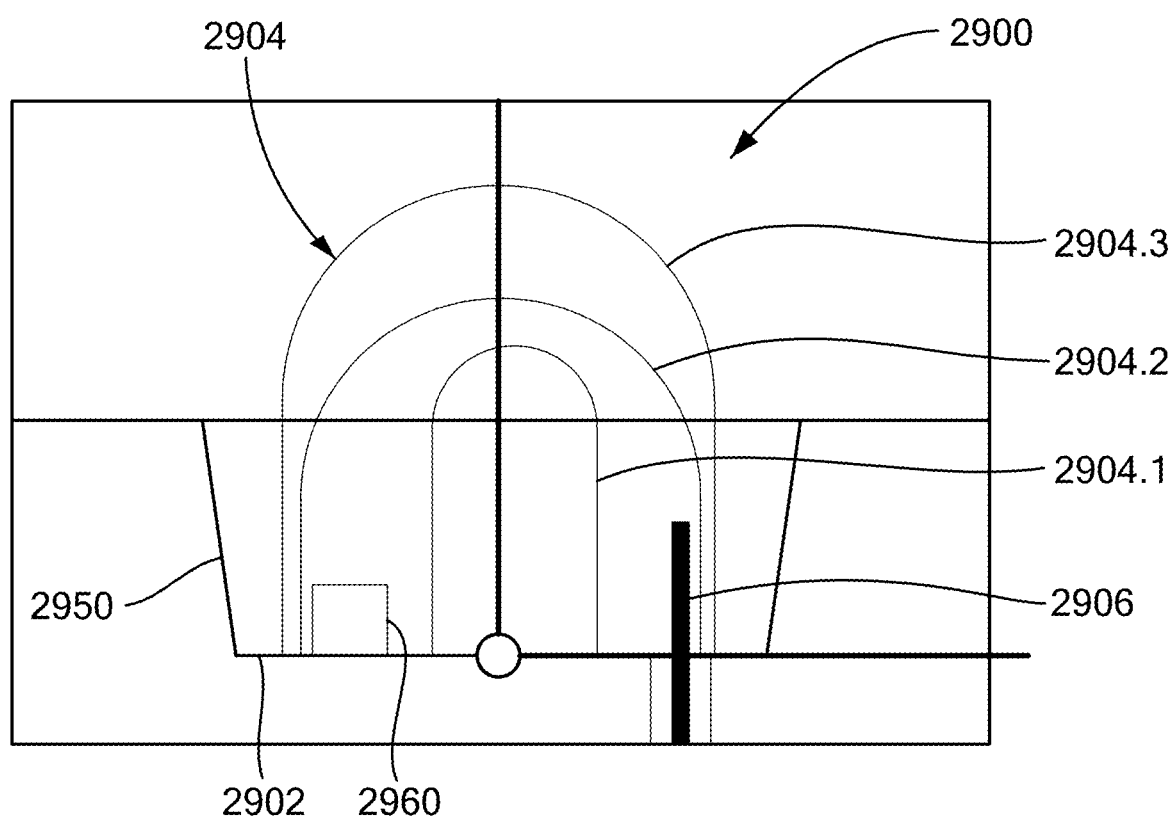
FIG. 29 depicts an alternate DRA having an auxiliary volume of material V(A) in accordance with an embodiment.

Reference is now made to FIG. 29, which depicts a DRA 2900 similar to the DRA 2000 depicted in FIG. 20 (absent a fence/reflector) and FIG. 23B (with a fence/reflector) having a dome-shaped top, but with a signal feed 2906 illustrated. DRA 2900 has a plurality of volumes of dielectric materials 2904 that includes a first volume 2904.1, a second volume 2904.2, and a third volume 2904.3, each volume having a dome-shaped top. It will be appreciated, however, that DRA 2900 may have any number of volumes of dielectric materials suitable for a purpose disclosed herein. In an embodiment, DRA 2900 has an electrically conductive fence 2950 surrounding the plurality of volumes of dielectric materials 2904 that is electrically connected with and forms part of the ground structure 2902. DRA 2900 also includes an auxiliary volume V(A) 2960 of material disposed within the plurality of volumes of dielectric materials 2904, the volume V(A) 2960 being disposed diametrically opposing the signal feed 2906 and embedded, or at least partially embedded, in the same volume V(i) 2904.2 of the plurality of volumes of dielectric materials 2904 that the signal feed 2906 is disposed in or is in signal communication with, the volume V(A) 2960 having less volume than the volume V(i) 2904.2 that it is embedded in, the volume V(A) 2960 having a dielectric constant that is different from the dielectric constant of the volume V(i) 2904.2 that it is embedded in. Volume V(A) 2960, in combination with other features of DRA 2900, serves to influence the far field radiation pattern so that the resulting far field radiation pattern and associated gain are symmetrically shaped. In the embodiment depicted in FIG. 29, volume V(i) is the second volume V(2) 2904.2. In an embodiment, volume V(A) 2960 is completely 100% embedded in the volume V(2) 2904.2 that it is embedded in. In an embodiment, volume V(A) 2960 is disposed on the ground structure 2902. In an embodiment, volume V(A) 2960 has a height that is equal to or greater than one-tenth the height of the plurality of volumes of dielectric materials 2904, and is equal to or less than one-third the height of the plurality of volumes of dielectric materials 2904. In an embodiment, volume V(A) 2960 has a shape of a circular post, a dome, or a curved structure, but may be any shape suitable for a purpose disclosed herein. In an embodiment, volume V(A) 2960 is a metal structure. In another embodiment, volume V(A) 2960 is air. To influence the far field radiation pattern for symmetry, volume V(A) 2960 has a dielectric constant that is greater than the dielectric constant of the volume V(i) that it is embedded in, which in FIG. 29 is volume V(2).

Figure 30A:
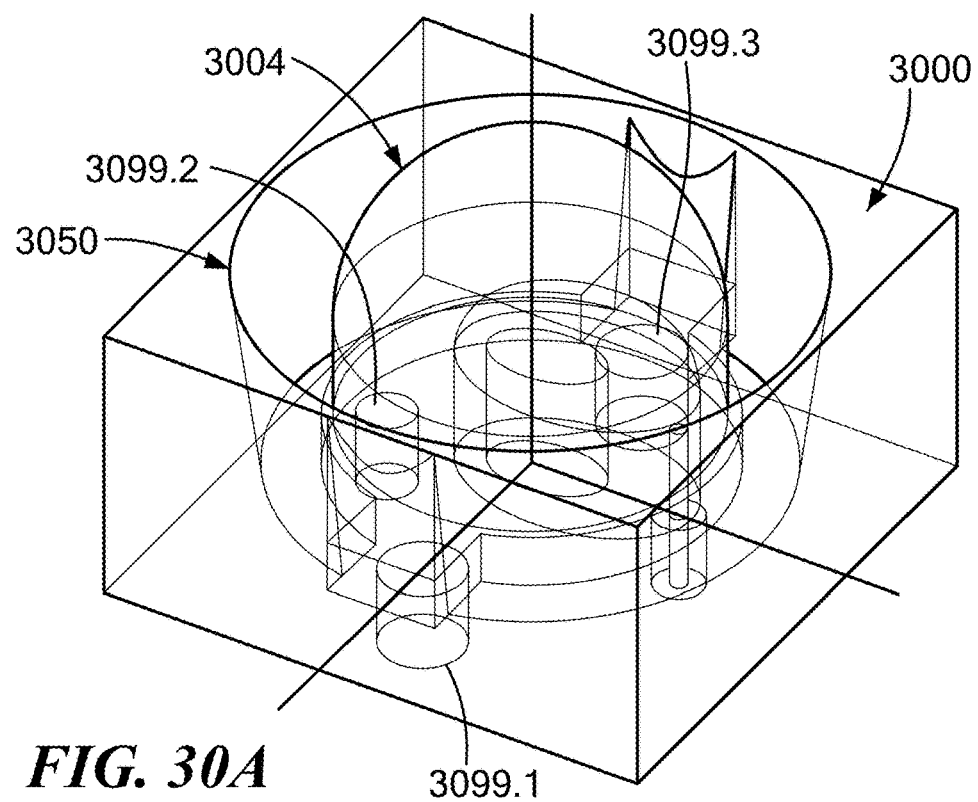
FIGS. 30A and 30B depict an alternate DRA having alignment feature in accordance with an embodiment.
Figure 30B:
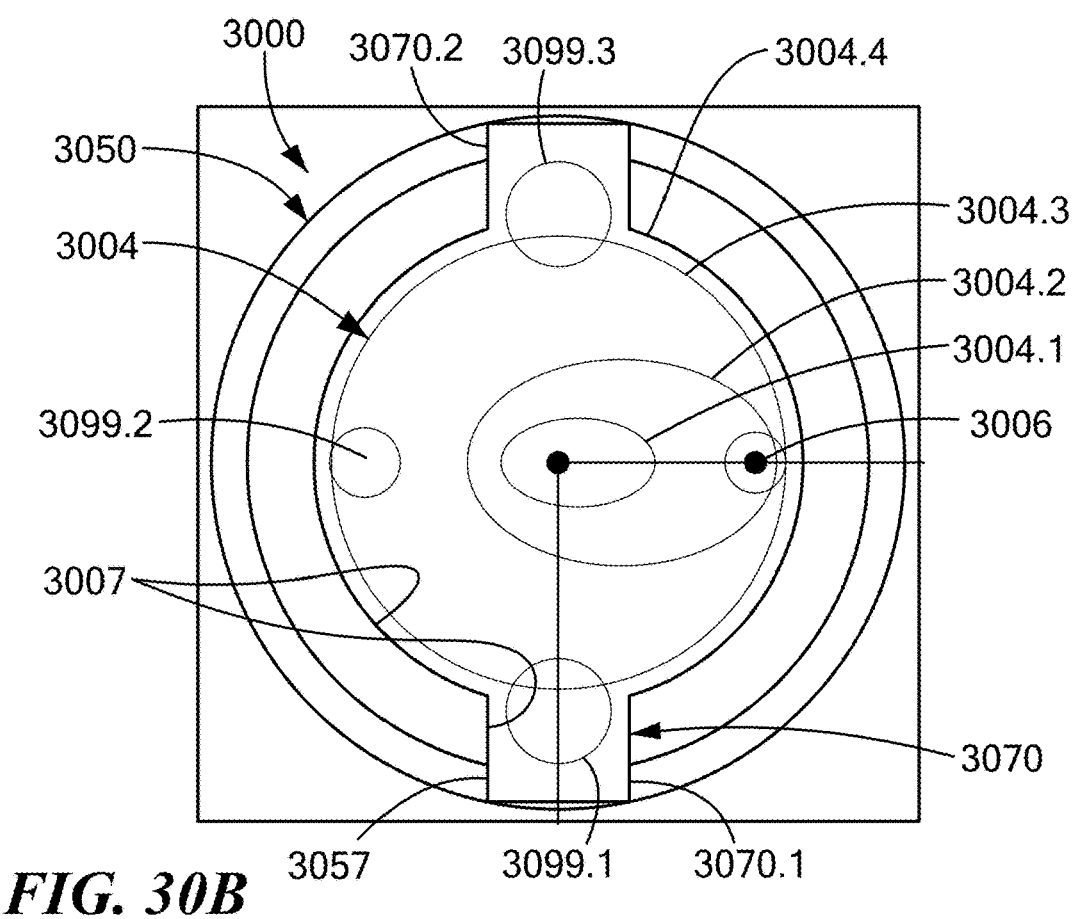

Reference is now made to FIGS. 30A and 30B, which depict a DRA 3000 having a plurality of volumes of dielectric materials 3004 and an electrically conductive fence 3050 that is electrically connected with and forms part the ground structure 3002 similar to the DRA 1300 depicted in FIG. 13A, but with alternatively shaped and arranged volumes 3004.1, 3004.2, 3004.3 and 3004.4, and with the fence 3050 having a non-uniform interior shape 3057 that provides at least one alignment feature 3070, depicted in FIGS. 30A and 30B with two alignment features 3070.1 and 3070.2. As depicted, the plurality of volumes of dielectric materials 3004, or in an embodiment the outer volume 3004.4, has a complementary exterior shape 3007 that complements the non-uniform interior shape 3057 and the at least one alignment feature 3070 of the fence 3050, such that the fence 3050 and the plurality of volumes of dielectric materials 3004 have a defined and fixed alignment relative to each other via the at least one alignment feature 3070 and complementary shapes 3007, 3057. By providing complementary alignment features between the fence 3050 and the plurality of volumes of dielectric materials 3004 an array of DRA's 3000 will be better aligned with each other resulting in improved gain and symmetry of the far field radiation pattern. In an embodiment, DRA 3000 has vertical protrudes (structural features) 3099.1, 3099.2, 3099.3 that are part of and rise up from the ground structure 3002 into one or more of the outer layers 3004.3, 3004.4 for mechanical stability.

Figure 31:
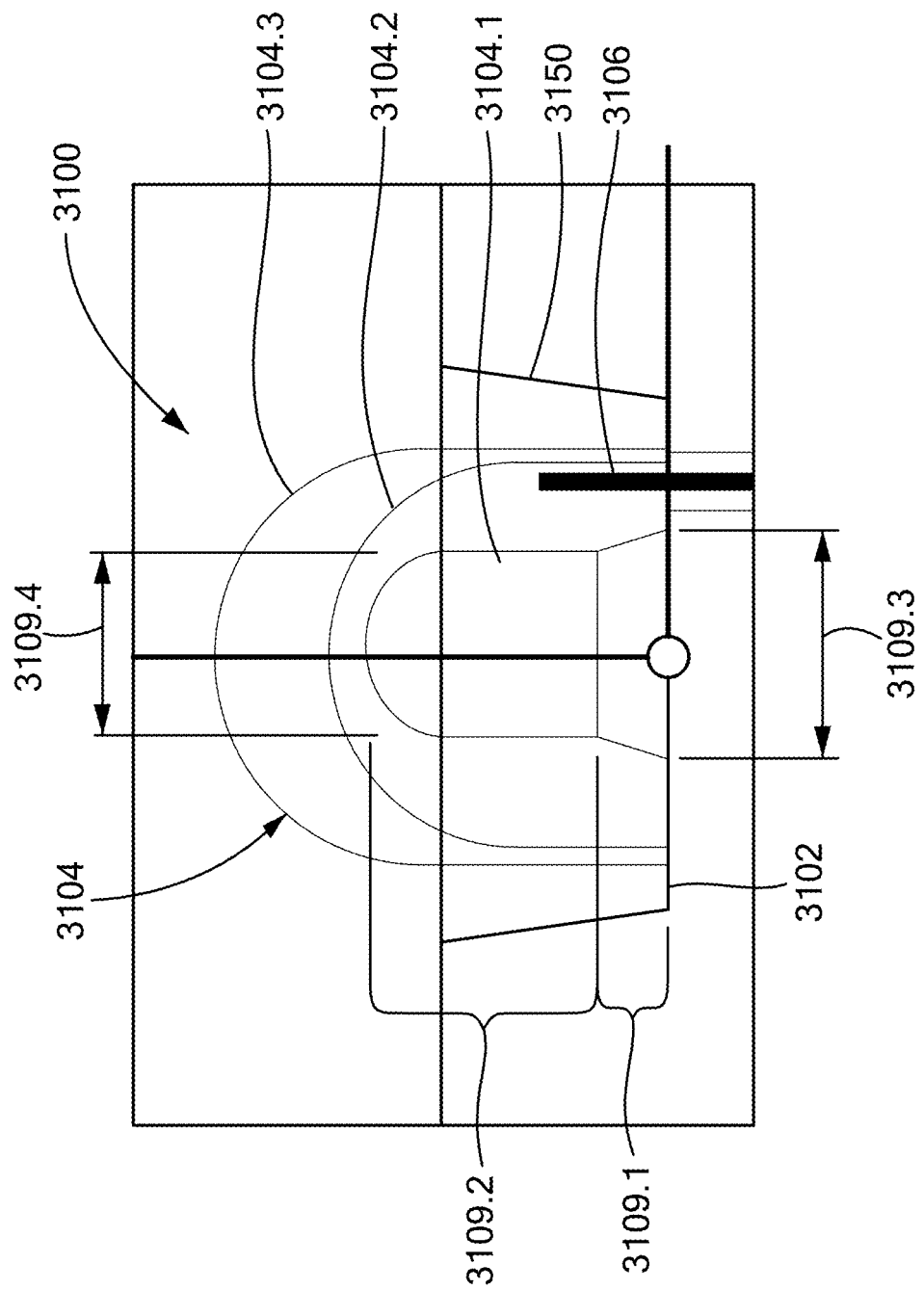
FIG. 31 depicts an alternate DRA having an additional TM-mode suppressing feature in accordance with an embodiment.

Reference is now made to FIG. 31, which depicts a DRA 3100 similar to the DRA 2900 depicted in FIG. 29, but absent an auxiliary volume V(A) of dielectric material, such as volume V(A) 2960 depicted in FIG. 29 for example. DRA 3100 is depicted having a plurality of volumes of dielectric materials 3104 that includes first, second and third volumes 3104.1, 3104.2 and 3104.3. As depicted, the first volume V(1) 3104.1 has a lower portion 3109.1 and an upper portion 3109.2, where the lower portion 3109.1 has a wider cross section 3109.3 than the cross section 3109.4 of the upper portion 3109.2. Similar to other DRA's depicted and described herein, the upper portion 3109.2 of the first volume V(1) 3104.1 has a vertically oriented at least partial ellipsoidal shape, and the lower portion 3109.1 has a tapered shape that transitions narrow-to-wide from the at least partial ellipsoidal shape, at the demarcation line between the lower portion 3109.1 and the upper portion 3109.2, to the ground structure 3102. In an embodiment, the height of the tapered shape, or funnel shape, is equal to or greater than one-tenth the height of volume V(1) 3104.1 and equal to or less than one-half the height of volume V(1) 3104.1. While reference is made herein to a tapered or funnel shaped lower portion 3109.1, it will be appreciated that the lower portion 3109.1 may have any shape suitable for a purpose disclosed herein as long as it has a wider cross section than the upper portion 3109.2. In an embodiment, an electrically conductive fence 3150 surrounds the plurality of volumes of dielectric materials 3104 and is electrically connected with and forms part of the ground structure 3102. By shaping the lower portion 3109.1 of the first volume V(1) 3104.1 to be wider than the upper portion 3109.2, it has been found that the first volume V(1) 3104.1 further suppresses the source of spurious TM modes of radiation in the central geometric path of the first volume V(1) 3104.1 without affecting the TE mode path of the DRA 3100.

Figure 32:
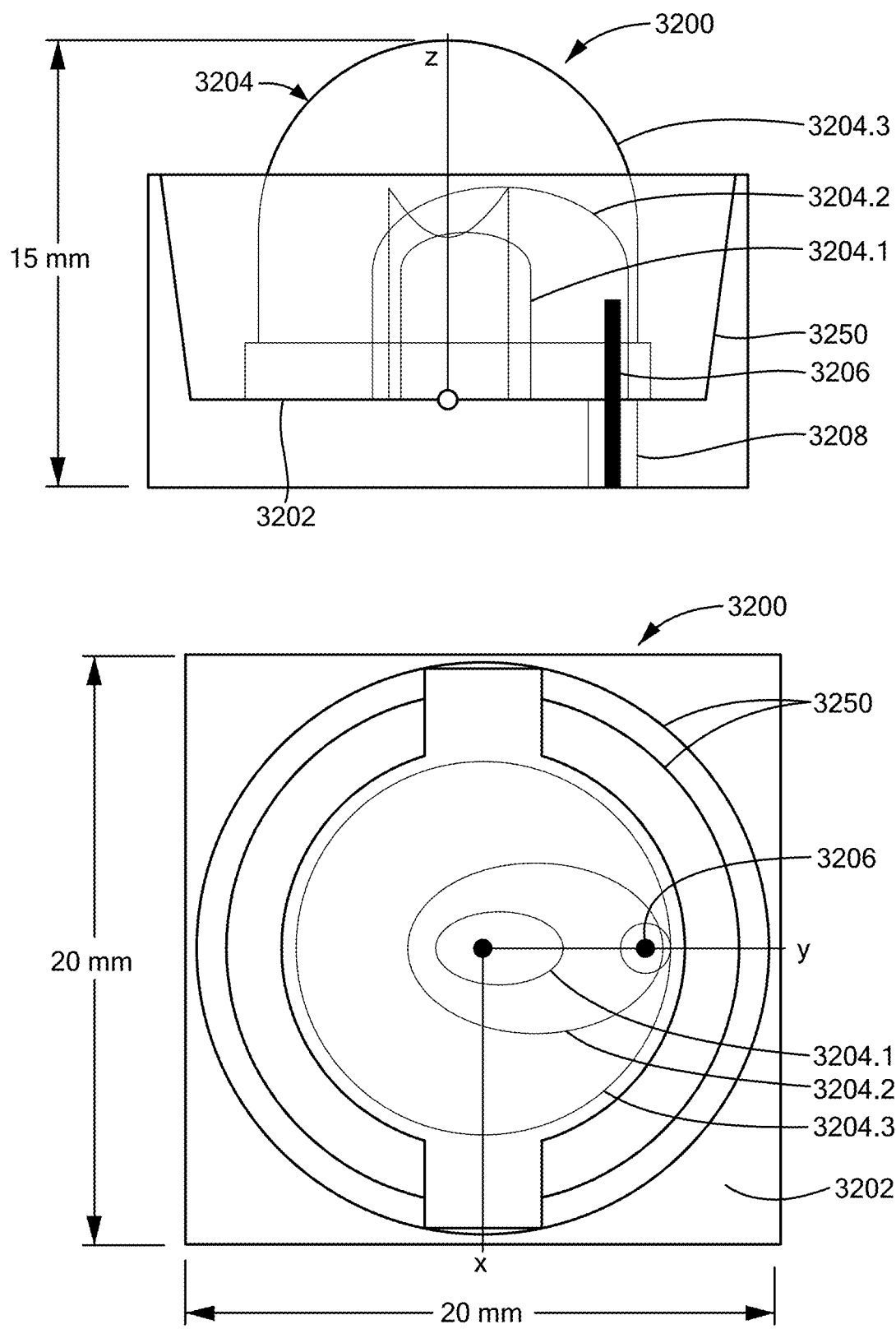
FIGS. 32, 32A, 33, 33A, 34 and 34A depict scaled DRA's in accordance with an embodiment.
Figure 32A:
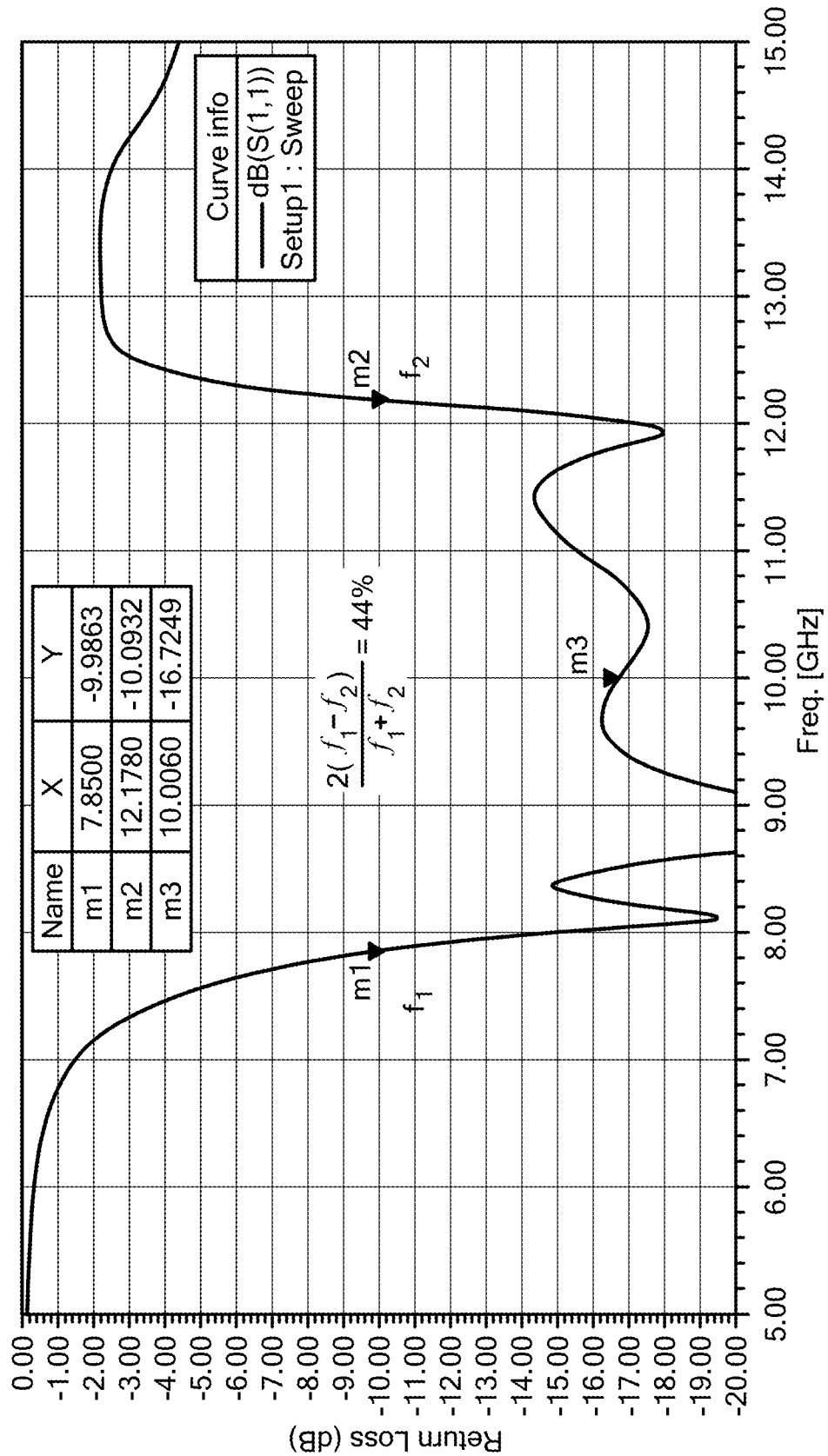
Figure 33:
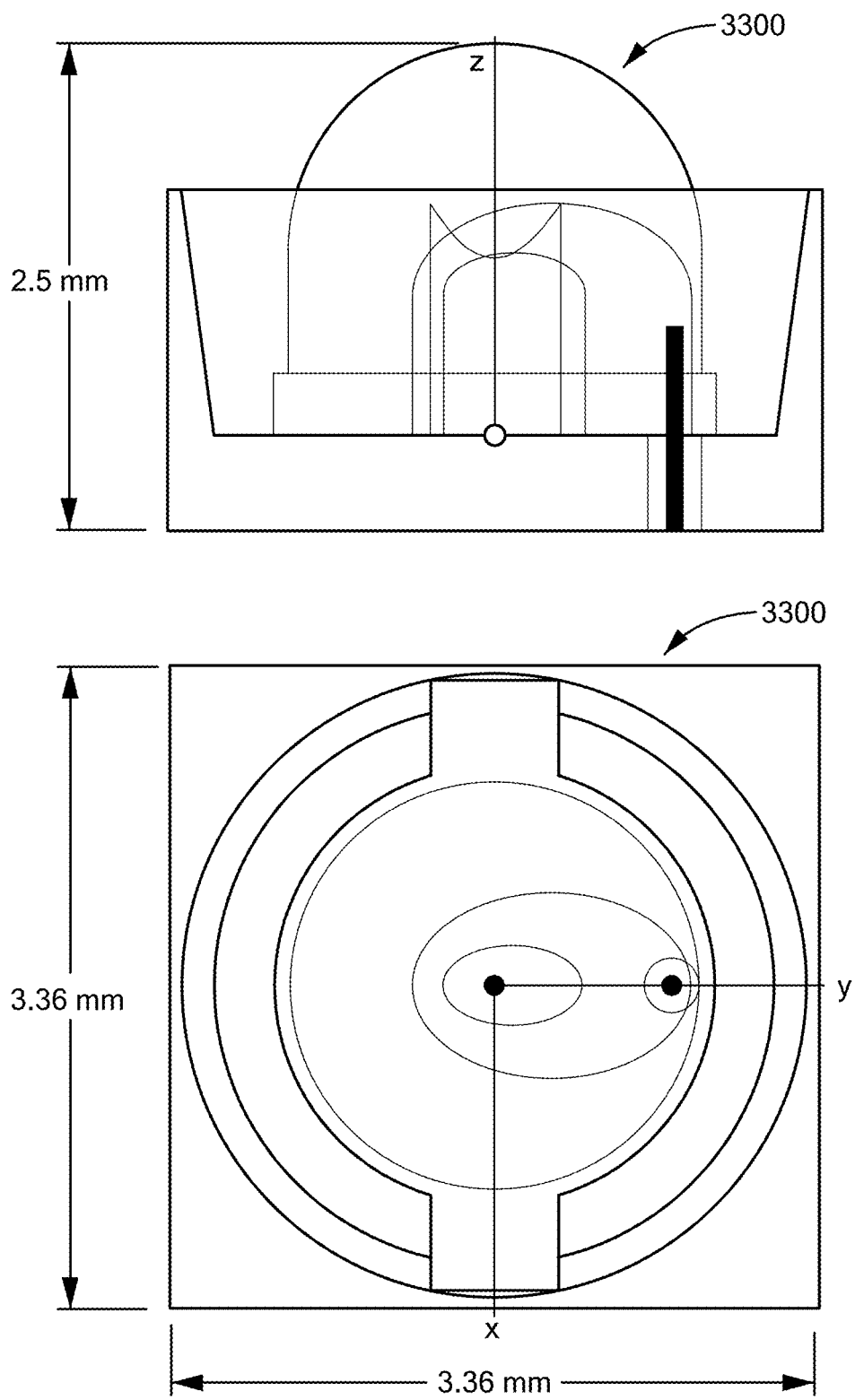
Figure 33A:
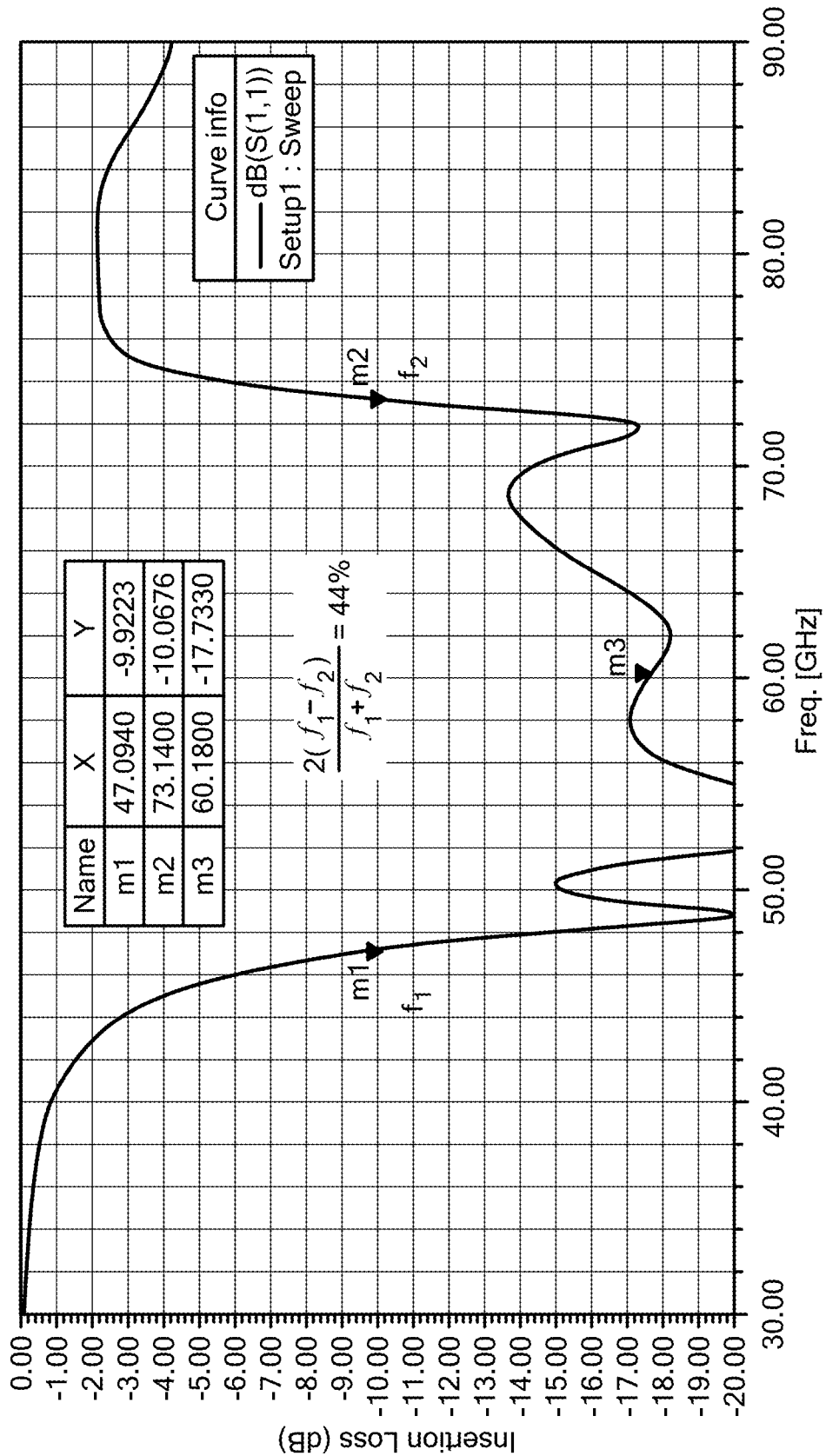
Figure 34:
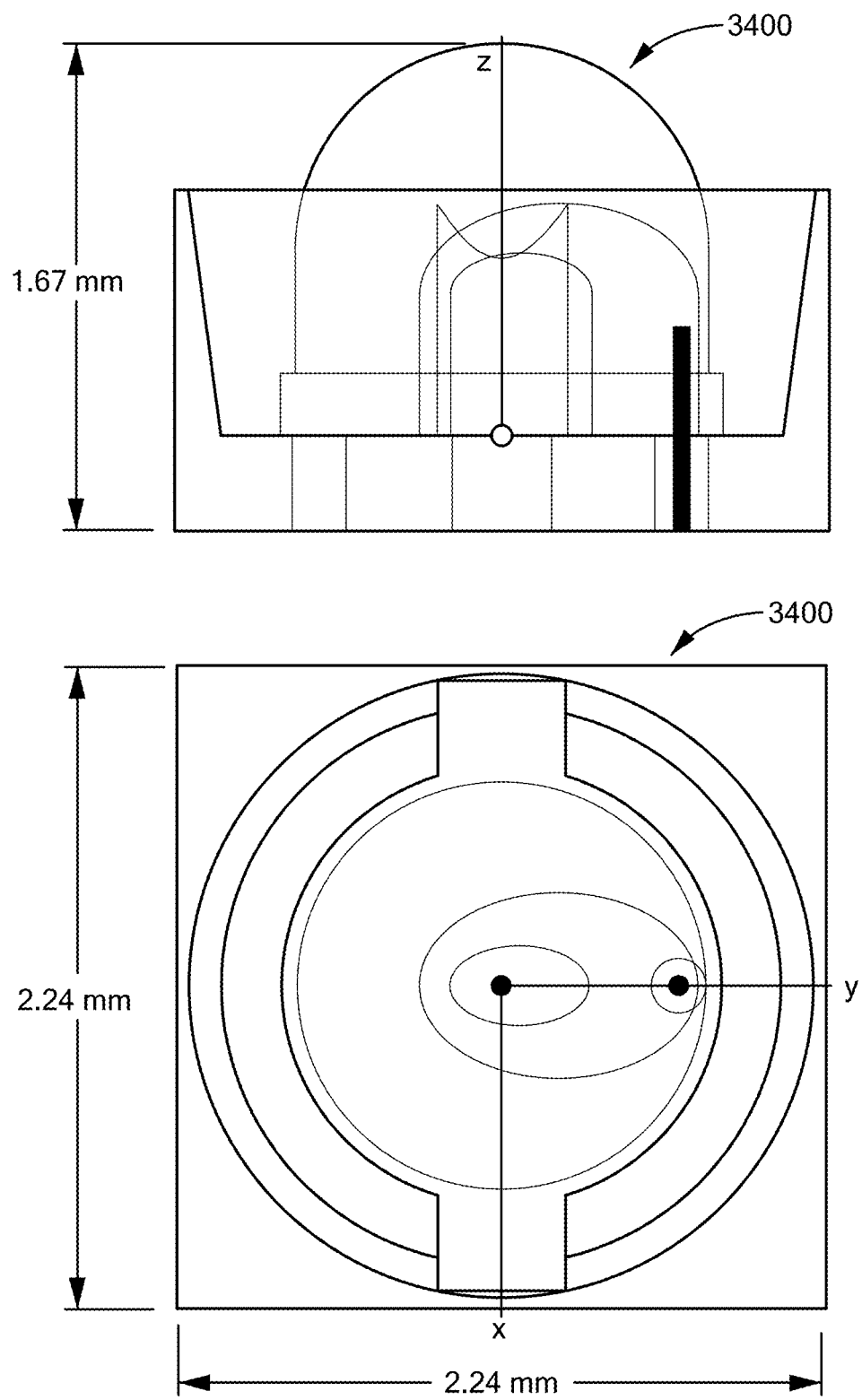

Reference is now made to FIGS. 32-34, which collectively serve to illustrate an advantage of the family of DRA's disclosed herein. By scaling the dimensions of the DRA components down, the center frequency at which the associated antenna resonates at scales up, with the same scaling factor. To provide an example of such scaling, a DRA similar to DRA 3000 depicted in FIGS. 30A and 30B is analytically modeled. FIGS. 32, 32A, 33, 33A, 34 and 34A depict DRA's 3200, 3300 and 3400, respectively, in both an elevation view (top view) and a plan view (bottom view), along with a plot of the return loss S(1,1) showing the resulting 10 dB percentage bandwidth. As can be seen, each DRA 3200, 3300 and 3400 has the same overall construction, which will be described with reference to DRA 3200 depicted in FIG. 32, but with different dimensions, which will be discussed with reference to FIGS. 32, 33 and 34 collectively.

As depicted in FIG. 32, DRA 3200 has a plurality of volumes of dielectric materials 3204 with a first volume V(1) 3204.1 embedded within a second volume V(2) 3204.2, and a third volume V(3) 3204.3 that embeds volumes V(1) 3204.1 and V(2) 3204.2. The elevation view of FIG. 32 depicts each volume of the plurality of volumes of dielectric materials 3204 having a dome-shaped top. The plan view of FIG. 32 depicts each volume V(1) 3204.1 and V(2) 3204.2 having an elliptical shaped cross section, with volume V(2) 3204.2 being sideways shifted with respect to volume V(1) 3204.1. The plan view of FIG. 32 also depicts volume V(3) 3204.3 having a circular shaped cross section, with none of the volumes V(1) 3204.1, V(2) 3204.2 and V(3) 3204.3 sharing a same central z-axis. The plurality of volumes of dielectric materials 3204 are disposed on a ground structure 3202, and are surrounded by an electrically conductive fence 3250 that is electrically connected with and forms part of the ground structure 3202. The elevation view depicts the fence 3250 having angled sidewalls, and the plan view depicts the fence 3250 having a circular shaped perimeter that mimics the circular shaped cross section of volume V(3) 3204.3. A signal feed 3206 passes through an electrically isolated via 3208 in the ground structure 3202 and is embedded within and toward a side edge of the second volume V(2) 3204.2. In the embodiment depicted and modeled with respect to FIG. 32, DRA 3200 has an overall height, from the bottom of the ground structure 3202 to the top of the plurality of dielectric materials 3204, of 15 mm, and is disposed on a ground structure 3202 having a plan view footprint with x and y dimensions of 20 mm by 20 mm, with the plurality of volumes of dielectric materials 3204 and the fence 3250 occupying a substantial portion of the 20 mm by 20 mm footprint. The DRA's 3300 and 3400 depicted in FIGS. 33 and 34, respectively, have identical analytically modeled constructions as the DRA 3200 depicted in FIG. 32, just with different scaled dimensions. As such, a detailed (repetitive) description of the embodiments of DRA's 3300 and 3400 depicted in FIGS. 33 and 34, respectively, is not necessary for a complete understanding of the subject matter disclosed herein.

In the embodiment depicted and modeled with respect to FIG. 33, DRA 3300 has an overall height, from the bottom of the ground structure to the top of the plurality of dielectric materials, of 2.5 mm, and is disposed on a ground structure having a plan view footprint with x and y dimensions of 3.36 mm by 3.36 mm, which represents a 6-to-1 reduction in size of DRA 3300 as compared to DRA 3200.

In the embodiment depicted and modeled with respect to FIG. 34, DRA 3400 has an overall height, from the bottom of the ground structure to the top of the plurality of dielectric materials, of 1.67 mm, and is disposed on a ground structure having a plan view footprint with x and y dimensions of 2.24 mm by 2.24 mm, which represents a 9-to-1 reduction in size of DRA 3400 as compared to DRA 3200.

Figure 34A:
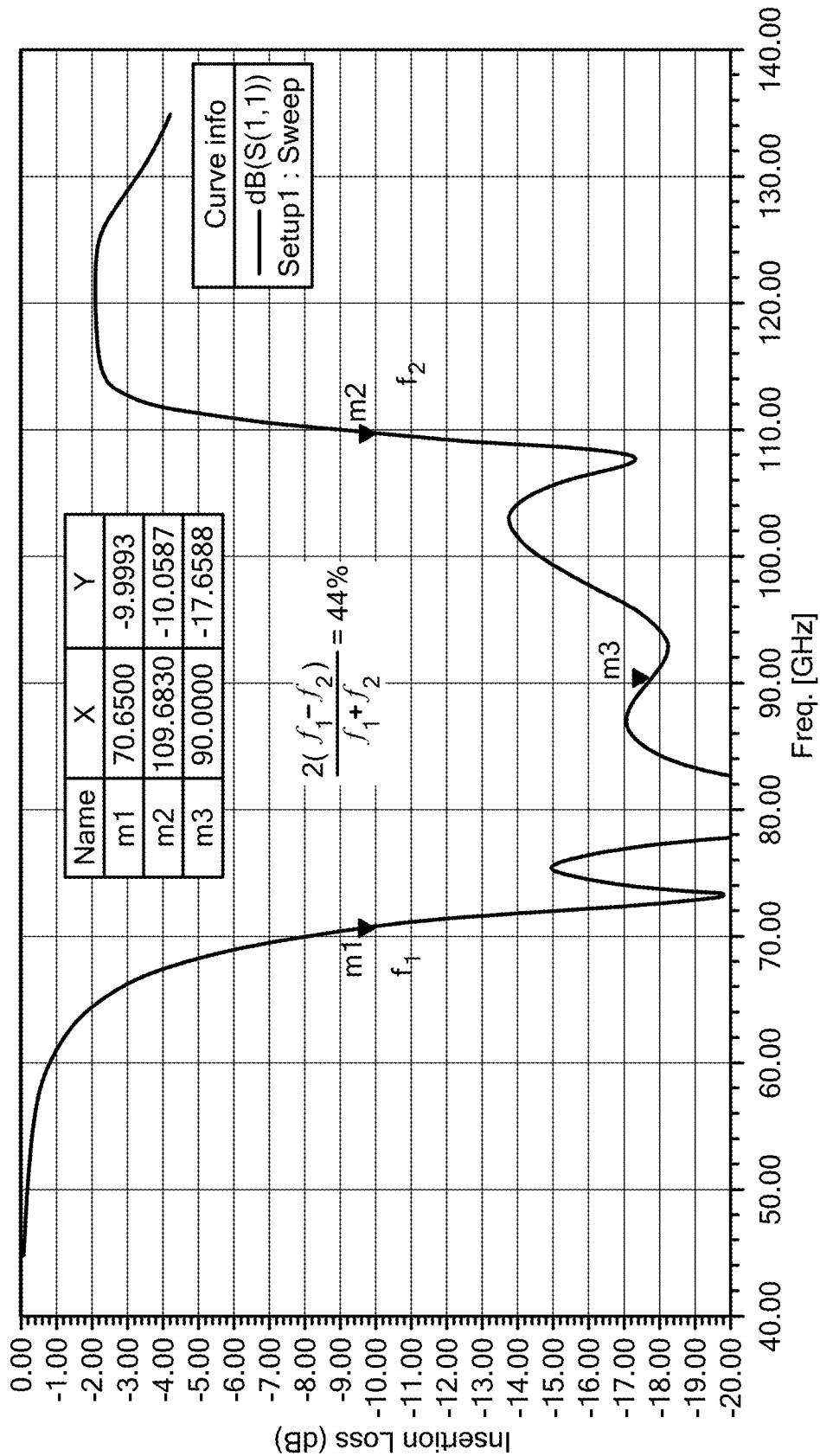

As can be seen by comparing the three plots of the return loss S(1,1) depicted in FIGS. 32A, 33A and 34A for the three scaled DRA's 3200, 3300 and 3400, the center frequency of DRA 3200 is 10 GHz, the center frequency of DRA 3300 is 60 GHz (a 6-to-1 increase over the center frequency of DRA 3200 for a 6-to-1 reduction in overall size), and the center frequency of DRA 3400 is 90 GHz (a 9-to-1 increase over the center frequency of DRA 3200 for a 9-to-1 reduction in overall size). From the foregoing, it will be appreciated that scaling down in size of a DRA disclosed herein will result in an advantageous result of a scaled up increase in center frequency resonance of the scaled DRA, with the same scaling factor, and vice versa.

As can be seen by comparing the three plots of the return loss S(1,1) depicted in FIGS. 32A, 33A and 34A for the three scaled DRA's 3200, 3300 and 3400, the dimensionless 10 dB percentage bandwidth defined according to the following, $2(f_1-f_2)/(f_1+f_2)$, where $f_1$ defines the lower end frequency of the associated 10 dB return loss, and $f_2$ defines the upper end frequency of the associated 10 dB return loss, is consistent for all three DRA's 3200, 3300 and 3400, in this case 44%, which indicates that the dimensionless percentage bandwidth for a DRA disclosed herein in a scale invariant quantity.

With further comparison of the three plots of the return loss S(1,1) depicted in FIGS. 32A, 33A and 34A for the three scale DRA's 3200, 3300 and 3400, the overall profile of the DRA return loss is also substantially scale invariant, which provides for a predicable antenna performance of any scaled antenna based on a founding scaled antenna having an initial center frequency, as the scaled up or down antenna will have the same or substantially the same electromagnetic performance as the founding scaled antenna. Applicant contemplates that this advantageous result holds true for a substantially lossless DRA disclosed herein, which has an efficiency of equal to or greater than 95%.

Figure 35:
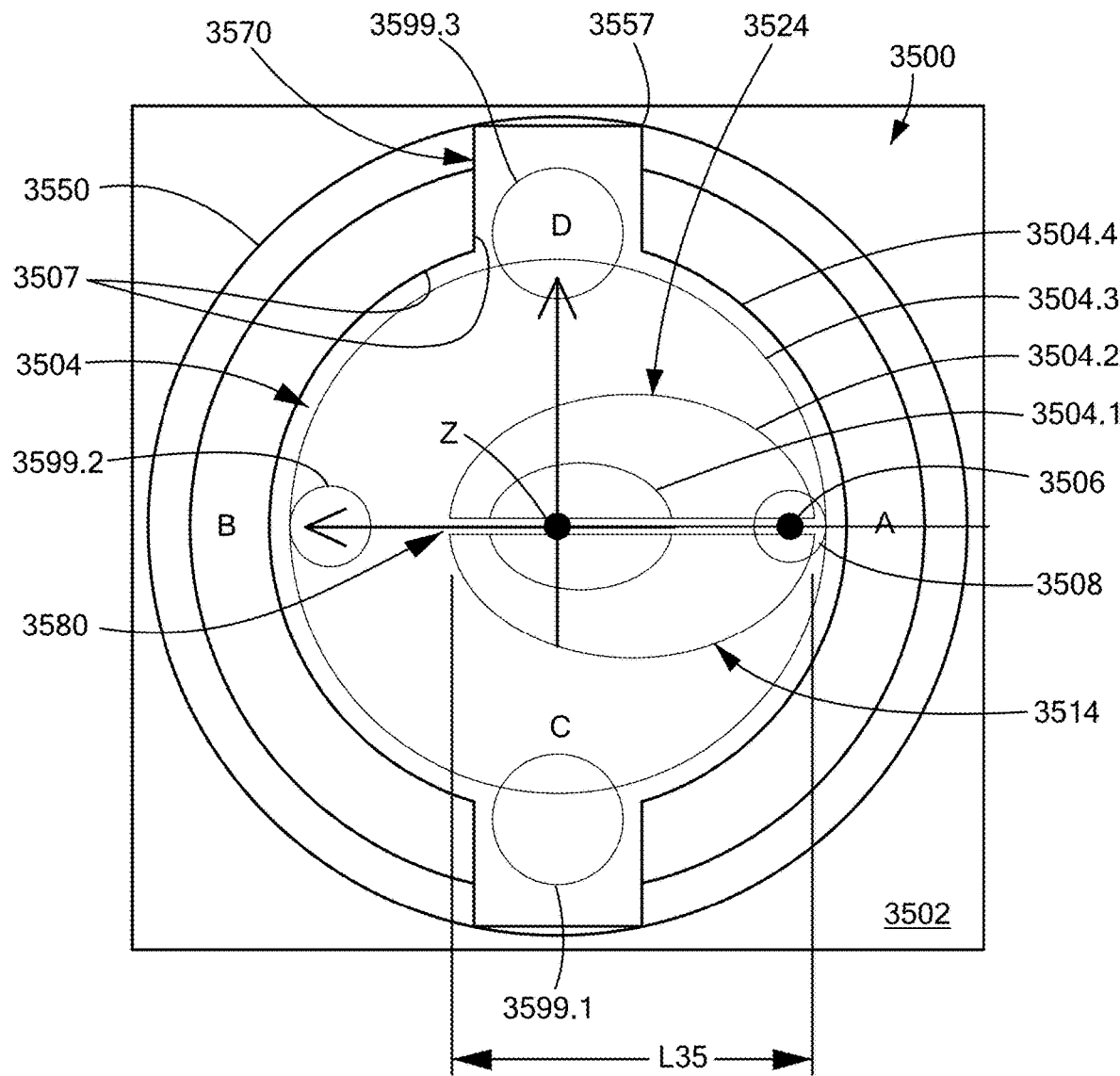
FIGS. 35-38 depict alternate DRA's in accordance with an embodiment.
Figure 36:
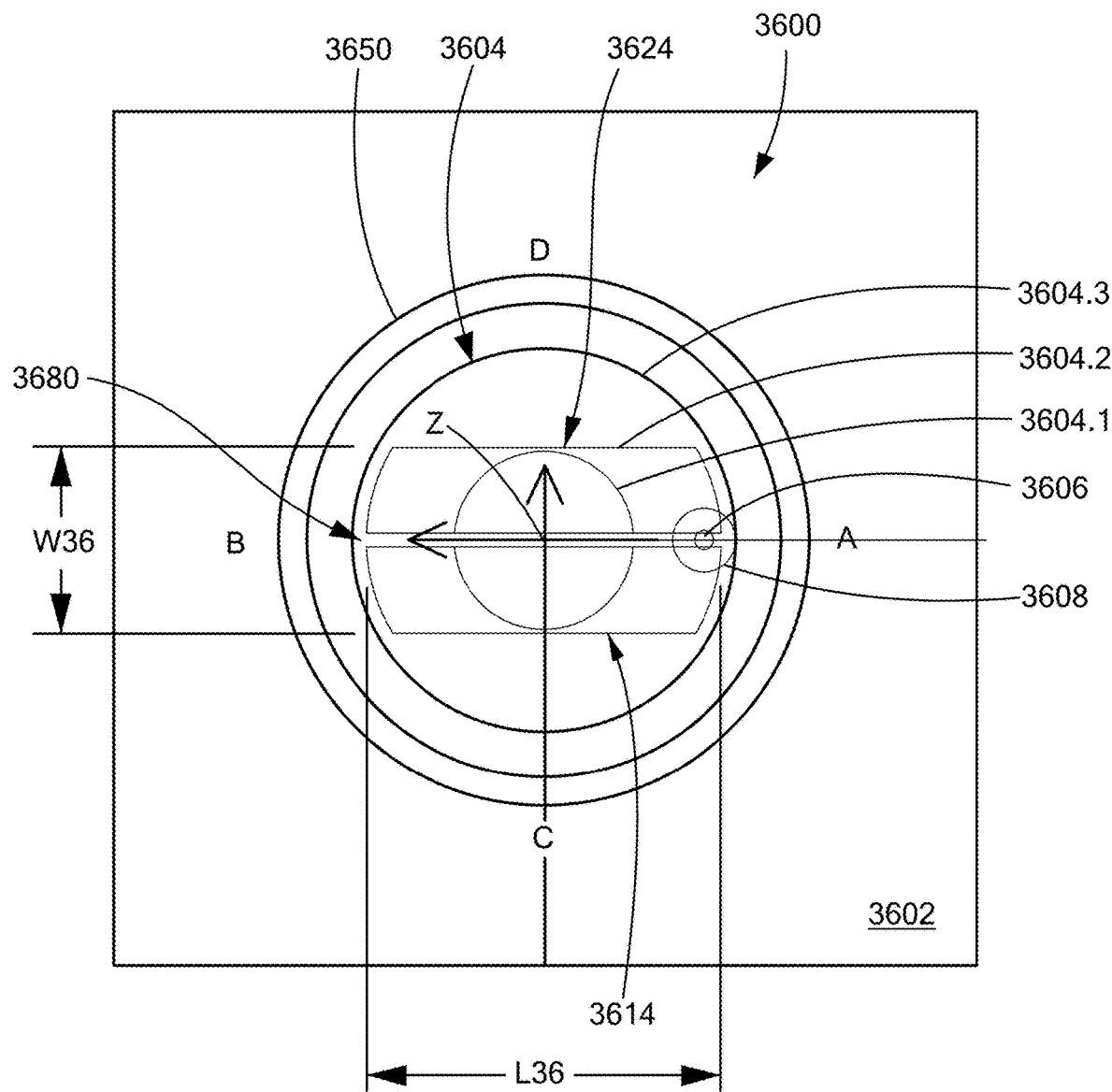

Reference is now made to FIGS. 35-38, which depict an alternative DRA structure to those described herein above. FIG. 35 depicts a plan view of a DRA 3500 similar to DRA 3000 depicted in FIG. 30, and FIG. 36 depicts a plan view of a DRA 3600 similar to DRA 2900 depicted in FIG. 29 but absent the auxiliary volume V(A) 2960, where both DRA's 3500, 3600 have further differences that will now be described.

Each DRA 3500, 3600 has a plurality of volumes of dielectric materials 3504, 3604 disposed on a ground structure 3502, 3602 having N volumes, N being an integer equal to or greater than 3, disposed to form successive and sequential layered volumes V(i), i being an integer from 1 to N, wherein volume V(1) forms an innermost first volume, wherein a successive volume V(i+1) forms a layered shell disposed over and at least partially embedding volume V(i), wherein volume V(N) at least partially embeds all volumes V(1) to V(N−1). In the embodiments depicted in FIGS. 35 and 36, N is equal to 3, which provides, respectively, a first volume 3504.1, 3604.1, a second volume 3504.2, 3604.2, and a third volume 3504.3, 3604.3, each volume having a dome-shaped top (best seen with reference to the elevation views depicted in FIGS. 29 and 30). An electrically conductive fence 3550, 3650 surrounds the plurality of volumes of dielectric materials 3504, 3604 and is electrically connected with and forms part of the ground structure 3502, 3602. A signal feed 3506, 3606 is electromagnetically coupled to one or more of the plurality of volumes of dielectric materials 3504, 3604, and in this instance is particularly electromagnetically coupled to the second volume V(2) 3504.2, 3604.2. The signal feed 3506, 3606 is disposed within an opening 3508, 3608 of the ground structure 3502, 3602 in non-electrical contact with the ground structure 3502, 3602, and is disposed within the one of the plurality of volumes of dielectric materials 3504, 3604 that the signal feed 3506, 3606 is electromagnetically coupled to, and in this instance is embedded within.

As with other DRA's disclosed herein, an embodiment includes an arrangement of directly adjacent volumes of the plurality of volumes of dielectric materials 3504, 3604 having different dielectric constant values that range from a first relative minimum value at volume V(1) to a relative maximum value at one of volumes V(2) to V(N−1), back to a second relative minimum value at volume V(N), where N>3 (see DRA 3500 having a fourth volume 3504.4 that embeds the third volume 3504.3, for example). Alternatively, directly adjacent volumes of the plurality of volumes of dielectric materials 3504, 3604 have different dielectric constant values that range from a first relative minimum value at volume V(1) to a relative maximum value at V((N+1)/2), where N is an odd integer, back to a second relative minimum value at V(N). In an embodiment, the first relative minimum value is equal to the second relative minimum value. In an example embodiment where N=3, such as DRA 3600 depicted in FIG. 36 for example, the first volume V(1) has a lower dielectric constant than the second volume V(2), and the second volume V(2) has a higher dielectric constant than the third volume V(3). Example dielectric constant values suitable for a purpose disclosed herein include any of the values previously described herein, or any other value suitable for a purpose disclosed herein.

As can be seen with reference to the two plan views of FIGS. 35 and 36, each respective third volume V(3) 3504.3, 3604.3 has a circular cross section, the first volume V(1) 3504.1 and the second volume V(2) 3504.2 of DRA 3500 has an ellipsoidal cross section that is sideways shifted with respect to each other and with respect to the center of the third volume V(3) 3504.3, the first volume V(1) 3604.1 of DRA 3600 has a circular cross section, and the second volume V(2) 3604.2 of DRA 3600 has a truncated circular cross section that has an overall width W36 that is smaller than its overall length L36.

A notable difference between DRA's 3500 and 3600 as compared to DRA's 3000 and 2900, respectively, lies in the presence of slots in the dielectric material of the inner volumes V(1) 3504.1, 3604.1 and V(2) 3504.2, 3604.2. More specifically, a central planar slot 3580, 3680 oriented in containment of the z-axis and disposed in line with the signal feed 3506, 3606 introduces a planar volume of relatively lower dielectric material through the relatively higher dielectric material of the inner volumes, particularly with respect to volume V(2). Other than the above noted cross section profiles and the above noted notable difference, other structural features of DRA 3500 and DRA 3600 are substantially the same.

As can be seen by comparing the plan views of FIGS. 35 and 36, both DRA's 3500, 3600 have inner volumes V(1) 3504.1, 3604.1 and V(2) 3504.2, 3604.2 that are completely bifurcated by a portion of the dielectric material of volume V(3) 3504.3, 3604.3. As depicted, the central planar slots 3580, 3680 extend through the entire cross section of the respective first and second volumes V(1) 3504.1, 3604.1 and V(2) 3504.2, 3604.2 with a respective length of L35, L36. The bifurcated inner volumes V(1) 3504.1, 3604.1 and V(2) 3504.2, 3604.2 form respective first sub-volumes 3514, 3614 and second sub-volumes 3524, 3624 that are mirror images of respective ones of each other. In a more general sense, an embodiment includes a DRA wherein the portion of volume V(N) that bifurcates volumes V(1) to V(N−1) forms a first sub-volume and a second sub-volume of volumes V(1) to V(N−1) that are mirror images of each other. In an embodiment, the portion of volume V(N) that bifurcates volumes V(1) to V(N−1) is disposed in a manner that passes through the signal feed 3506, 3606 and contains the central vertical z-axes of each of the plurality of volumes of dielectric materials 3504, 3604, which serves to provide the above noted mirror image symmetry of the first and second sub-volumes.

It is contemplated that a consequence of introducing a slot of relatively low dielectric material through the inner volumes in the manner disclosed (i.e., bifurcating the inner volume(s) of relatively high dielectric material with a planar volume of relatively low dielectric material that contains the z-axis and passes through the signal feed), will provide a reduction in the effective dielectric constant along the C-D geometrical path as compared to the effective dielectric constant along the A-B geometrical path.

By adjusting the effective dielectric constant along the C-D geometrical path to be less than the effective dielectric constant along the A-B geometrical path, the main path for the E-field lines being along the favored A-B path, the resulting DRA will provide a favored TE-mode radiation along the A-B path and will provide suppression of undesired spurious TE-mode radiation along the disfavored C-D path without affecting the fundamental TE-mode, an undesirable secondary C-D path for the E-field lines will be in a direction orthogonal to the favored main A-B path.

FIG. 36 also depicts DRA 3600 having its second volume V(2) 3604.2 with a truncated circular cross section having a width W36 and a length L36, where W36<L36, and with its first volume V(1) 3604.1 having a circular cross section that is substantially embedded within the second volume V(2), albeit disposed tangential with the width W36. As a result, the effective dielectric constant along the C-D geometrical path is further reduced relative to the A-B geometrical path due to a lesser amount of higher dielectric constant material in the C-D path relative to the A-B path, which further enhances the suppression of undesired spurious TE-mode radiation along the disfavored C-D path without affecting the fundamental TE-mode radiation along the favored A-B geometrical path.

Since different resonance modes may be supported by the C-D path, we can separate them into two groups: 1) "undesired" TE-modes; and, 2) other spurious resonant modes. By making a distinguished contrast between the A-B and C-D paths through the introduction of a slot along the A-B path direction, it is contemplated that we can "channel" all or a substantial amount of the energy of the TE-mode along the A-B path direction, which defines a very precise polarization of the radiation in the desired TE-mode. The slot does not aim to cut any E-field lines along the A-B path direction. Furthermore the slot tends to suppress any other "truly" spurious resonant modes that might be supported by the C-D path. Here with "truly" spurious resonance, we mean any other mode with a different field configuration than TE. It is noteworthy to mention that a preliminary cleanup of the spurious resonant modes is accomplished via the earlier described centrally disposed volume of dome shaped air, which serves to suppress the undesired TM-mode (see FIG. 20 and associated description herein above for example). While the slot and/or other C-D path modification may have only minor (second order) effects to the TM-mode, the slots aim to further cleanup other undesired resonance effects or other undesired resonant modes.

Another feature depicted in the DRA 3500 of FIG. 35 is the fence 3550 having a non-uniform interior shape 3557 that provides at least one alignment feature 3570, and the plurality of volumes of dielectric materials 3504, or in an embodiment the outer volume 3504.4, having a complementary exterior shape 3507 that complements the non-uniform interior shape 3557 and the at least one alignment feature 3570 of the fence 3550, such that the fence 3550 and the plurality of volumes of dielectric materials 3504 have a defined and fixed alignment relative to each other via the at least one alignment feature 3570 and complementary shapes 3507, 3557. By providing the DRA 3500 with complementary alignment features between the fence 3550 and the plurality of volumes of dielectric materials 3504, an array of DRA's 3500 will be better aligned with each other resulting in improved gain and symmetry of the far field radiation pattern. Another feature depicted in the DRA 3500 is vertical protrudes 3599.1, 3599.2, 3599.3 that rise up from the ground structure 3502 into one or more of the outer layers 3504.3, 3504.4, or alternatively extend downward from the material of the one or more outer layers 3504.3, 3504.4 into holes in the ground structure, for mechanical stability. While such additional features are depicted only in DRA 3500 of FIG. 35, it will be appreciated that any DRA disclosed herein may have similar such additional features. Any and all such combinations are contemplated herein and considered to be within the scope of the invention disclosed herein.

Figure 37:
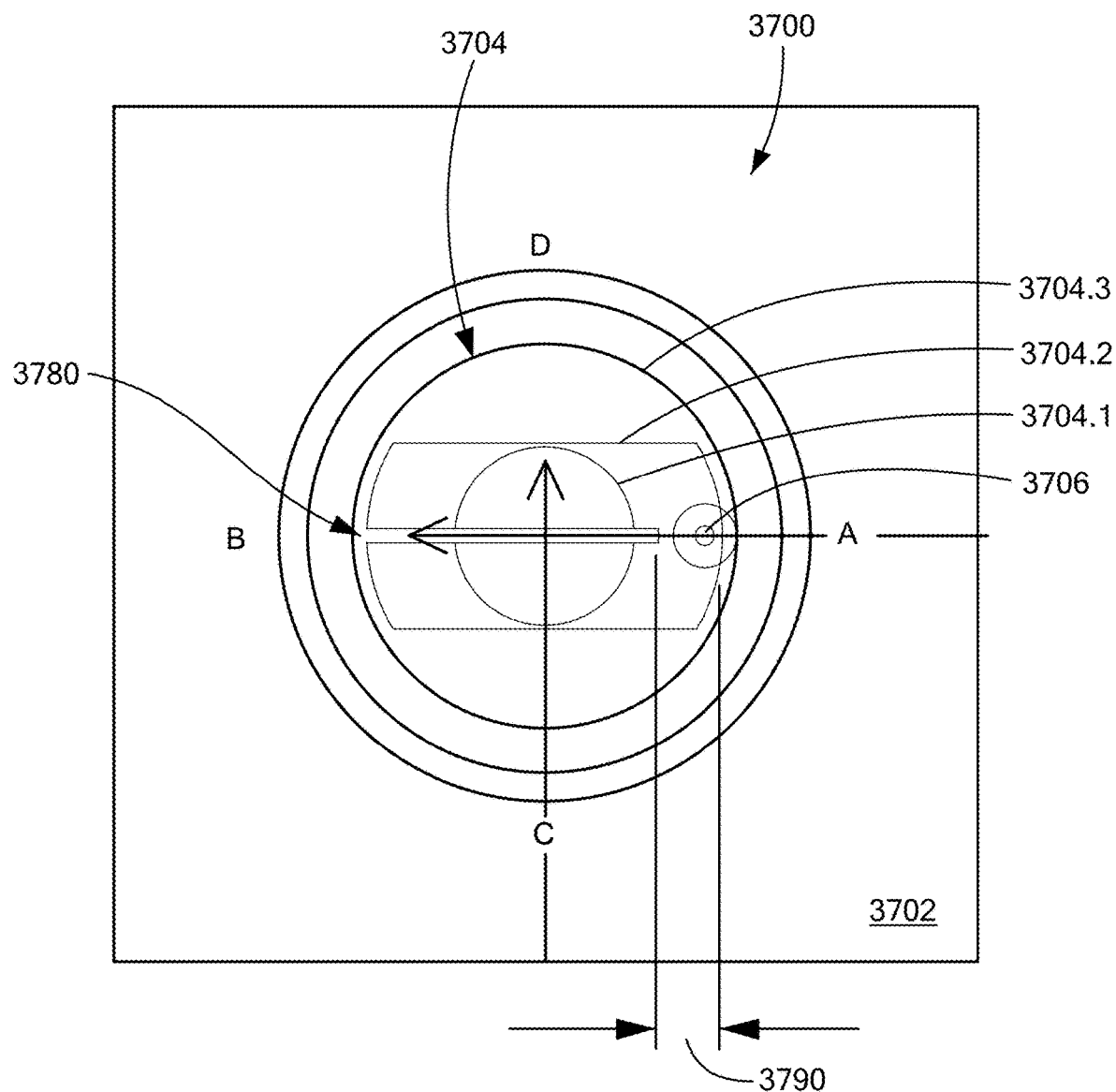
Figure 38:
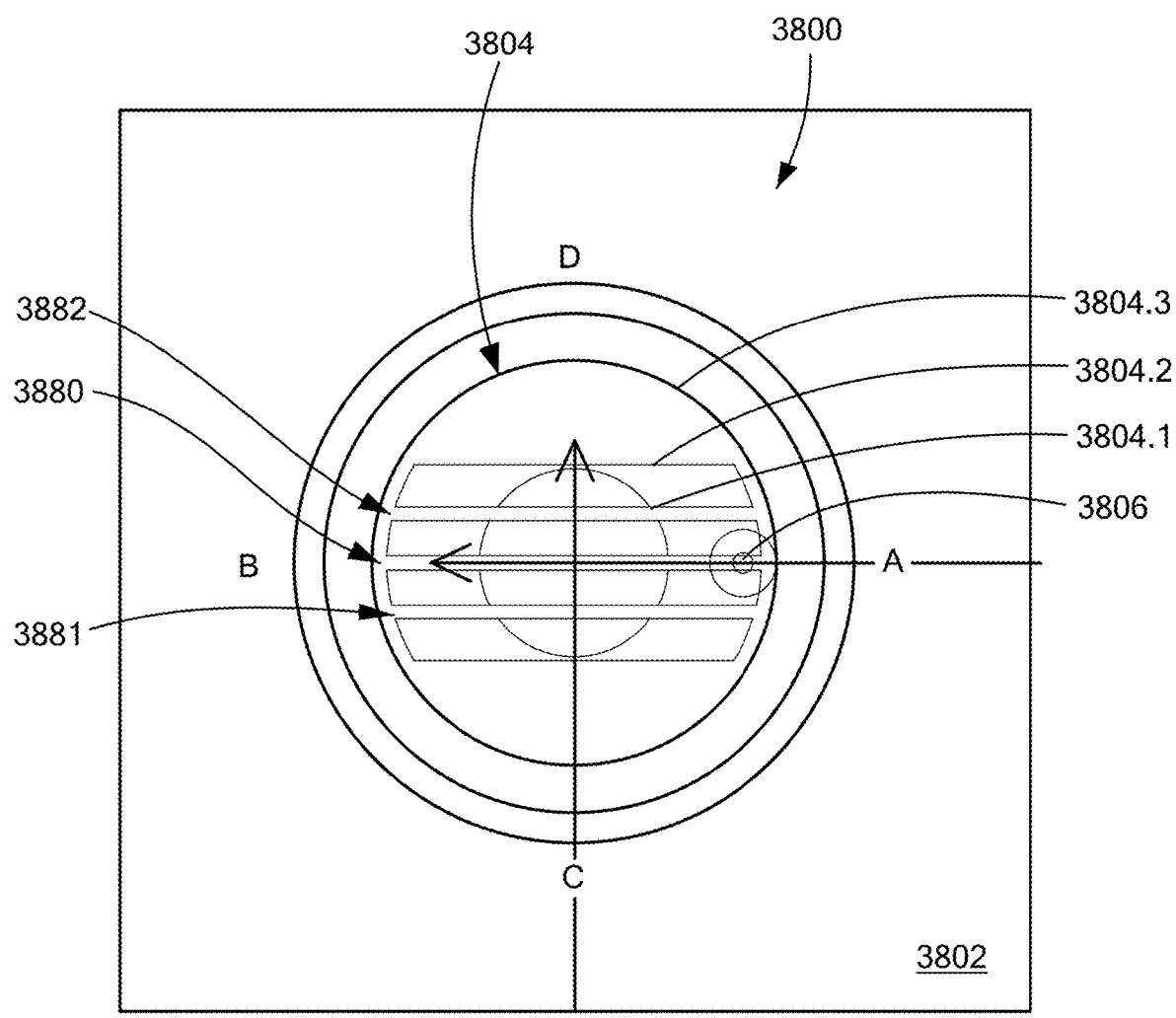

Reference is now made to FIGS. 37 and 38, which depict DRA's 3700 and 3800, respectively, having variations on the slot formation with respect to the DRA 3600 depicted in FIG. 36. In both FIGS. 37 and 38, DRA's 3700 and 3800 have a similar arrangement of a plurality of volumes of dielectric materials 3704, 3804 similar to that of the plurality of volumes of dielectric materials 3604 depicted in FIG. 36, with a notable difference. In DRA 3700 depicted in FIG. 37, the central planar slot 3780 of volume V(3) 3704.3 material only partially extends through the underlying volumes V(2) 3704.2 and V(1) 3704.1, as evidenced by the residual material 3790 of volume V(2) 3704.2 proximate the signal feed 3706. And, in DRA 3800 depicted in FIG. 38, the central planar slot 3880 is flanked by parallel planar slots 3881 and 3882 of volume V(3) material 3804.3 that completely segments the underlying volume V(1) 3804.1 and V(2) 3804.2 materials. As a result, the effective dielectric constant along the C-D geometrical path is further reduced relative to the A-B geometrical path due to a lesser amount of higher dielectric constant material in the C-D path relative to the A-B path, which further enhances the suppression of undesired spurious TE-mode radiation along the disfavored C-D path and other "truly spurious" resonant modes without affecting the fundamental TE-mode radiation along the favored A-B geometrical path. It is noteworthy to mention that sometimes TE-mode lines along the C-D path may be desired, as they add another degree of polarization. Here, however, the intent is to suppress them and to more accurately refer to the TE-mode lines along the C-D path as being "undesired" as opposed to "spurious".

From the foregoing it will be appreciated that embodiments disclosed herein include the following: a DRA 3500 wherein a portion 3580 of the dielectric material of volume V(N) 3504.3 bifurcates at least a portion of volumes V(1) 3504.1 to V(N−1) 3504.2; a DRA 3600 wherein the portion 3680 of the dielectric material of volume V(N) 3604.3 that bifurcates volumes V(1) 3604.1 to V(N−1) 3604.2, bifurcates an entire cross section of all volumes V(1) 3604.1 to V(N−1) 3604.2 with a length of L36; a DRA 3500 wherein the signal feed 3506 is disposed within an opening 3508 of the ground structure 3502 in non-electrical contact with the ground structure 3502, and is disposed within the one of the plurality of volumes of dielectric materials 3504 that the electrically conductive signal feed 3506 is electromagnetically coupled to; a DRA 3500 wherein the signal feed 3506 is electromagnetically coupled to volume V(2) 3504.2; a DRA 3500 wherein the portion of volume V(N) 3504.3 that bifurcates volumes V(1) 3504.1 to V(N−1) 3504.2 forms a first sub-volume 3514 and a second sub-volume 3524 of volumes V(1) 3504.1 to V(N−1) 3504.2 that are mirror images of each other; a DRA 3500 wherein the portion of volume V(N) 3504.3 that bifurcates volumes V(1) 3504.1 to V(N−1) 3504.2 is disposed in a manner that passes through the signal feed 3506 and contains the central vertical z-axes of each of the plurality of volumes of dielectric materials 3504; a DRA 3500 wherein the portion of volume V(N) 3504.3 that bifurcates volumes V(1) 3504.1 to V(N−1) 3504.2 splits the volumes V(1) 3504.1 to V(N−1) 3504.2 with the dielectric material of volume V(N) 3504.3; a DRA 3500 wherein directly adjacent volumes of the plurality of volumes of dielectric materials 3504 have different dielectric constant values that range from a first relative minimum value at volume V(1) 3504.1 to a relative maximum value at one of volumes V(2) 3504.2 to V(N−1) 3504.3, back to a second relative minimum value at volume V(N) 3504.4, where N>3; a DRA 3500 wherein directly adjacent volumes of the plurality of volumes of dielectric materials 3504 have different dielectric constant values that range from a first relative minimum value at volume V(1) 3504.1 to a relative maximum value at V((N+1)/2) 3504.2, where N is an odd integer, back to a second relative minimum value at V(N) 3504.3; a DRA 3500 wherein the first relative minimum value is equal to the second relative minimum value; a DRA 3500 further having an electrically conductive fence 3550 disposed around the plurality of volumes of dielectric materials 3504 and is electrically connected with and forms part of the ground structure 3502; a DRA 3500 wherein the electrically conductive fence 3550 has a height that does not exceed the height of the plurality of volumes of dielectric materials 3504; a DRA 3500 wherein the fence 3550 has a non-uniform interior shape 3557 that provides at least one alignment feature 3570; a DRA 3500 wherein the plurality of volumes of dielectric materials 3504, or in an embodiment the outer volume 3504.4, has a complementary exterior shape 3507 that complements the non-uniform interior shape 3557 and the at least one alignment feature 3570 of the fence 3550, such that the fence 3550 and the plurality of volumes of dielectric materials 3504 have a defined and fixed alignment relative to each other via the at least one alignment feature 3570 and complementary shapes 3507, 3557; a DRA 3500 having complementary alignment features between the fence 3550 and the plurality of volumes of dielectric materials 3504 that provides an array of DRA's 3500 having better aligned with each other resulting in improved gain and symmetry of the far field radiation pattern; a DRA 3500 having vertical protrudes 3599.1, 3599.2, 3599.3 that rise up from the ground structure 3502 into one or more of the outer layers 3504.3, 3504.4 for mechanical stability; and, a DRA wherein the electrically conductive ground structure 3502 comprises one or more openings 3508.

The dielectric materials for use in the dielectric volumes or shells (referred to herein after as volumes for convenience) are selected to provide the desired electrical and mechanical properties. The dielectric materials generally comprise a thermoplastic or thermosetting polymer matrix and a filler composition containing a dielectric filler. Each dielectric layer can comprise, based on the volume of the dielectric volume, 30 to 100 volume percent (vol %) of a polymer matrix, and 0 to 70 vol % of a filler composition, specifically 30 to 99 vol % of a polymer matrix and 1 to 70 vol % of a filler composition, more specifically 50 to 95 vol % of a polymeric matrix and 5 to 50 vol % of a filler composition. The polymer matrix and the filler are selected to provide a dielectric volume having a dielectric constant consistent for a purpose disclosed herein and a dissipation factor of less than 0.006, specifically, less than or equal to 0.0035 at 10 gigaHertz (GHz). The dissipation factor can be measured by the IPC-TM-650 X-band strip line method or by the Split Resonator method.

Each dielectric volume comprises a low polarity, low dielectric constant, and low loss polymer. The polymer can comprise 1,2-polybutadiene (PBD), polyisoprene, polybutadiene-polyisoprene copolymers, polyetherimide (PEI), fluoropolymers such as polytetrafluoroethylene (PTFE), polyimide, polyetheretherketone (PEEK), polyamidimide, polyethylene terephthalate (PET), polyethylene naphthalate, polycyclohexylene terephthalate, polyphenylene ethers, those based on allylated polyphenylene ethers, or a combination comprising at least one of the foregoing. Combinations of low polarity polymers with higher polarity polymers can also be used, non-limiting examples including epoxy and poly(phenylene ether), epoxy and poly(etherimide), cyanate ester and poly(phenylene ether), and 1,2-polybutadiene and polyethylene.

Fluoropolymers include fluorinated homopolymers, e.g., PTFE and polychlorotrifluoroethylene (PCTFE), and fluorinated copolymers, e.g. copolymers of tetrafluoroethylene or chlorotrifluoroethylene with a monomer such as hexafluoropropylene or perfluoroalkylvinylethers, vinylidene fluoride, vinyl fluoride, ethylene, or a combination comprising at least one of the foregoing. The fluoropolymer can comprise a combination of different at least one these fluoropolymers.

The polymer matrix can comprise thermosetting polybutadiene or polyisoprene. As used herein, the term "thermosetting polybutadiene or polyisoprene" includes homopolymers and copolymers comprising units derived from butadiene, isoprene, or combinations thereof. Units derived from other copolymerizable monomers can also be present in the polymer, for example, in the form of grafts. Exemplary copolymerizable monomers include, but are not limited to, vinylaromatic monomers, for example substituted and unsubstituted monovinylaromatic monomers such as styrene, 3-methylstyrene, 3,5-diethylstyrene, 4-n-propylstyrene, alpha-methylstyrene, alpha-methyl vinyltoluene, para-hydroxystyrene, para-methoxystyrene, alpha-chlorostyrene, alpha-bromostyrene, dichlorostyrene, dibromostyrene, tetrachlorostyrene, and the like; and substituted and unsubstituted divinylaromatic monomers such as divinylbenzene, divinyltoluene, and the like. Combinations comprising at least one of the foregoing copolymerizable monomers can also be used. Exemplary thermosetting polybutadiene or polyisoprenes include, but are not limited to, butadiene homopolymers, isoprene homopolymers, butadiene-vinylaromatic copolymers such as butadiene-styrene, isoprene-vinylaromatic copolymers such as isoprene-styrene copolymers, and the like.

The thermosetting polybutadiene or polyisoprenes can also be modified. For example, the polymers can be hydroxyl-terminated, methacrylate-terminated, carboxylate-terminated, or the like. Post-reacted polymers can be used, such as epoxy-, maleic anhydride-, or urethane-modified polymers of butadiene or isoprene polymers. The polymers can also be crosslinked, for example by divinylaromatic compounds such as divinyl benzene, e.g., a polybutadiene-styrene crosslinked with divinyl benzene. Exemplary materials are broadly classified as "polybutadienes" by their manufacturers, for example, Nippon Soda Co., Tokyo, Japan, and Cray Valley Hydrocarbon Specialty Chemicals, Exton, Pa. Combinations can also be used, for example, a combination of a polybutadiene homopolymer and a poly (butadiene-isoprene) copolymer. Combinations comprising a syndiotactic polybutadiene can also be useful.

The thermosetting polybutadiene or polyisoprene can be liquid or solid at room temperature. The liquid polymer can have a number average molecular weight (Mn) of greater than or equal to 5,000 g/mol. The liquid polymer can have an Mn of less than 5,000 g/mol, specifically, 1,000 to 3,000 g/mol. Thermosetting polybutadiene or polyisoprenes having at least 90 wt % 1.2 addition, which can exhibit greater crosslink density upon cure due to the large number of pendent vinyl groups available for crosslinking.

The polybutadiene or polyisoprene can be present in the polymer composition in an amount of up to 100 wt %, specifically, up to 75 wt % with respect to the total polymer matrix composition, more specifically, 10 to 70 wt %, even more specifically, 20 to 60 or 70 wt %, based on the total polymer matrix composition.

Other polymers that can co-cure with the thermosetting polybutadiene or polyisoprenes can be added for specific property or processing modifications. For example, in order to improve the stability of the dielectric strength and mechanical properties of the dielectric material over time, a lower molecular weight ethylene-propylene elastomer can be used in the systems. An ethylene-propylene elastomer as used herein is a copolymer, terpolymer, or other polymer comprising primarily ethylene and propylene. Ethylene-propylene elastomers can be further classified as EPM copolymers (i.e., copolymers of ethylene and propylene monomers) or EPDM terpolymers (i.e., terpolymers of ethylene, propylene, and diene monomers). Ethylene-propylene-diene terpolymer rubbers, in particular, have saturated main chains, with unsaturation available off the main chain for facile cross-linking. Liquid ethylene-propylene-diene terpolymer rubbers, in which the diene is dicyclopentadiene, can be used.

The molecular weights of the ethylene-propylene rubbers can be less than 10,000 g/mol viscosity average molecular weight (Mv). The ethylene-propylene rubber can include an ethylene-propylene rubber having an Mv of 7,200 g/mol, which is available from Lion Copolymer, Baton Rouge, La., under the trade name TRILENE™ CP80; a liquid ethylene-propylene-dicyclopentadiene terpolymer rubbers having an Mv of 7,000 g/mol, which is available from Lion Copolymer under the trade name of TRILENE™ 65; and a liquid ethylene-propylene-ethylidene norbornene terpolymer having an Mv of 7,500 g/mol, which is available from Lion Copolymer under the name TRILENE™ 67.

The ethylene-propylene rubber can be present in an amount effective to maintain the stability of the properties of the dielectric material over time, in particular the dielectric strength and mechanical properties. Typically, such amounts are up to 20 wt % with respect to the total weight of the polymer matrix composition, specifically, 4 to 20 wt %, more specifically, 6 to 12 wt %.

Another type of co-curable polymer is an unsaturated polybutadiene- or polyisoprene-containing elastomer. This component can be a random or block copolymer of primarily 1,3-addition butadiene or isoprene with an ethylenically unsaturated monomer, for example, a vinylaromatic compound such as styrene or alpha-methyl styrene, an acrylate or methacrylate such a methyl methacrylate, or acrylonitrile. The elastomer can be a solid, thermoplastic elastomer comprising a linear or graft-type block copolymer having a polybutadiene or polyisoprene block and a thermoplastic block that can be derived from a monovinylaromatic monomer such as styrene or alpha-methyl styrene. Block copolymers of this type include styrene-butadiene-styrene triblock copolymers, for example, those available from Dexco Polymers, Houston, Tex. under the trade name VECTOR 8508M™, from Enichem Elastomers America, Houston, Tex. under the trade name SOL-T-6302, and those from Dynasol Elastomers under the trade name CALPRENE™ 401; and styrene-butadiene diblock copolymers and mixed triblock and diblock copolymers containing styrene and butadiene, for example, those available from Kraton Polymers (Houston, Tex.) under the trade name KRATON D1118. KRATON D1118 is a mixed diblock/triblock styrene and butadiene containing copolymer that contains 33 wt % styrene.

The optional polybutadiene- or polyisoprene-containing elastomer can further comprise a second block copolymer similar to that described above, except that the polybutadiene or polyisoprene block is hydrogenated, thereby forming a polyethylene block (in the case of polybutadiene) or an ethylene-propylene copolymer block (in the case of polyisoprene). When used in conjunction with the above-described copolymer, materials with greater toughness can be produced. An exemplary second block copolymer of this type is KRATON GX1855 (commercially available from Kraton Polymers, which is believed to be a combination of a styrene-high 1,2-butadiene-styrene block copolymer and a styrene-(ethylene-propylene)-styrene block copolymer.

The unsaturated polybutadiene- or polyisoprene-containing elastomer component can be present in the polymer matrix composition in an amount of 2 to 60 wt % with respect to the total weight of the polymer matrix composition, specifically, 5 to 50 wt %, more specifically, 10 to 40 or 50 wt %.

Still other co-curable polymers that can be added for specific property or processing modifications include, but are not limited to, homopolymers or copolymers of ethylene such as polyethylene and ethylene oxide copolymers; natural rubber; norbornene polymers such as polydicyclopentadiene; hydrogenated styrene-isoprene-styrene copolymers and butadiene-acrylonitrile copolymers; unsaturated polyesters; and the like. Levels of these copolymers are generally less than 50 wt % of the total polymer in the polymer matrix composition.

Free radical-curable monomers can also be added for specific property or processing modifications, for example to increase the crosslink density of the system after cure. Exemplary monomers that can be suitable crosslinking agents include, for example, di, tri-, or higher ethylenically unsaturated monomers such as divinyl benzene, triallyl cyanurate, diallyl phthalate, and multifunctional acrylate monomers (e.g., SARTOMER™ polymers available from Sartomer USA, Newtown Square, Pa.), or combinations thereof, all of which are commercially available. The crosslinking agent, when used, can be present in the polymer matrix composition in an amount of up to 20 wt %, specifically, 1 to 15 wt %, based on the total weight of the total polymer in the polymer matrix composition.

A curing agent can be added to the polymer matrix composition to accelerate the curing reaction of polyenes having olefinic reactive sites. Curing agents can comprise organic peroxides, for example, dicumyl peroxide, t-butyl perbenzoate, 2,5-dimethyl-2,5-di(t-butyl peroxy)hexane, α,α-di-bis(t-butyl peroxy)diisopropylbenzene, 2,5-dimethyl-2,5-di(t-butyl peroxy) hexyne-3, or a combination comprising at least one of the foregoing. Carbon-carbon initiators, for example, 2,3-dimethyl-2,3 diphenylbutane can be used. Curing agents or initiators can be used alone or in combination. The amount of curing agent can be 1.5 to 10 wt % based on the total weight of the polymer in the polymer matrix composition.

In some embodiments, the polybutadiene or polyisoprene polymer is carboxy-functionalized. Functionalization can be accomplished using a polyfunctional compound having in the molecule both (i) a carbon-carbon double bond or a carbon-carbon triple bond, and (ii) at least one of a carboxy group, including a carboxylic acid, anhydride, amide, ester, or acid halide. A specific carboxy group is a carboxylic acid or ester. Examples of polyfunctional compounds that can provide a carboxylic acid functional group include maleic acid, maleic anhydride, fumaric acid, and citric acid. In particular, polybutadienes adducted with maleic anhydride can be used in the thermosetting composition. Suitable maleinized polybutadiene polymers are commercially available, for example from Cray Valley under the trade names RICON 130MA8, RICON 130MA13, RICON 130MA20, RICON 131MA5, RICON 131MA10, RICON 131MA17, RICON 131MA20, and RICON 156MA17. Suitable maleinized polybutadiene-styrene copolymers are commercially available, for example, from Sartomer under the trade names RICON 184MA6. RICON 184MA6 is a butadiene-styrene copolymer adducted with maleic anhydride having styrene content of 17 to 27 wt % and Mn of 9,900 g/mol.

The relative amounts of the various polymers in the polymer matrix composition, for example, the polybutadiene or polyisoprene polymer and other polymers, can depend on the particular conductive metal ground plate layer used, the desired properties of the circuit materials, and like considerations. For example, use of a poly(arylene ether) can provide increased bond strength to a conductive metal component, for example, a copper or aluminum component such as a signal feed, ground, or reflector component. Use of a polybutadiene or polyisoprene polymer can increase high temperature resistance of the composites, for example, when these polymers are carboxy-functionalized. Use of an elastomeric block copolymer can function to compatibilize the components of the polymer matrix material. Determination of the appropriate quantities of each component can be done without undue experimentation, depending on the desired properties for a particular application.

At least one dielectric volume can further include a particulate dielectric filler selected to adjust the dielectric constant, dissipation factor, coefficient of thermal expansion, and other properties of the dielectric volume. The dielectric filler can comprise, for example, titanium dioxide (rutile and anatase), barium titanate, strontium titanate, silica (including fused amorphous silica), corundum, wollastonite, $Ba_2Ti_9O_{20}$, solid glass spheres, synthetic glass or ceramic hollow spheres, quartz, boron nitride, aluminum nitride, silicon carbide, beryllia, alumina, alumina trihydrate, magnesia, mica, talcs, nanoclays, magnesium hydroxide, or a combination comprising at least one of the foregoing. A single secondary filler, or a combination of secondary fillers, can be used to provide a desired balance of properties.

Optionally, the fillers can be surface treated with a silicon-containing coating, for example, an organofunctional alkoxy silane coupling agent. A zirconate or titanate coupling agent can be used. Such coupling agents can improve the dispersion of the filler in the polymeric matrix and reduce water absorption of the finished DRA. The filler component can comprise 5 to 50 vol % of the microspheres and 70 to 30 vol % of fused amorphous silica as secondary filler based on the weight of the filler.

Each dielectric volume can also optionally contain a flame retardant useful for making the volume resistant to flame. These flame retardant can be halogenated or unhalogenated. The flame retardant can be present in in the dielectric volume in an amount of 0 to 30 vol % based on the volume of the dielectric volume.

In an embodiment, the flame retardant is inorganic and is present in the form of particles. An exemplary inorganic flame retardant is a metal hydrate, having, for example, a volume average particle diameter of 1 nm to 500 nm, preferably 1 to 200 nm, or 5 to 200 nm, or 10 to 200 nm; alternatively the volume average particle diameter is 500 nm to 15 micrometer, for example 1 to 5 micrometer. The metal hydrate is a hydrate of a metal such as Mg, Ca, Al, Fe, Zn, Ba, Cu, Ni, or a combination comprising at least one of the foregoing. Hydrates of Mg, Al, or Ca are particularly preferred, for example aluminum hydroxide, magnesium hydroxide, calcium hydroxide, iron hydroxide, zinc hydroxide, copper hydroxide and nickel hydroxide; and hydrates of calcium aluminate, gypsum dihydrate, zinc borate and barium metaborate. Composites of these hydrates can be used, for example a hydrate containing Mg and one or more of Ca, Al, Fe, Zn, Ba, Cu and Ni. A preferred composite metal hydrate has the formula $MgMx.(OH)_y$ wherein M is Ca, Al, Fe, Zn, Ba, Cu, or Ni, x is 0.1 to 10, and y is from 2 to 32. The flame retardant particles can be coated or otherwise treated to improve dispersion and other properties.

Organic flame retardants can be used, alternatively or in addition to the inorganic flame retardants. Examples of inorganic flame retardants include melamine cyanurate, fine particle size melamine polyphosphate, various other phosphorus-containing compounds such as aromatic phosphinates, diphosphinates, phosphonates, and phosphates, certain polysilsesquioxanes, siloxanes, and halogenated compounds such as hexachloroendomethylenetetrahydrophthalic acid (HET acid), tetrabromophthalic acid and dibromoneopentyl glycol A flame retardant (such as a bromine-containing flame retardant) can be present in an amount of 20 phr (parts per hundred parts of resin) to 60 phr, specifically, 30 to 45 phr. Examples of brominated flame retardants include Saytex BT93W (ethylene bistetrabromophthalimide), Saytex 120 (tetradecabromodiphenoxy benzene), and Saytex 102 (decabromodiphenyl oxide). The flame retardant can be used in combination with a synergist, for example a halogenated flame retardant can be used in combination with a synergists such as antimony trioxide, and a phosphorus-containing flame retardant can be used in combination with a nitrogen-containing compound such as melamine.

Each volume of dielectric material is formed from a dielectric composition comprising the polymer matrix composition and the filler composition. Each volume can be formed by casting a dielectric composition directly onto the ground structure layer, or a dielectric volume can be produced that can be deposited onto the ground structure layer. The method to produce each dielectric volume can be based on the polymer selected. For example, where the polymer comprises a fluoropolymer such as PTFE, the polymer can be mixed with a first carrier liquid. The combination can comprise a dispersion of polymeric particles in the first carrier liquid, e.g., an emulsion of liquid droplets of the polymer or of a monomeric or oligomeric precursor of the polymer in the first carrier liquid, or a solution of the polymer in the first carrier liquid. If the polymer is liquid, then no first carrier liquid may be necessary.

The choice of the first carrier liquid, if present, can be based on the particular polymeric and the form in which the polymeric is to be introduced to the dielectric volume. If it is desired to introduce the polymeric as a solution, a solvent for the particular polymer is chosen as the carrier liquid, e.g., N-methyl pyrrolidone (NMP) would be a suitable carrier liquid for a solution of a polyimide. If it is desired to introduce the polymer as a dispersion, then the carrier liquid can comprise a liquid in which the is not soluble, e.g., water would be a suitable carrier liquid for a dispersion of PTFE particles and would be a suitable carrier liquid for an emulsion of polyamic acid or an emulsion of butadiene monomer.

The dielectric filler component can optionally be dispersed in a second carrier liquid, or mixed with the first carrier liquid (or liquid polymer where no first carrier is used). The second carrier liquid can be the same liquid or can be a liquid other than the first carrier liquid that is miscible with the first carrier liquid. For example, if the first carrier liquid is water, the second carrier liquid can comprise water or an alcohol. The second carrier liquid can comprise water.

The filler dispersion can comprise a surfactant in an amount effective to modify the surface tension of the second carrier liquid to enable the second carrier liquid to wet the borosilicate microspheres. Exemplary surfactant compounds include ionic surfactants and nonionic surfactants. TRITON X-100™, has been found to be an exemplary surfactant for use in aqueous filler dispersions. The filler dispersion can comprise 10 to 70 vol % of filler and 0.1 to 10 vol % of surfactant, with the remainder comprising the second carrier liquid.

The combination of the polymer and first carrier liquid and the filler dispersion in the second carrier liquid can be combined to form a casting mixture. In an embodiment, the casting mixture comprises 10 to 60 vol % of the combined polymer and filler and 40 to 90 vol % combined first and second carrier liquids. The relative amounts of the polymer and the filler component in the casting mixture can be selected to provide the desired amounts in the final composition as described below.

The viscosity of the casting mixture can be adjusted by the addition of a viscosity modifier, selected on the basis of its compatibility in a particular carrier liquid or combination of carrier liquids, to retard separation, i.e. sedimentation or flotation, of the hollow sphere filler from the dielectric composite material and to provide a dielectric composite material having a viscosity compatible with conventional manufacturing equipment. Exemplary viscosity modifiers suitable for use in aqueous casting mixtures include, e.g., polyacrylic acid compounds, vegetable gums, and cellulose based compounds. Specific examples of suitable viscosity modifiers include polyacrylic acid, methyl cellulose, polyethyleneoxide, guar gum, locust bean gum, sodium carboxymethylcellulose, sodium alginate, and gum tragacanth. The viscosity of the viscosity-adjusted casting mixture can be further increased, i.e., beyond the minimum viscosity, on an application by application basis to adapt the dielectric composite material to the selected manufacturing technique. In an embodiment, the viscosity-adjusted casting mixture can exhibit a viscosity of 10 to 100,000 centipoise (cp); specifically, 100 cp and 10,000 cp measured at room temperature value.

Alternatively, the viscosity modifier can be omitted if the viscosity of the carrier liquid is sufficient to provide a casting mixture that does not separate during the time period of interest. Specifically, in the case of extremely small particles, e.g., particles having an equivalent spherical diameter less than 0.1 micrometers, the use of a viscosity modifier may not be necessary.

A layer of the viscosity-adjusted casting mixture can be cast onto the ground structure layer, or can be dip-coated and then shaped. The casting can be achieved by, for example, dip coating, flow coating, reverse roll coating, knife-over-roll, knife-over-plate, metering rod coating, and the like.

The carrier liquid and processing aids, i.e., the surfactant and viscosity modifier, can be removed from the cast volume, for example, by evaporation or by thermal decomposition in order to consolidate a dielectric volume of the polymer and the filler comprising the microspheres.

The volume of the polymeric matrix material and filler component can be further heated to modify the physical properties of the volume, e.g., to sinter a thermoplastic or to cure or post cure a thermosetting composition.

In another method, a PTFE composite dielectric volume can be made by a paste extrusion and calendaring process.

In still another embodiment, the dielectric volume can be cast and then partially cured ("B-staged"). Such B-staged volumes can be stored and used subsequently.

An adhesion layer can be disposed between the conductive ground layer and the dielectric layers. The adhesion layer can comprise a poly(arylene ether); and a carboxy-functionalized polybutadiene or polyisoprene polymer comprising butadiene, isoprene, or butadiene and isoprene units, and zero to less than or equal to 50 wt % of co-curable monomer units; wherein the composition of the adhesive layer is not the same as the composition of the dielectric volume. The adhesive layer can be present in an amount of 2 to 15 grams per square meter. The poly(arylene ether) can comprise a carboxy-functionalized poly(arylene ether). The poly(arylene ether) can be the reaction product of a poly(arylene ether) and a cyclic anhydride or the reaction product of a poly(arylene ether) and maleic anhydride. The carboxy-functionalized polybutadiene or polyisoprene polymer can be a carboxy-functionalized butadiene-styrene copolymer. The carboxy-functionalized polybutadiene or polyisoprene polymer can be the reaction product of a polybutadiene or polyisoprene polymer and a cyclic anhydride. The carboxy-functionalized polybutadiene or polyisoprene polymer can be a maleinized polybutadiene-styrene or maleinized polyisoprene-styrene copolymer.

In an embodiment, a multiple-step process suitable for thermosetting materials such as polybutadiene or polyisoprene can comprise a peroxide cure step at temperatures of 150 to 200° C., and the partially cured (B-staged) stack can then be subjected to a high-energy electron beam irradiation cure (E-beam cure) or a high temperature cure step under an inert atmosphere. Use of a two-stage cure can impart an unusually high degree of cross-linking to the resulting composite. The temperature used in the second stage can be 250 to 300° C., or the decomposition temperature of the polymer. This high temperature cure can be carried out in an oven but can also be performed in a press, namely as a continuation of the initial fabrication and cure step. Particular fabrication temperatures and pressures will depend upon the particular adhesive composition and the dielectric composition, and are readily ascertainable by one of ordinary skill in the art without undue experimentation.

A bonding layer can be disposed between any two or more dielectric layers to adhere the layers. The bonding layer is selected based on the desired properties, and can be, for example, a low melting thermoplastic polymer or other composition for bonding two dielectric layers. In an embodiment the bonding layer comprises a dielectric filler to adjust the dielectric constant thereof. For example, the dielectric constant of the bonding layer can be adjusted to improve or otherwise modify the bandwidth of the DRA.

In some embodiments the DRA, array, or a component thereof, in particular at least one of the dielectric volumes, is formed by molding the dielectric composition to form the dielectric material. In some embodiments, all of the volumes are molded. In other embodiments, all of the volumes except the initial volume V(i) are molded. In still other embodiments, only the outermost volume V(N) is molded. A combination of molding and other manufacturing methods can be used, for example 3D printing or inkjet printing.

Molding allows rapid and efficient manufacture of the dielectric volumes, optionally together with another DRA component(s) as an embedded feature or a surface feature. For example, a metal, ceramic, or other insert can be placed in the mold to provide a component of the DRA, such as a signal feed, ground component, or reflector component as embedded or surface feature. Alternatively, an embedded feature can be 3D printed or inkjet printed onto a volume, followed by further molding; or a surface feature can be 3D printed or inkjet printed onto an outermost surface of the DRA. It is also possible to mold at least one volume directly onto the ground structure, or into the container comprising a material having a dielectric constant between 1 and 3.

The mold can have a mold insert comprising a molded or machined ceramic to provide the package or outermost shell V(N). Use of a ceramic insert can lead to lower loss resulting in higher efficiency; reduced cost due to low direct material cost for molded alumina; ease of manufactured and controlled (constrained) thermal expansion of the polymer. It can also provide a balanced coefficient of thermal expansion (CTE) such that the overall structure matches the CTE of copper or aluminum.

Each volume can be molded in a different mold, and the volumes subsequently assembled. For example a first volume can be molded in a first mold, and a second volume in a second mold, then the volumes assembled. In an embodiment, the first volume is different from the second volume. Separate manufacture allows ready customization of each volume with respect to shape or composition. For example, the polymer of the dielectric material, the type of additives, or the amount of additive can be varied. An adhesive layer can be applied to bond a surface of one volume to a surface of another volume.

In other embodiments, a second volume can be molded into or onto a first molded volume. A postbake or lamination cycle can be used to remove any air from between the volumes. Each volume can also comprise a different type or amount of additive. Where a thermoplastic polymer is used, the first and second volumes can comprise polymers having different melt temperatures or different glass transition temperatures. Where a thermosetting composition is used, the first volume can be partially or fully cured before molding the second volume.

It is also possible to use a thermosetting composition as one volume (e.g., the first volume) and a thermoplastic composition as another volume (e.g., the second volume). In any of these embodiments, the filler can be varied to adjust the dielectric constant or the coefficient of thermal expansion (CTE) of each volume. For example, the CTE or dielectric of each volume can be offset such that the resonant frequency remains constant as temperature varies. In an embodiment, the inner volumes can comprise a low dielectric constant (<3.5) material filled with a combination of silica and microspheres (microballoons) such that a desired dielectric constant is achieved with CTE properties that match the outer volumes.

In some embodiments the molding is injection molding an injectable composition comprising the thermoplastic polymer or thermosetting composition and any other components of the dielectric material to provide at least one volume of the dielectric material. Each volume can be injection molded separately, and then assembled, or a second volume can be molded into or onto a first volume. For example, the method can comprise reaction injection molding a first volume in a first mold having an outer mold form and an inner mold form; removing the inner mold form and replacing it with a second inner mold form defining an inner dimension of a second volume; and injection molding a second volume in the first volume. In an embodiment, the first volume is the outermost shell V(N). Alternatively, the method can comprise injection molding a first volume in a first mold having an outer mold form and an inner mold form; removing the outer mold form and replacing it with a second outer mold form defining an outer dimension of a second volume; and injection molding the second volume onto the first volume. In an embodiment, the first volume is the innermost volume V(1).

The injectable composition can be prepared by first combining the ceramic filler and the silane to form a filler composition and then mixing the filler composition with the thermoplastic polymer or thermosetting composition. For a thermoplastic polymer, the polymer can be melted prior to, after, or during the mixing with one or both of the ceramic filler and the silane. The injectable composition can then be injection molded in a mold. The melt temperature, the injection temperature, and the mold temperature used depend on the melt and glass transition temperature of the thermoplastic polymer, and can be, for example, 150 to 350° C., or 200 to 300° C. The molding can occur at a pressure of 65 to 350 kiloPascal (kPa).

In some embodiments, the dielectric volume can be prepared by reaction injection molding a thermosetting composition. Reaction injection molding is particularly suitable for using a first molded volume to mold a second molded volume, because crosslinking can significantly alter the melt characteristics of the first molded volume. The reaction injection molding can comprise mixing at least two streams to form a thermosetting composition, and injecting the thermosetting composition into the mold, wherein a first stream comprises the catalyst and the second stream optionally comprises an activating agent. One or both of the first stream and the second stream or a third stream can comprise a monomer or a curable composition. One or both of the first stream and the second stream or a third stream can comprise one or both of a dielectric filler and an additive. One or both of the dielectric filler and the additive can be added to the mold prior to injecting the thermosetting composition.

For example, a method of preparing the volume can comprise mixing a first stream comprising the catalyst and a first monomer or curable composition and a second stream comprising the optional activating agent and a second monomer or curable composition. The first and second monomer or curable composition can be the same or different. One or both of the first stream and the second stream can comprise the dielectric filler. The dielectric filler can be added as a third stream, for example, further comprising a third monomer. The dielectric filler can be in the mold prior to injection of the first and second streams. The introducing of one or more of the streams can occur under an inert gas, for example, nitrogen or argon.

The mixing can occur in a head space of an injection molding machine, or in an inline mixer, or during injecting into the mold. The mixing can occur at a temperature of greater than or equal to 0 to 200 degrees Celsius (° C.), specifically, 15 to 130° C., or 0 to 45° C., more specifically, 23 to 45° C.

The mold can be maintained at a temperature of greater than or equal to 0 to 250° C., specifically, 23 to 200° C. or 45 to 250° C., more specifically, 30 to 130° C. or 50 to 70° C. It can take 0.25 to 0.5 minutes to fill a mold, during which time, the mold temperature can drop. After the mold is filled, the temperature of the thermosetting composition can increase, for example, from a first temperature of 0° to 45° C. to a second temperature of 45 to 250° C. The molding can occur at a pressure of 65 to 350 kiloPascal (kPa). The molding can occur for less than or equal to 5 minutes, specifically, less than or equal to 2 minutes, more specifically, 2 to 30 seconds. After the polymerization is complete, the substrate can be removed at the mold temperature or at a decreased mold temperature. For example, the release temperature, $T_r$, can be less than or equal to 10° C. less than the molding temperature, $T_m$ ($T_r \leq T_m - 10°$ C.).

After the volume is removed from the mold, it can be post-cured. Post-curing can occur at a temperature of 100 to 150° C., specifically, 140 to 200° C. for greater than or equal to 5 minutes.

In another embodiment, the dielectric volume can be formed by compression molding to form a volume of a dielectric material, or a volume of a dielectric material with an embedded feature or a surface feature. Each volume can be compression molded separately, and then assembled, or a second volume can be compression molded into or onto a first volume. For example, the method can include compression molding a first volume in a first mold having an outer mold form and an inner mold form; removing the inner mold form and replacing it with a second inner mold form defining an inner dimension of a second volume; and compression molding a second volume in the first volume. In some embodiments the first volume is the outermost shell V(N). Alternatively, the method can include compression molding a first volume in a first mold having an outer mold form and an inner mold form; removing the outer mold form and replacing it with a second outer mold form defining an outer dimension of a second volume; and compression molding the second volume onto the first volume. In this embodiment the first volume can be the innermost volume V(1).

Compression molding can be used with either thermoplastic or thermosetting materials. Conditions for compression molding a thermoplastic material, such as mold temperature, depend on the melt and glass transition temperature of the thermoplastic polymer, and can be, for example, 150 to 350° C., or 200 to 300° C. The molding can occur at a pressure of 65 to 350 kiloPascal (kPa). The molding can occur for less than or equal to 5 minutes, specifically, less than or equal to 2 minutes, more specifically, 2 to 30 seconds. A thermosetting material can be compression molded before B-staging to produce a B-stated material or a fully cured material; or it can be compression molded after it has been B-staged, and fully cured in the mold or after molding.

In still other embodiments, the dielectric volume can be formed by forming a plurality of layers in a preset pattern and fusing the layers, i.e., by 3D printing. As used herein, 3D printing is distinguished from inkjet printing by the formation of a plurality of fused layers (3D printing) versus a single layer (inkjet printing). The total number of layers can vary, for example from 10 to 100,000 layers, or 20 to 50,000 layers, or 30 to 20,000 layers. The plurality of layers in the predetermined pattern is fused to provide the article. As used herein "fused" refers to layers that have been formed and bonded by any 3D printing processes. Any method effective to integrate, bond, or consolidate the plurality of layers during 3D printing can be used. In some embodiments, the fusing occurs during formation of each of the layers. In some embodiments the fusing occurs while subsequent layers are formed, or after all layers are formed. The preset pattern can be determined from a three-dimensional digital representation of the desired article as is known in the art.

3D printing allows rapid and efficient manufacture of the dielectric volumes, optionally together with another DRA component(s) as an embedded feature or a surface feature. For example, a metal, ceramic, or other insert can be placed during printing provide a component of the DRA, such as a signal feed, ground component, or reflector component as embedded or surface feature. Alternatively, an embedded feature can be 3D printed or inkjet printed onto a volume, followed by further printing; or a surface feature can be 3D printed or inkjet printed onto an outermost surface of the DRA. It is also possible to 3D print at least one volume directly onto the ground structure, or into the container comprising a material having a dielectric constant between 1 and 3.

A first volume can be formed separately from a second volume, and the first and second volumes assembled, optionally with an adhesive layer disposed therebetween. Alternatively, or in addition, a second volume can be printed on a first volume. Accordingly, the method can include forming first plurality of layers to provide a first volume; and forming a second plurality of layers on an outer surface of the first volume to provide a second volume on the first volume. The first volume is the innermost volume V(1). Alternatively, the method can include forming first plurality of layers to provide a first volume; and forming a second plurality of layers on an inner surface of the first volume to provide the second volume. In an embodiment, the first volume is the outermost volume V(N).

A wide variety of 3D printing methods can be used, for example fused deposition modeling (FDM), selective laser sintering (SLS), selective laser melting (SLM), electronic beam melting (EBM), Big Area Additive Manufacturing (BAAM), ARBURG plastic free forming technology, laminated object manufacturing (LOM), pumped deposition (also known as controlled paste extrusion, as described, for example, at: http://nscrypt.com/micro-dispensing), or other 3D printing methods. 3D printing can be used in the manufacture of prototypes or as a production process. In some embodiments the volume or the DRA is manufactured only by 3D or inkjet printing, such that the method of forming the dielectric volume or the DRA is free of an extrusion, molding, or lamination process.

Material extrusion techniques are particularly useful with thermoplastics, and can be used to provide intricate features. Material extrusion techniques include techniques such as FDM, pumped deposition, and fused filament fabrication, as well as others as described in ASTM F2792-12a. In fused material extrusion techniques, an article can be produced by heating a thermoplastic material to a flowable state that can be deposited to form a layer. The layer can have a predetermined shape in the x-y axis and a predetermined thickness in the z-axis. The flowable material can be deposited as roads as described above, or through a die to provide a specific profile. The layer cools and solidifies as it is deposited. A subsequent layer of melted thermoplastic material fuses to the previously deposited layer, and solidifies upon a drop in temperature. Extrusion of multiple subsequent layers builds the desired shape. In particular, an article can be formed from a three-dimensional digital representation of the article by depositing the flowable material as one or more roads on a substrate in an x-y plane to form the layer. The position of the dispenser (e.g., a nozzle) relative to the substrate is then incremented along a z-axis (perpendicular to the x-y plane), and the process is then repeated to form an article from the digital representation. The dispensed material is thus also referred to as a "modeling material" as well as a "build material."

In some embodiments the layers are extruded from two or more nozzles, each extruding a different composition. If multiple nozzles are used, the method can produce the product objects faster than methods that use a single nozzle, and can allow increased flexibility in terms of using different polymers or blends of polymers, different colors, or textures, and the like. Accordingly, in an embodiment, a composition or property of a single layer can be varied during deposition using two nozzles, or compositions or a property of two adjacent layers can be varied. For example, one layer can have a high volume percent of dielectric filler, a subsequent layer can have an intermediate volume of dielectric filler, and a layer subsequent to that can have low volume percent of dielectric filler.

Material extrusion techniques can further be used of the deposition of thermosetting compositions. For example, at least two streams can be mixed and deposited to form the layer. A first stream can include catalyst and a second stream can optionally comprise an activating agent. One or both of the first stream and the second stream or a third stream can comprise the monomer or curable composition (e.g., resin). One or both of the first stream and the second stream or a third stream can comprise one or both of a dielectric filler and an additive. One or both of the dielectric filler and the additive can be added to the mold prior to injecting the thermosetting composition.

For example, a method of preparing the volume can comprise mixing a first stream comprising the catalyst and a first monomer or curable composition and a second stream comprising the optional activating agent and a second monomer or curable composition. The first and second monomer or curable composition can be the same or different. One or both of the first stream and the second stream can comprise the dielectric filler. The dielectric filler can be added as a third stream, for example, further comprising a third monomer. The depositing of one or more of the streams can occur under an inert gas, for example, nitrogen or argon. The mixing can occur prior to deposition, in an inline mixer, or during deposition of the layer. Full or partial curing (polymerization or crosslinking) can be initiated prior to deposition, during deposition of the layer, or after deposition. In an embodiment, partial curing is initiated prior to or during deposition of the layer, and full curing is initiated after deposition of the layer or after deposition of the plurality of layers that provides the volume.

In some embodiments a support material as is known in the art can optionally be used to form a support structure. In these embodiments, the build material and the support material can be selectively dispensed during manufacture of the article to provide the article and a support structure. The support material can be present in the form of a support structure, for example a scaffolding that can be mechanically removed or washed away when the layering process is completed to the desired degree.

Stereolithographic techniques can also be used, such as selective laser sintering (SLS), selective laser melting (SLM), electronic beam melting (EBM), and powder bed jetting of binder or solvents to form successive layers in a preset pattern. Stereolithographic techniques are especially useful with thermosetting compositions, as the layer-by-layer buildup can occur by polymerizing or crosslinking each layer.

In still another method for the manufacture of a dielectric resonator antenna or array, or a component thereof, a second volume can be formed by applying a dielectric composition to a surface of the first volume. The applying can be by coating, casting, or spraying, for example by dip-coating, spin casting, spraying, brushing, roll coating, or a combination comprising at least one of the foregoing. In some embodiments a plurality of first volumes is formed on a substrate, a mask is applied, and the dielectric composition to form the second volume is applied. This technique can be useful where the first volume is innermost volume V(1) and the substrate is a ground structure or other substrate used directly in the manufacture of an antenna array.

As described above, the dielectric composition can comprise a thermoplastic polymer or a thermosetting composition. The thermoplastic can be melted, or dissolved in a suitable solvent. The thermosetting composition can be a liquid thermosetting composition, or dissolved in a solvent. The solvent can be removed after applying the dielectric composition by heat, air drying, or other technique. The thermosetting composition can be B-staged, or fully polymerized or cured after applying to form the second volume. Polymerization or cure can be initiated during applying the dielectric composition.

The components of the dielectric composition are selected to provide the desired properties, for example dielectric constant. Generally, a dielectric constant of the first and second dielectric materials differ.

In some embodiments the first volume is the innermost volume $V(1)$, wherein one or more, including all of the subsequent volumes are applied as described above. For example, all of the volumes subsequent to the innermost volume $V(1)$ can be formed by sequentially applying a dielectric composition to an underlying one of the respective volumes $V(i)$, beginning with applying a dielectric composition to the first volume. In other embodiments only one of the plurality of volumes is applied in this manner. For example, the first volume can be volume $V(N-1)$ and the second volume can be the outermost volume $V(N)$.

While several of the figures provided herewith depict certain dimensions, it will be appreciated that the noted dimensions are provided for non-limiting illustrative purposes only with respect to the associated analytically modeled embodiment, as other dimensions suitable for a purpose disclosed herein are contemplated.

As further example to the non-limiting reference to the exemplary embodiments disclosed herein, some figures provided herewith depict a plurality of volumes of dielectric materials having flat tops, with either a centrally arranged signal feed or an axially offset signal feed, and where the z-axis cross section of the plurality of volumes of dielectric materials is elliptical in shape, while other figures depict a plurality of volumes of dielectric materials having hemispherical or dome-shaped tops, with no specific location for the signal feed, and where the z-axis cross section of the plurality of volumes of dielectric materials is either circular or elliptical in shape, while other figures depict a fence/reflector surrounding a DRA (understood to be any DRA disclosed herein), and while other figures depict the plurality of volumes of dielectric materials in a generic sense, see FIG. 20 for example. From all of the foregoing, it will be appreciated that certain features from embodiments depicted in one figure or set of figures (the number of volumes/layers of dielectric materials, the outside shape of the plurality of volumes of dielectric materials, the location of the signal feed, the cross sectional shape of the plurality of volumes of dielectric materials, or the presence or absence of a fence/reflector, for example) may be employed in embodiments depicted in other figures or sets of figures that do not specifically depict such features, as the number of combinations of features disclosed herein is exhaustive and unnecessary to provide illustration for one skilled in the art to appreciate that such combinations are clearly and concisely disclosed herein without specifically having to illustrate all such features in a complete matrix of alternative embodiments. Any and all such combinations are contemplated herein and considered to be within the ambit of the claimed invention presented in the appended claims.

While certain combinations of features relating to a DRA or an array of DRA's have been disclosed herein, it will be appreciated that these certain combinations are for illustration purposes only and that any combination of any or only some of these features may be employed, explicitly or equivalently, either individually or in combination with any other of the features disclosed herein, in any combination, and all in accordance with an embodiment. Any and all such combinations are contemplated herein and are considered within the scope of the invention disclosed herein. For example, the pluralities of volumes of dielectric materials disclosed herein, absent a ground structure, a signal feed, and/or fence, as disclosed herein, may be useful as an electronic filter or resonator. Such filter or resonator construct, or any other device useful of a plurality of volumes of dielectric materials disclosed herein, are contemplated and considered to be within the scope of the invention disclosed herein.

In view of the foregoing, some embodiments disclosed herein may include one or more of the following advantages: a multilayer dielectric design suitable for broadband and high gain arrays at microwave and millimeter wave applications; a multilayer dielectric design suitable for utilizing 3D printing fabrication processes; a superefficient multilayer design with efficiency that can be higher than 95%; a multilayer design that can replace the traditional patch antenna over the complete microwave and millimeter frequency range; the gain of a single cell (single DRA) can be as high as 8 dB and even higher; a DRA where 50% bandwidths or greater may be achieved; the ability to design optimized resonator shapes depending on the dielectric constants of the materials used in the multi layers; and, the ability to use different techniques to balance the gain of a single cell including the ground modifications While certain dimensional values and dielectric constant values have been discussed herein with respect a particular DRA, it will be appreciated that these values are for illustration purposes only and that any such value suitable for a purpose disclosed herein may be employed without detracting from the scope of the invention disclosed herein.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "or" unless clearly stated otherwise.

While certain combinations of features relating to an antenna have been described herein, it will be appreciated that these certain combinations are for illustration purposes only and that any combination of any of these features may be employed, explicitly or equivalently, either individually or in combination with any other of the features disclosed herein, in any combination, and all in accordance with an embodiment. Any and all such combinations are contemplated herein and are considered within the scope of the disclosure.

In view of all of the foregoing, it will be appreciated that embodiments of the invention include the following Embodiments.

Embodiment-1

A dielectric resonator antenna (DRA), having: an electrically conductive ground structure; a plurality of volumes of dielectric materials disposed on the ground structure having N volumes, N being an integer equal to or greater than 3, disposed to form successive and sequential layered volumes V(i), i being an integer from 1 to N, wherein volume V(1) forms an innermost first volume, wherein a successive volume V(i+1) forms a layered shell disposed over and at least partially embedding volume V(i), wherein volume V(N) at least partially embeds all volumes V(1) to V(N−1); and a signal feed disposed and structured to be electromagnetically coupled to one or more of the plurality of volumes of dielectric materials.

Embodiment-2

The DRA of Embodiment-1, wherein each successive volume V(i+1) forms a layered shell disposed over and completely 100% embedding volume V(i).

Embodiment-3

The DRA according to any preceding Embodiment, wherein volume V(N) completely 100% embeds all volumes V(1) to V(N−1).

Embodiment-4

The DRA according to any preceding Embodiment, wherein the signal feed is disposed within an opening of the ground structure in non-electrical contact with the ground structure, and is disposed within one of the plurality of volumes of dielectric materials.

Embodiment-5

The DRA according to any preceding Embodiment, wherein: the DRA when excited by an electrical signal on the signal feed is configured to produce a far field 3D radiation pattern that occupies a topological space corresponding to a single element homotopy group defined by a family of closed loop paths that are each contractible at a single point within the 3D radiation pattern.

Embodiment-6

The DRA according to any preceding Embodiment, wherein: the DRA when excited by an electrical signal on the signal feed is configured to produce a far field 3D radiation pattern that occupies a topological space corresponding to a two-element homotopy group defined by a family of closed loop paths that are contractible at a single point, and by a family of the closed loop paths that are not contractible at a single point.

Embodiment-7

The DRA according to any preceding Embodiment, wherein: each layered volume of the plurality of volumes of dielectric materials has a dielectric constant $\epsilon(i)$, wherein the dielectric constant and the volume of each respective layer are in accordance with the following relationship: $\epsilon(i+1)*V(i+1) \approx \epsilon(i)*V(i)$; except for $\epsilon(1)*V(1)$, where $\epsilon(1)$ the dielectric constant of air.

Embodiment-8

The DRA according to any preceding Embodiment, wherein: each layered volume of the plurality of volumes of dielectric materials has a dielectric constant $\epsilon(i)$, wherein the dielectric constant and the volume of each respective layer are in accordance with the following relationship: $\epsilon(i)*V(i) \approx C(f)$; where $C(f)$ is a constant at a given frequency; except for $\epsilon(1)*V(1)$, where $\epsilon(1) \approx$ the dielectric constant of air.

Embodiment-9

A dielectric resonator antenna (DRA), having: a plurality of volumes of dielectric materials having N volumes, N being an integer equal to or greater than 3, disposed to form successive and sequential layered volumes $V(i)$, i being an integer from 1 to N, wherein volume $V(1)$ forms an innermost first volume, wherein a successive volume $V(i+1)$ forms a layered shell disposed over and at least partially embedding volume $V(i)$, wherein volume $V(N)$ at least partially embeds all volumes $V(1)$ to $V(N-1)$; wherein the DRA when excited via an electrical signal is configured to produce a far field 3D radiation pattern that occupies a topological space corresponding to a single element homotopy group defined by a family of closed loop paths that are each contractible at a single point within the 3D radiation pattern.

Embodiment-10

A dielectric resonator antenna (DRA), having: a plurality of volumes of dielectric materials having N volumes, N being an integer equal to or greater than 3, disposed to form successive and sequential layered volumes $V(i)$, i being an integer from 1 to N, wherein volume $V(1)$ forms an innermost first volume, wherein a successive volume $V(i+1)$ forms a layered shell disposed over and at least partially embedding volume $V(i)$, wherein volume $V(N)$ at least partially embeds all volumes $V(1)$ to $V(N-1)$; wherein the DRA when excited via an electrical signal is configured to produce a far field 3D radiation pattern that occupies a topological space corresponding to a two-element homotopy group defined by a family of closed loop paths that are contractible at a single point, and by a family of closed loop paths that are not contractible at a single point.

Embodiment-11

A dielectric resonator antenna (DRA), having: a plurality of volumes of dielectric materials having N volumes, N being an integer equal to or greater than 3, disposed to form successive and sequential layered volumes $V(i)$, i being an integer from 1 to N, wherein volume $V(1)$ forms an innermost first volume, wherein a successive volume $V(i+1)$ forms a layered shell disposed over and at least partially embedding volume $V(i)$, wherein volume $V(N)$ at least partially embeds all volumes $V(1)$ to $V(N-1)$; wherein: each layered volume of the plurality of volumes of dielectric materials has a dielectric constant $\epsilon(i)$, wherein the dielectric constant and the volume of each respective layer are in accordance with the following relationship: $\epsilon(i+1)*V(i+1) \approx \epsilon(i)*V(i)$; except for $\epsilon(1)*V(1)$, where $\epsilon(1)$ the dielectric constant of air.

Embodiment-12

A dielectric resonator antenna (DRA), having: a plurality of volumes of dielectric materials having N volumes, N being an integer equal to or greater than 3, disposed to form successive and sequential layered volumes $V(i)$, i being an integer from 1 to N, wherein volume $V(1)$ forms an innermost first volume, wherein a successive volume $V(i+1)$ forms a layered shell disposed over and at least partially embedding volume $V(i)$, wherein volume $V(N)$ at least partially embeds all volumes $V(1)$ to $V(N-1)$; wherein: each layered volume of the plurality of volumes of dielectric materials has a dielectric constant $\epsilon(i)$, wherein the dielectric constant and the volume of each respective layer are in accordance with the following relationship: $\epsilon(i)*V(i) \approx C(f)$; where $C(f)$ is a constant at a given frequency; except for $\epsilon(1)*V(1)$, where $\epsilon(1) \approx$ the dielectric constant of air.

Embodiment-13

The DRA according to any of Embodiments 9-12, further having: an electrically conductive ground structure; a signal feed disposed and structured to be electromagnetically coupled to one or more of the plurality of volumes of dielectric materials; and wherein the plurality of volumes of dielectric materials are disposed on the ground structure.

Embodiment-14

The DRA of Embodiment 13, wherein the signal feed is disposed within an opening of the ground structure in non-electrical contact with the ground structure, and is disposed within one of the plurality of volumes of dielectric materials.

Embodiment-15

The DRA according to any of Embodiments 1-14, wherein: the first volume V(1) has a vertically oriented at least partial ellipsoidal shape.

Embodiment-16

The DRA of Embodiment 15, wherein: the vertically oriented at least partial ellipsoidal shape of the first volume V(1) is axially aligned with respect to a central z-axis of the plurality of volumes.

Embodiment-17

The DRA according to any of Embodiments 1-16, wherein: the first volume V(1) has a dielectric constant equal to that of air.

Embodiment-18

The DRA according to any of Embodiments 1-17, wherein: a peripheral geometrical path at a periphery of the plurality of volumes of dielectric materials has a dielectric constant that supports a TM radiating mode in the peripheral geometrical path; and a central geometrical path within the plurality of volumes of dielectric materials has a dielectric constant that suppresses the TM radiating mode in the central geometrical path.

Embodiment-19

The DRA of Embodiment 18, wherein: the TM radiating mode in the central geometrical path is completely suppressed.

Embodiment-20

The DRA according to any of Embodiments 1-19, wherein: the plurality of volumes of dielectric materials have a first electrical path with a first path length defined by a TE half wavelength resonance, and have a second geometrical path with a second path length defined by a TM half wavelength resonance, a ratio of the first path length to the second path length being equal to or greater than 1.6.

Embodiment-21

The DRA of Embodiment 20, wherein: the TE half wavelength resonance is defined by $\pi R \sqrt{\varepsilon_r}$, where R is an overall height of the DRA, and $\varepsilon_r$ is the relative permittivity at an outer periphery of the plurality of volumes of dielectric materials; and the TM half wavelength resonance is defined by $R\sqrt{\varepsilon_{Air}}+\pi R/2\sqrt{\varepsilon_r}$, where $\varepsilon_{Air}$ is the permittivity of air.

Embodiment-22

The DRA according to any of Embodiments 1-8 and 13, wherein: the signal feed is disposed within and electromagnetically coupled to the first volume V(1) of dielectric material; and each volume of the plurality of volumes of dielectric materials has a central longitudinal axis that is parallel to and centrally disposed relative to a longitudinal axis of the signal feed, the longitudinal axis of the signal feed being perpendicular to the ground structure.

Embodiment-23

The DRA according to any of Embodiments 1-8 and 13, wherein: the signal feed is disposed within and electromagnetically coupled to one of the plurality of volumes of dielectric materials that is other than the first volume V(1) of dielectric material.

Embodiment-24

The DRA according to any of Embodiments 1-8, 13 and 23, wherein: each volume of the plurality of volumes of dielectric materials has a central longitudinal axis that is parallel to and centrally disposed relative to each other, each central longitudinal axis being perpendicular to the ground structure.

Embodiment-25

The DRA according to any of Embodiments 1-8, 13 and 23, wherein: each volume of the plurality of volumes of dielectric materials has a central longitudinal axis that is parallel to and sideways shifted in a same sideways direction relative to each other, each central longitudinal axis being perpendicular to the ground structure.

Embodiment-26

The DRA according to any of Embodiments 1-8, 13 and 23, further having: a container disposed on the ground structure having a material having a dielectric constant between 1 and 3; wherein the plurality of volumes of dielectric materials are embedded within the container; wherein each volume of the plurality of volumes of dielectric materials has a central longitudinal axis that is parallel to and centrally disposed relative to each other, and the plurality of volumes of dielectric materials is centrally shifted in a sideways direction relative to a central longitudinal axis of the container, each central longitudinal axis being perpendicular to the ground structure.

Embodiment-27

The DRA according to any of Embodiments 1-8, 13 and 23, further having: a container disposed on the ground structure having a material having a dielectric constant between 1 and 3; wherein the plurality of volumes of dielectric materials are embedded within the container; wherein each volume of the plurality of volumes of dielectric materials has a central longitudinal axis that is centrally disposed relative to each other, and relative to a longitudinal axis of the container, each longitudinal axis being perpendicular to the ground structure; wherein the outer volume V(N) of the plurality of volumes of dielectric materials has an asymmetrical shape.

Embodiment-28

The DRA according to any of Embodiments 1-27, wherein: directly adjacent volumes of the plurality of volumes of dielectric materials have different dielectric constant values that range from a first relative minimum value at volume V(1) to a relative maximum value at one of volumes V(2) to V(N−1), back to a second relative minimum value at volume V(N).

Embodiment-29

The DRA according to any of Embodiments 1-27, wherein: directly adjacent volumes of the plurality of volumes of dielectric materials have different dielectric constant values that range from a first relative minimum value at volume V(1) to a relative maximum value at V((N+1)/2), where N is an odd integer, back to a second relative minimum value at V(N).

Embodiment-30

The DRA according to any of Embodiments 28 and 29, wherein the first relative minimum value is equal to the second relative minimum value.

Embodiment-31

The DRA according to any of Embodiments 1-8, 13 and 22-27, wherein: each volume of the plurality of volumes of dielectric materials has a cylindrical shaped cross section axially centered on each other and axially centered on the signal feed.

Embodiment-32

The DRA according to any of Embodiments 1-8, 13 and 22-27, wherein: each volume of the plurality of volumes of dielectric materials has an elliptical shaped cross section axially centered on each other and axially centered on the signal feed.

Embodiment-33

The DRA according to any of Embodiments 1-8, 13 and 22-27, wherein: each volume of the plurality of volumes of dielectric materials has a cylindrical shape.

Embodiment-34

The DRA according to any of Embodiments 1-8, 13 and 22-27, wherein: each volume of the plurality of volumes of dielectric materials has an elliptical shape.

Embodiment-35

The DRA according to any of Embodiments 1-8, 13 and 23, wherein: the signal feed is disposed within and electromagnetically coupled to the second volume V(2) of dielectric material.

Embodiment-36

The DRA according to any of Embodiments 1-8 and 13, wherein: each volume of the plurality of volumes of dielectric materials and the embedded signal feed form an arch, each arched volume of the plurality of volumes of dielectric materials having both ends of the respective arched volume disposed on the ground plan.

Embodiment-37

The DRA according to any of Embodiments 1-8 and 13, wherein: the signal feed is disposed within and electromagnetically coupled to the first volume V(1) of dielectric material; each volume of the plurality of volumes of dielectric materials has an hemispherical shape; and further having a container disposed on the ground structure having a material having a dielectric constant between 1 and 3, the container having an hemispherical shape; wherein the plurality of volumes of dielectric materials is embedded within the container; wherein each volume of the plurality of volumes of dielectric materials has a zenith axis that is centrally disposed relative to each other, and the plurality of volumes of dielectric materials are centrally shifted in a sideways direction relative to a zenith axis of the container; and wherein the signal feed is arched within the first volume V(1) of dielectric material and enters the first volume V(1) off center from the zenith axis of the first volume V(1).

Embodiment-38

The DRA of Embodiment 25, wherein: each volume of the plurality of volumes of dielectric materials has an elongated dome shape oriented lengthwise to its respective central longitudinal axis; and further having an electrically conductive fence disposed circumferentially around the plurality of volumes of dielectric materials, and electrically connects with and forms part of the ground structure.

Embodiment-39

The DRA of Embodiment 38, wherein: the first volume V(1) of dielectric material is centrally disposed relative to a center of the circumference of the electrically conductive fence.

Embodiment-40

The DRA according to any of the preceding Embodiments, wherein: each volume of the plurality of volumes of dielectric materials is in direct intimate contact with adjacent ones of the plurality of volumes of dielectric materials.

Embodiment-41

The DRA according to any of Embodiments 1-8, 13, 22-27 and 31-39 wherein: the signal feed comprises a copper wire, a coaxial cable, a microstrip, a waveguide, a surface integrated waveguide, or a conductive ink.

Embodiment-42

The DRA according to any of Embodiments 1-8, 13, 22-27, 31-39 and 41, further having: an electrically conductive fence disposed circumferentially around the plurality of volumes of dielectric materials, and electrically connects with and forms part of the ground structure.

Embodiment-43

The DRA according to any of the preceding Embodiments, wherein: N is equal to 5.

Embodiment-44

A DRA array, having: a plurality of DRA's according to any of the preceding Embodiments arranged in an x by y array pattern, where x and y are integers.

Embodiment-45

The DRA array of Embodiment 44, wherein: x is equal to y.

Embodiment-46

The DRA according to any of Embodiments 1-8, 13, 22-27, 31-39 and 41-42, further having: a volume V(A) of dielectric material disposed within the plurality of volumes of dielectric materials, the volume V(A) being disposed diametrically opposing the signal feed and at least partially embedded in the same volume V(i) of the plurality of volumes of dielectric materials that the signal feed is disposed in or is in signal communication with, the volume V(A) having less volume than the volume V(i) that it is at least partially embedded in, the volume V(A) having a dielectric constant that is different from the dielectric constant of the volume V(i) that it is at least partially embedded in.

Embodiment-47

The DRA according to Embodiment 46, wherein the volume V(A) is completely 100% embedded in the volume V(i) that it is embedded in.

Embodiment-48

The DRA according to any of Embodiments 46-47, wherein the volume V(A) is disposed on the ground structure.

Embodiment-49

The DRA according to any of Embodiments 46-48, wherein: the volume V(A) has a height that is equal to or greater than one-tenth the height of the plurality of volumes of dielectric materials, and is equal to or less than one-third the height of the plurality of volumes of dielectric materials.

Embodiment-50

The DRA according to any of Embodiments 46-49, wherein the volume V(A) has a dielectric constant that is greater than the dielectric constant of the volume V(i) that it is embedded in.

Embodiment-51

The DRA according to any of Embodiments 46-49, wherein the volume V(A) is a metal post.

Embodiment-52

The DRA according to any of Embodiments 46-49, wherein the volume V(A) is air.

Embodiment-53

The DRA according to any of Embodiments 46-52, wherein the volume V(A) is embedded in volume V(2).

Embodiment-54

The DRA according to any of Embodiments 38, 39 and 42, wherein the electrically conductive fence has a height that is equal to or greater than 0.2 times the overall height of the plurality of volumes of dielectric materials and equal to or less than 3 times the overall height of the plurality of volumes of dielectric materials.

Embodiment-55

The DRA according to any of Embodiments 38, 39 and 42, wherein the electrically conductive fence has a height that is equal to or greater than 0.2 times the overall height of the plurality of volumes of dielectric materials and equal to or less than 0.8 times the overall height of the plurality of volumes of dielectric materials.

Embodiment-56

The DRA according to any of Embodiments 38, 39, 42, 54 and 55, wherein: the electrically conductive fence has a non-uniform interior shape that provides at least one alignment feature; and, the plurality of volumes of dielectric materials has a complementary exterior shape that complements the non-uniform interior shape and the at least one alignment feature of the fence, such that the fence and the plurality of volumes of dielectric materials have a defined and fixed alignment relative to each other via the at least one alignment feature.

Embodiment-57

The DRA according to any of Embodiments 1-8, 13, 22-27, 31-39, 41-42 and 46-56, wherein: the first volume V(1) has an upper portion and a lower portion, the lower portion being wider than the upper portion.

Embodiment-58

The DRA according to Embodiment 57, wherein the upper portion has a vertically oriented at least partial ellipsoidal shape, and the lower portion has a tapered shape that transitions narrow-to-wide from the at least partial ellipsoidal shape to the ground structure.

Embodiment-59

The DRA according to Embodiment 58, wherein the height of the tapered shape is equal to or greater than one-tenth the height of volume V(1) and equal to or less than one-half the height of volume V(1).

Embodiment-60

A method for the manufacture of a DRA, or an array of the DRA's, according to any of Embodiments 1-8, 13, 22-27, 31-39, 41-42 and 46-59, the method including: molding at least one volume of the plurality of volumes of the dielectric materials, or all of the volumes of the plurality of volumes of the dielectric materials.

Embodiment-61

The method of Embodiment 60, wherein the at least one volume is molded onto an electrically conductive metal insert to provide the signal feed or the ground structure.

Embodiment-62

The method according to any of Embodiments 60-61, including inserting a metal layer into an outer mold portion of the outermost volume V(N), and molding the outermost volume V(N) onto the metal layer to provide the signal feed or the ground structure on the outermost volume V(N).

Embodiment-63

The method according to any of Embodiments 60-62, further including 3D printing or inkjet printing a feature onto a volume of the plurality of volumes of dielectric materials.

Embodiment-64

The method according to any of Embodiments 60-63, wherein the at least one volume of the plurality of volumes is molded into a mold insert having a ceramic.

Embodiment-65

The method according to any of Embodiments 60-64 wherein the at least one volume of the plurality of volumes is molded onto the ground structure or into a container having a material having a dielectric constant between 1 and 3.

Embodiment-66

The method according to any of Embodiments 60-65, wherein the molding comprises molding a first volume of the plurality of volumes of dielectric materials in a first mold, and a second volume of the plurality of dielectric materials in a second mold that is different from the first mold.

Embodiment-67

The method of Embodiment 66, further including adhering a surface of the first volume to a surface of the second volume.

Embodiment-68

The method according to any of Embodiments 60-65, wherein the molding comprises molding a first volume of the plurality of volumes of dielectric materials, and molding a second volume of the plurality of volumes of dielectric materials into or onto the first volume.

Embodiment-69

The method according to any of Embodiments 60-68, wherein the molding comprises injection molding at least one volume of the plurality of volumes of the dielectric materials.

Embodiment-70

The method of Embodiment 69, further including: injection molding a first volume of the plurality of volumes of dielectric materials in a first mold having an outer mold form and an inner mold form; removing the inner mold form and replacing it with a second inner mold form defining an inner dimension of a second volume of the plurality of volumes of dielectric materials; and injection molding the second volume in the first volume.

Embodiment-71

The method of Embodiment 70, wherein the first volume is the outermost volume V(N).

Embodiment-72

The method of Embodiment 69, further including: injection molding a first volume of the plurality of volumes of dielectric materials in a first mold having an outer mold form and an inner mold form; removing the outer mold form and replacing it with a second outer mold form defining an outer dimension of a second volume of the plurality of volumes of dielectric materials; and injection molding the second volume onto the first volume.

Embodiment-73

The method of Embodiment 72, wherein the first volume is the innermost volume V(1).

Embodiment-74

The method according to any of Embodiments 69-73, wherein the injection molding comprises injection molding a thermosetting composition having: a curable composition, and a catalyst system effective to cure the composition; and curing the curable composition to form the at least one volume.

Embodiment-75

The method according to any of Embodiments 60-68, wherein the molding comprises compression molding at least one volume of the plurality of volumes of dielectric materials.

Embodiment-76

The method of Embodiment 75, wherein the compression molding comprises: compression molding a first volume of the plurality of volumes of dielectric materials in a first mold having an outer mold form and an inner mold form; removing the inner mold form and replacing it with a second inner mold form defining an inner dimension of a second volume of the plurality of volumes of dielectric materials; and compression molding the second volume in the first volume.

Embodiment-77

The method of Embodiment 76, wherein the first volume is the outermost volume V(N).

Embodiment-78

The method of Embodiment 76, wherein the compression molding comprises: compression molding a first volume of the plurality of volumes of dielectric materials in a first mold having an outer mold form and an inner mold form; removing the outer mold form and replacing it with a second outer mold form defining an outer dimension of a second volume of the plurality of volumes of dielectric materials; and compression molding the second volume onto the first volume.

Embodiment-79

The method of Embodiment 77, wherein the first volume is the innermost volume V(1).

Embodiment-80

A method for the manufacture of a DRA, or array of the DRA's, according to any of Embodiments 1-8, 13, 22-27, 31-39, 41-42 and 46-59, the method including: forming a plurality of fused layers having a dielectric composition in a preset pattern to provide the plurality of volumes of dielectric materials.

Embodiment-81

The method of Embodiment 80, wherein the plurality of fused layers is formed onto an electrically conductive metal component to provide the signal feed or the ground structure.

Embodiment-82

The method according to any of Embodiments 80-81, further including printing a metal component onto a layer of the plurality of fused layers.

Embodiment-83

The method of Embodiment 82, wherein the printing is on the outermost volume V(N) to provide the signal feed or the ground structure on the outermost volume V(N).

Embodiment-84

The method according to any of Embodiments 80-83, wherein at least one volume of the plurality of volumes of dielectric materials is formed onto the ground structure, or into a container having a material having a dielectric constant between 1 and 3.

Embodiment-85

The method according to any of Embodiments 80-84, further including forming a first volume of the plurality of volumes of dielectric materials separately from a second volume of the plurality of volumes of dielectric materials.

Embodiment-86

The method of Embodiment 85, further including adhering a surface of the first volume to a surface of the second volume.

Embodiment-87

The method according to any of Embodiments 80-86, further including: forming a first plurality of fused layers to provide a first volume of the plurality of volumes of dielectric materials; and forming a second plurality of fused layers on an outer surface of the first volume to provide a second volume of the plurality of volumes of dielectric materials on the first volume.

Embodiment-88

The method of Embodiment 87, wherein the first volume is the innermost volume V(1).

Embodiment-89

The method according to any of Embodiments 80-86, further including: forming a first plurality of fused layers to provide a first volume of the plurality of volumes of dielectric materials; and forming a second plurality of fused layers on an inner surface of the first volume to provide a second volume of the plurality of volumes of dielectric materials.

Embodiment-90

The method of Embodiment 89, wherein the first volume is the outermost volume V(N).

Embodiment-91

The method according to any of Embodiments 80-90, further including altering the dielectric composition during the forming of at least one layer of the plurality of fused layers, or during the forming of two adjacent layers of the plurality of fused layers.

Embodiment-92

The method according to any of Embodiments 80-91, wherein the dielectric composition comprises a thermoplastic polymer.

Embodiment-93

The method according to any of Embodiments 80-91, wherein the dielectric composition comprises a thermosetting composition.

Embodiment-94

The method of Embodiment 93, further including initiating polymerization or crosslinking of the thermosetting composition before or during forming the plurality of fused layers.

Embodiment-95

The method of Embodiment 93, further including initiating polymerization or crosslinking of the thermosetting composition after forming the plurality of fused layers.

Embodiment-96

A method for the manufacture of a DRA, or array of the DRA's, according to any of Embodiments 1-59, the method including: forming a first volume of the plurality of volumes of dielectric materials from a first dielectric material having a first dielectric constant; and applying a dielectric composition to a surface of the first volume to provide a second volume of the plurality of volumes of dielectric materials with a second dielectric material having a second dielectric constant.

Embodiment-97

The method of Embodiment 96, wherein the applying is by dip-coating, spraying, brushing, roll coating, or a combination having at least one of the foregoing.

Embodiment-98

The method according to any of Embodiments 96-97, wherein the dielectric composition comprises a thermoplastic polymer, or a thermoplastic polymer dissolved in a solvent.

Embodiment-99

The method according to any of Embodiments 96-97, wherein the dielectric composition comprises a thermosetting composition in a solvent, or a liquid thermosetting composition.

Embodiment-100

The method of Embodiment 99, further including polymerizing or curing the thermosetting composition during or after the applying.

Embodiment-101

The method according to any of Embodiments 96-100, wherein the first and second dielectric constants are different.

Embodiment-102

The method according to any of Embodiments 96-101, wherein the first volume is the innermost volume V(1).

Embodiment-103

The method according to any of Embodiments 96-102, wherein the second volume is the outermost volume V(N).

Embodiment-104

The method according to any of Embodiments 96-103, wherein all of the volumes of the plurality of volumes of dielectric materials subsequent to the innermost volume V(1) are formed by sequentially applying a dielectric composition to an underlying one of the respective volumes.

While the invention has been described with reference to exemplary embodiments, it will be understood by those skilled in the art that various changes may be made and equivalents may be substituted for elements thereof without departing from the scope of this disclosure. In addition, many modifications may be made to adapt a particular situation or material to the teachings without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments and, although specific terms and/or dimensions may have been employed, they are unless otherwise stated used in a generic, exemplary and/or descriptive sense only and not for purposes of limitation.

The invention claimed is:

1. A dielectric resonator antenna, DRA, comprising:
   an electrically conductive ground structure;
   a plurality of volumes of dielectric materials disposed on the ground structure comprising N volumes, N being an integer equal to or greater than 3, disposed to form successive and sequential layered volumes $V_i$, i being an integer from 1 to N, wherein volume $V_1$ forms an innermost first volume, wherein a successive volume $V_{i+1}$ forms a layered shell disposed over and at least partially embedding volume $V_i$, wherein volume $V_N$ at least partially embeds all volumes $V_1$ to $V_{N-1}$;
   wherein a portion of the dielectric material of volume $V_N$ bifurcates at least a portion of volumes $V_1$ to $V_{N-1}$ in a plane that is perpendicular to the ground structure;
   wherein, as observed in a plan view of the DRA, the plurality of volumes of dielectric materials has a first effective dielectric constant along a first A-B geometrical path, and has a second effective dielectric constant along a second C-D geometrical path that is lower than the first effective dielectric constant; and
   a signal feed electromagnetically coupled to one or more of the plurality of volumes of dielectric materials.

2. The DRA according to claim 1, wherein the first A-B geometrical path is parallel to the portion of the dielectric material of volume $V_N$ that bifurcates the at least a portion of volumes $V_1$ to $V_{N-1}$.

3. The DRA according to claim 1, wherein the second C-D geometrical path is perpendicular to the portion of the dielectric material of volume $V_N$ that bifurcates the at least a portion of volumes $V_1$ to $V_{N-1}$.

4. The DRA according to claim 1, wherein the portion of the dielectric material of volume $V_N$ that bifurcates the at least a portion of volumes $V_1$ to $V_{N-1}$ only partially extends through volumes $V_1$ to $V_{N-1}$.

5. The DRA according to claim 1, wherein the portion of the dielectric material of volume $V_N$ that bifurcates the at least a portion of volumes $V_1$ to $V_{N-1}$ extends through the entire cross section of volumes $V_1$ to $V_{N-1}$.

6. The DRA according to claim 1, wherein volumes $V_1$ to $V_{N-1}$ have an ellipsoidal cross section as observed in a plan view of the DRA.

7. The DRA according to claim 6, wherein volumes $V_1$ to $V_{N-1}$ are sideways shifted with respect to each other.

8. The DRA according to claim 1, wherein, as observed in a plan view of the DRA, volume $V_1$ has a circular cross section, and volume $V_2$ has a truncated circular cross section.

9. The DRA according to claim 1, wherein directly adjacent volumes of the plurality of volumes of dielectric materials have different dielectric constant values that:
   range from a first relative minimum value at volume $V_1$ to a relative maximum value at one of volumes $V_2$ to $V_{N-1}$, back to a second relative minimum value at volume $V_N$; or
   range from a first relative minimum value at volume $V_1$ to a relative maximum value at $V_{[N+1]/2}$, where N is an odd integer, back to a second relative minimum value at $V_N$.

10. The DRA according to claim 1, further comprising an electrically conductive fence disposed around the plurality of volumes of dielectric materials and in electrical contact with and forming part of the ground structure.

11. The DRA according to claim 10 wherein the electrically conductive fence has a height that does not exceed the height of the plurality of volumes of dielectric materials.

12. The DRA according to claim 10, wherein:
   the fence has a non-uniform shape that provides at least one alignment feature; and
   the plurality of volumes of dielectric materials has a complementary shape that complements the non-uniform shape and the at least one alignment feature of the fence, such that the fence and the plurality of volumes of dielectric materials have a defined alignment relative to each other via the at least one alignment feature.

13. The DRA according to claim 1, wherein the electrically conductive ground structure comprises one or more openings.

14. The DRA according to claim 1, wherein adjacent ones of the plurality of volumes of dielectric materials have different dielectric constants with respect to each other.

15. The DRA according to claim 1, wherein N is greater than 3.

* * * * *